US012551078B2

(12) United States Patent
Saxton et al.

(10) Patent No.: US 12,551,078 B2
(45) Date of Patent: Feb. 17, 2026

(54) MAGNETIC TOOL SET

(71) Applicant: MUNCHKIN, INC., Van Nuys, CA (US)

(72) Inventors: Matthew Joseph Saxton, Moorpark, CA (US); Kaitlyn Giselle Flores, Cary, NC (US)

(73) Assignee: MUNCHKIN, INC., Van Nuys, CA (US)

( * ) Notice: Subject to any disclaimer, the term of this patent is extended or adjusted under 35 U.S.C. 154(b) by 344 days.

(21) Appl. No.: 17/858,962

(22) Filed: Jul. 6, 2022

(65) Prior Publication Data

US 2024/0008707 A1 Jan. 11, 2024

(51) Int. Cl.
*B25G 1/04* (2006.01)
*A47L 13/42* (2006.01)
*A47L 13/52* (2006.01)
*A46B 5/00* (2006.01)
*A46B 13/02* (2006.01)

(52) U.S. Cl.
CPC ............... *A47L 13/42* (2013.01); *A47L 13/52* (2013.01); *B25G 1/04* (2013.01); *A46B 5/0095* (2013.01); *A46B 13/02* (2013.01)

(58) Field of Classification Search
CPC ....... A46B 5/0095; A46B 13/02; A47L 13/52; B25G 1/04
See application file for complete search history.

(56) References Cited

U.S. PATENT DOCUMENTS 4,105,239 A * 8/1978 Akczinski, Sr. ...... B03C 1/0332 294/210
5,502,862 A * 4/1996 Vosbikian ................ B25G 3/30 15/176.3
7,530,138 B1 * 5/2009 Platt ....................... A46B 9/005 15/210.1
8,602,220 B1 * 12/2013 Porter ....................... B03C 1/30 209/418
9,532,694 B1 * 1/2017 Shippen .................. A47L 13/12
9,826,880 B1 11/2017 Faraone
11,690,442 B1 * 7/2023 Jensen ................. A46B 5/0095 15/105
12,029,367 B2 * 7/2024 Saxton ................... A46B 17/02
2005/0204512 A1 * 9/2005 Vosbikian .......... B65D 71/0096 16/427
2017/0144197 A1 * 5/2017 Byrd .......................... B08B 1/12
2017/0297190 A1 * 10/2017 Rampton ................. B25G 3/18
2018/0344119 A1 * 12/2018 Mengstu ................. A47L 13/12
2019/0167063 A1 6/2019 Balz
2021/0016429 A1 1/2021 Savard
2022/0104609 A1 * 4/2022 Iradukunda ............. A47L 13/02

FOREIGN PATENT DOCUMENTS

DE 20003727 U1 7/2000

OTHER PUBLICATIONS

International Search Report and Written Opinion mailed Oct. 4, 2022 (13 pages).

* cited by examiner

*Primary Examiner* — Michael D Jennings
(74) *Attorney, Agent, or Firm* — ArentFox Schiff LLP

(57) ABSTRACT

A modular cleaning set includes one or more separable components magnetically attached to each other, and including a broom, dustpan, mini-brooms, and one or more brushes. The handles and rods of the cleaning set may be reversibly attached to any of the individually separable components.

20 Claims, 49 Drawing Sheets

MAGNETIC TOOL SET

TECHNICAL FIELD

The subject disclosure relates to the field of tools. More particularly, the subject disclosure relates to the transporting and storing of the tool assemblies using magnetic mounts.

BACKGROUND OF THE SUBJECT DISCLOSURE

There are countless tools in use today designed to aid in the process of cleaning. These include larger brooms, smaller brooms, brushes, dustpans, scrapers, etc. Organizing and storing the various tools often becomes an ordeal as each tool takes up some space on its own and often a closet is used to store the various loose tools together.

Relatedly, when several cleaning tools must be taken to a location, the task of handling and transporting the required tools becomes an ordeal as each tool often needs to be carried on its own. Thus, any time there are more two or more tools to carry, both hands of a user become tasked with simply carrying the tools. This often results in the user making several trips from the location of storage of the cleaning tools and the location of use of the cleaning tools. For example, a cleaning crew that arrives to a home or office and needs to carry cleaning tools to the target location will have to make several trip sot carry in all the tools required to complete the cleaning task. What is needed is a simple but effective solution that addresses the tasks of neatly and efficiently storing various cleaning tools, and also allowing for ease in transporting the tools from one location to another.

SUMMARY OF THE SUBJECT DISCLOSURE

The present subject disclosure presents a novel magnetic cleaning set having a number of useful tools, including, for example, a broom assembly, a dustpan, a handheld brush, a magnetic mount, a mini broom and a mini dustpan. The broom assembly has a magnetically detachable rod, and a broom comprising: a broomstick that receives the magnetically detachable rod; a broomhead having a front wall connected to a rear wall by a top wall, the top wall having an aperture adapted to receive the broomstick; and a plurality of bristles that extend from a bottom of the broomhead.

Although the examples presented throughout the present subject disclosure relate to tools used in cleaning, the present subject disclosure is not limited to cleaning tools, and may be used for efficiently transporting and storing various tools related to specific tasks, such as, for example, cleaning, construction, plumbing, heating and air conditioning, automobile repair, etc. One having ordinary skill in the art would recognize and appreciate that the subject disclosure described herein is applicable to a wide variety of fields.

In one exemplary embodiment, the present subject disclosure is a tool assembly. The tool assembly includes a rod; a broomstick that magnetically and reversibly attaches to the rod, and a broomhead having bristles, which reversibly attaches to the broomstick.

In another exemplary embodiment, the present subject disclosure is a tool assembly. The tool assembly includes a rod; a broomstick that magnetically and reversibly attaches to the rod; a broomhead having bristles, which reversibly attaches to the broomstick; a magnetic mount having a first indent adapted to surround and grasp an exterior surface of the rod; and a bracket which reversibly mates with the magnetic mount and is adapted to secure the tool assembly to a wall.

In yet another exemplary embodiment, the present subject disclosure is a tool assembly. The tool assembly includes a rod; a broomstick that magnetically and reversibly attaches to the rod; a broomhead having bristles, which reversibly attaches to the broomstick; a magnetic mount having a first indent adapted to surround and grasp an exterior surface of the rod; a bracket which reversibly mates with a bracket slot in the magnetic mount and is adapted to secure the tool assembly to a wall; a broom and the dustpan with magnetic elements which mate with the mount magnetically; and a brush having a handle, wherein the mount has a second indent adapted to surround and grasp an exterior surface of the handle of the brush.

BRIEF DESCRIPTION OF THE DRAWINGS

Various exemplary embodiments of this disclosure will be described in detail, wherein like reference numerals refer to identical or similar components or steps, with reference to the following figures, wherein:

in FIG. 68.

DETAILED DESCRIPTION OF THE SUBJECT DISCLOSURE

Figure 1:
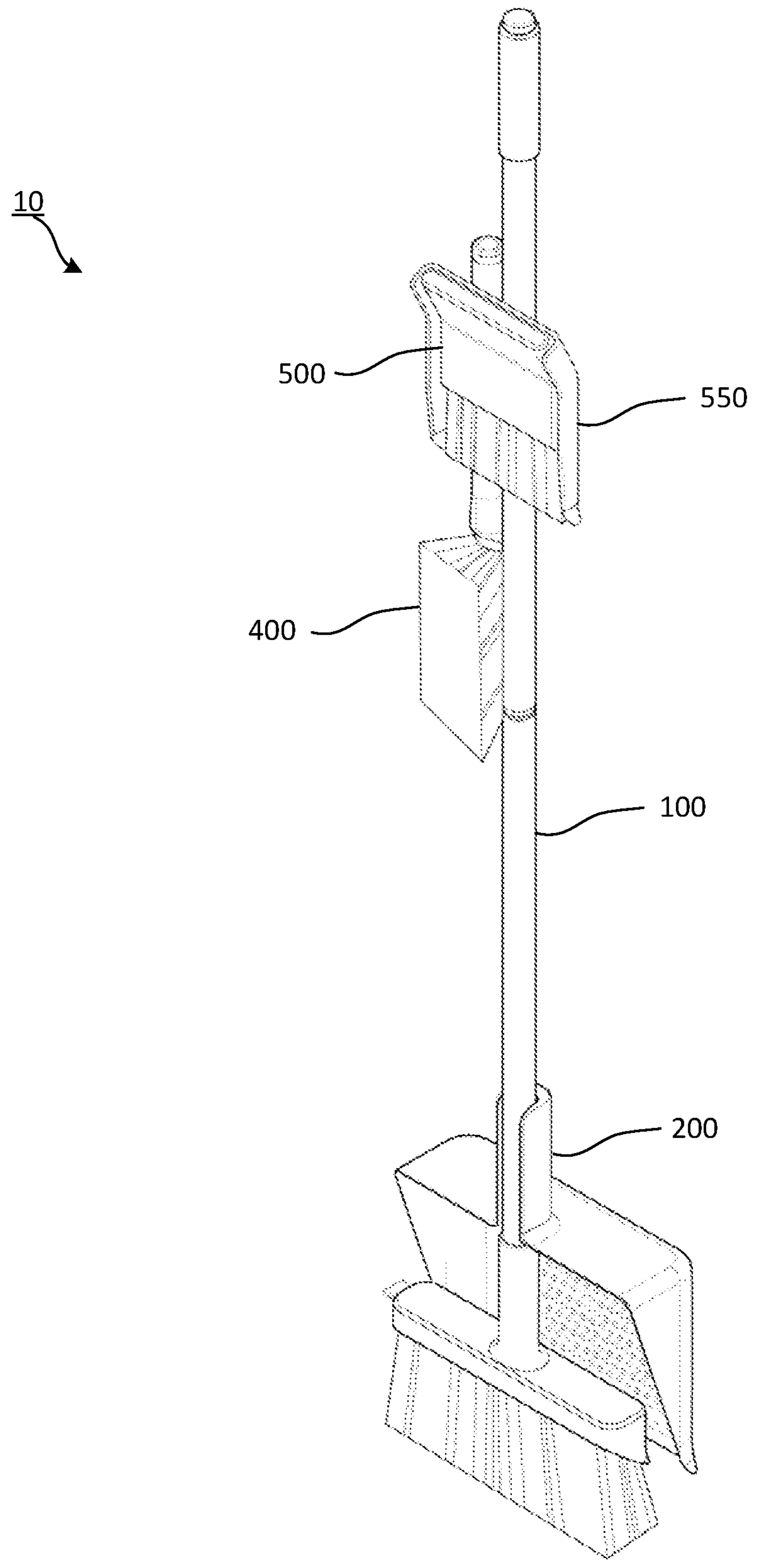
FIG. 1 is a front perspective view of a magnetic cleaning set according to the subject disclosure.

Particular embodiments of the subject disclosure will now be described in greater detail with reference to the figures.

The subject disclosure is described with reference to the drawings, wherein like reference numerals are used to refer to like elements throughout. In the following description, for purposes of explanation, numerous specific details are set forth in order to provide a thorough understanding of the present disclosure. It may be evident, however, that the present disclosure may be practiced without these specific details.

It should be noted that the described components of the present subject disclosure are reversibly attachable to other components, such that the components are attachable and detachable, modular and substitutable for other parts. In essence none of the parts are “permanently” or fixedly attached, which allows for versatility in mixing and matching the described parts and other parts not described bot contemplatable after considering the present subject disclosure.

Figure 2:
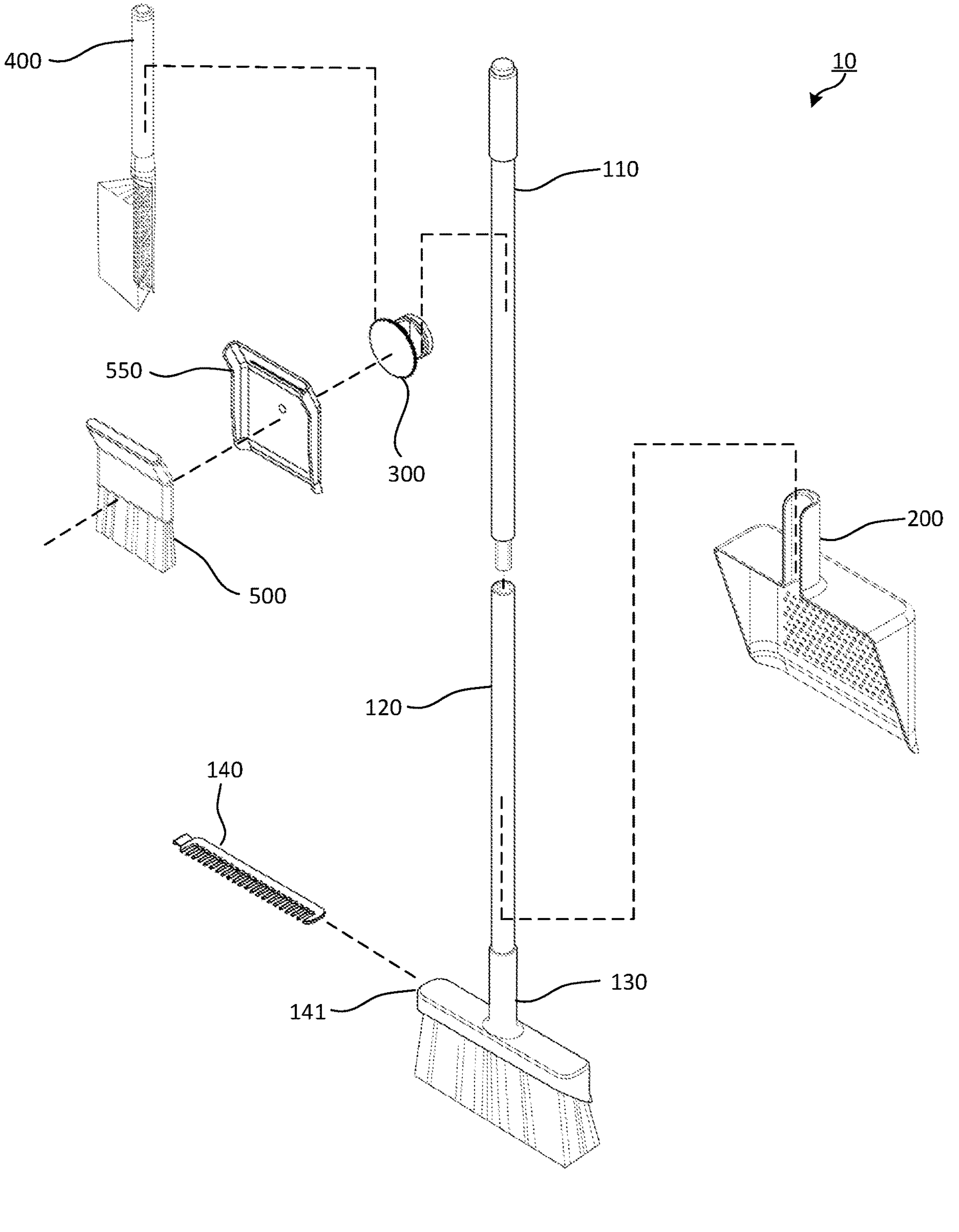
FIG. 2 is an exploded perspective view of the magnetic cleaning set.

FIGS. 1-2 shows a magnetic cleaning set 10. Referring to FIG. 2, the magnetic cleaning set 10 has a magnetic mount 300, a broom 100 (see FIG. 1), a dustpan 200, a handheld broom 400, a mini broom 500, and a mini dustpan 550. The magnetic mount 300 may be secured to a wall or another flat object and can hold the broom 100, the handheld broom 400, and the mini broom 500 simultaneously through magnetic attraction. The broom 100 is adapted to receive the dustpan 200 and the mini broom 500 is adapted to receive the mini dustpan 550. The broom 100 is comprised of a magnetically detachable rod 110, a broomstick 120, and a broomhead 130. The broomhead 130 contains a comb slot 141 that receives a comb 140.

Figure 3:
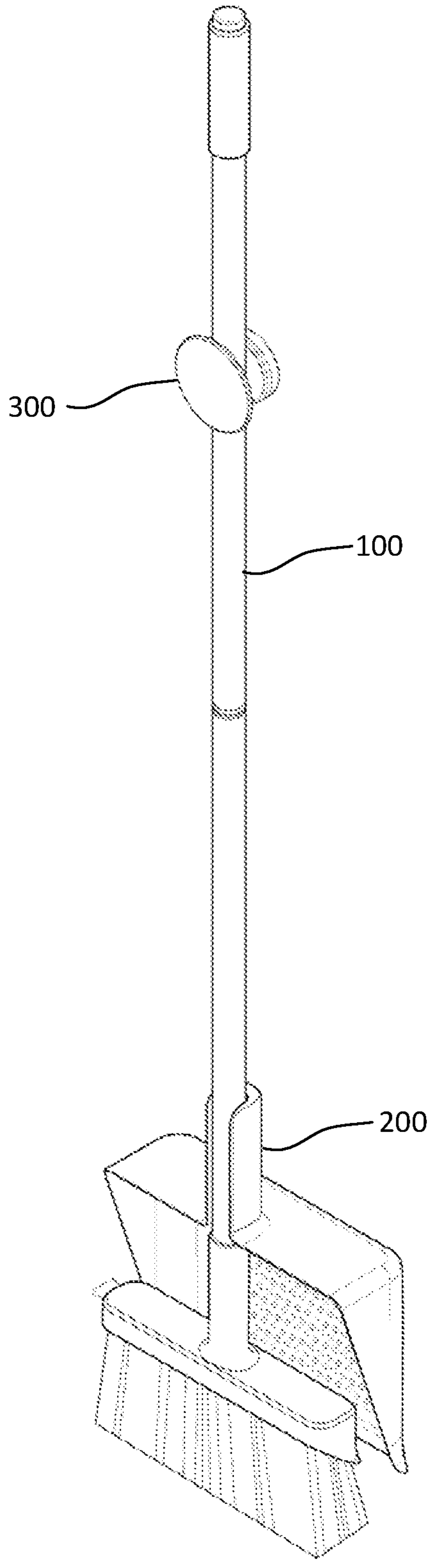
FIG. 3 is a perspective view of an assembly of a dustpan mounted on to a broom and the broom mounted onto a magnetic mount.
Figure 4:
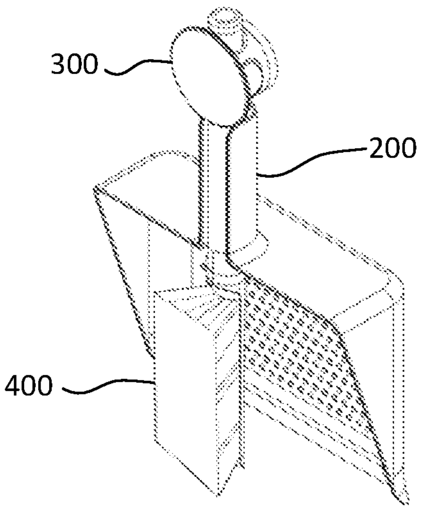
FIG. 4 is a perspective view of the dustpan mounted onto a handheld broom and the handheld broom mounted on to the magnetic mount.
Figure 5:
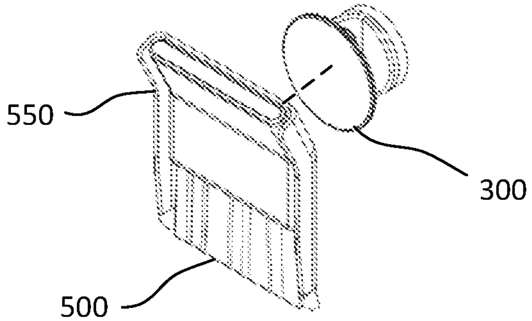
FIG. 5 is a perspective view of a mini brush and a mini dustpan mounted on to the magnetic mount.

FIGS. 3-5 show the various assemblies that can be separated from the magnetic cleaning set 10 shown in FIGS. 1-2. FIG. 3 shows the broom 100 hanging from the magnetic mount 300 with the dustpan 200 attached to the broom 100. FIG. 4 shows the handheld brush 400, in place of the broom 100 (see FIG. 3), hanging from the magnetic mount 300 with the dustpan 200 connected to the handheld brush 200. FIG. 5 shows the mini brush 500 and the mini dustpan 550 connected together. The mini brush 500 and mini dustpan 550 combination are magnetically mounted on to the magnetic mount 300.

Figure 6:
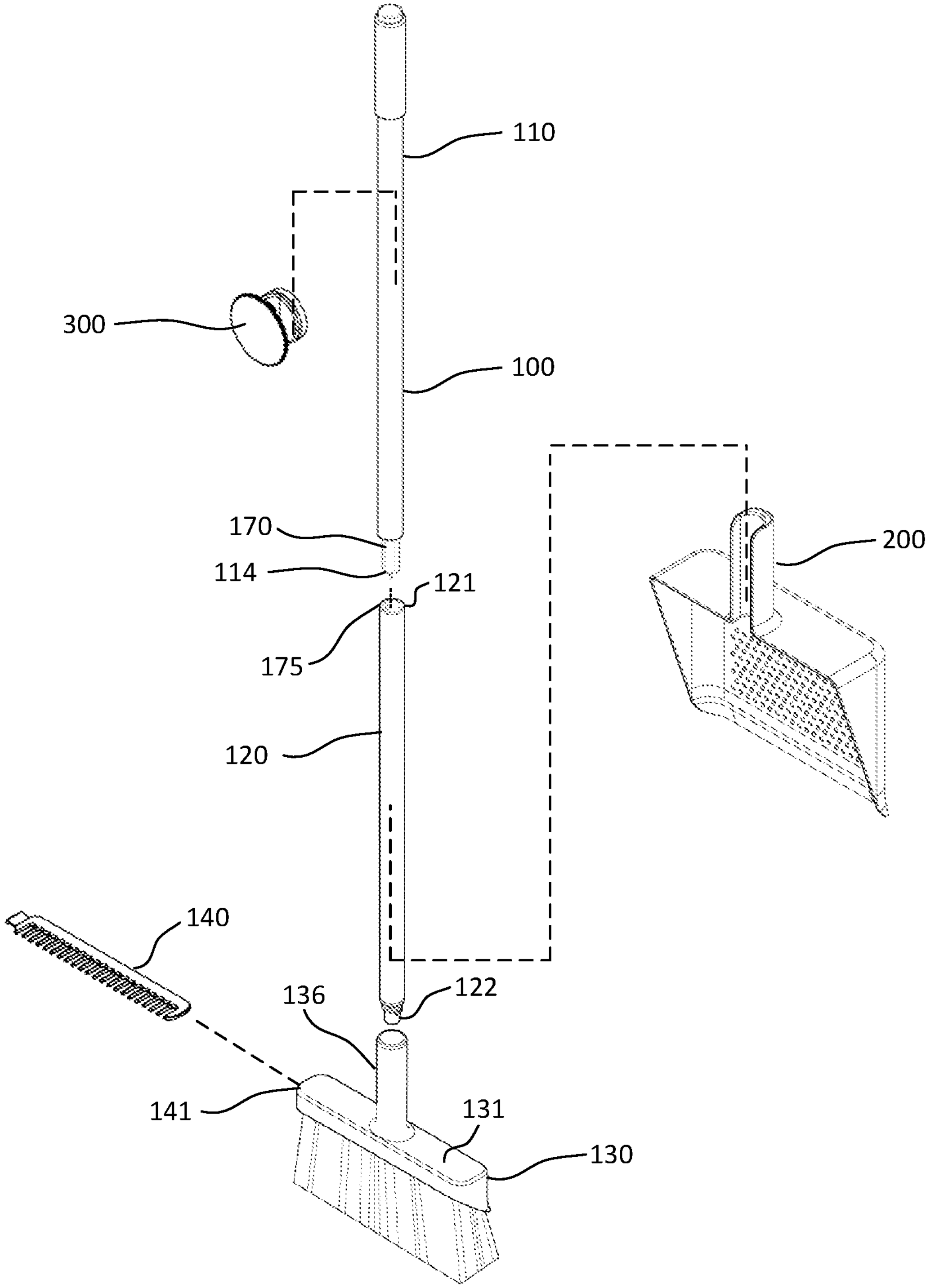
FIG. 6 is an exploded view of the assembly shown in FIG. 3.

FIG. 6 shows an exploded view of the broom 100 with the dustpan 200 attached therein. The broom 100 comprises the broomhead 130, the broomstick 120, and the magnetically detachable rod 110. A rod second end 114 of the magnetically detachable rod 110 contains an upper attachment mechanism 170 that mates with a lower attachment mechanism 175 located on a broomstick top 121. The mating of the magnetically detachable rod 110 and the broomstick 120 will be described in further detail later on. Similarly, a broomstick bottom 122 connects to the broomhead 130 through a tubular section 136 located on a top wall 131 of the broomhead 130. The mating of the broomhead 130 and the broomstick 120 will also be described in further detail later on. The dustpan 200 may connect to any longitudinal portion along the magnetically detachable rod 110 or the broomstick 120. The comb 140 can be inserted into and removed from the comb slot 141 that is adapted to receive the comb 140. Lastly, the broom 100 can be mounted onto the magnetic mount 300 using either the magnetically detachable rod 110 or the broomstick 120. When mounted, the comb 140 is inserted into the comb slot 141 and the dustpan 200 is mounted onto the magnetically detachable rod 110 or the broomstick 120.

Figure 7:
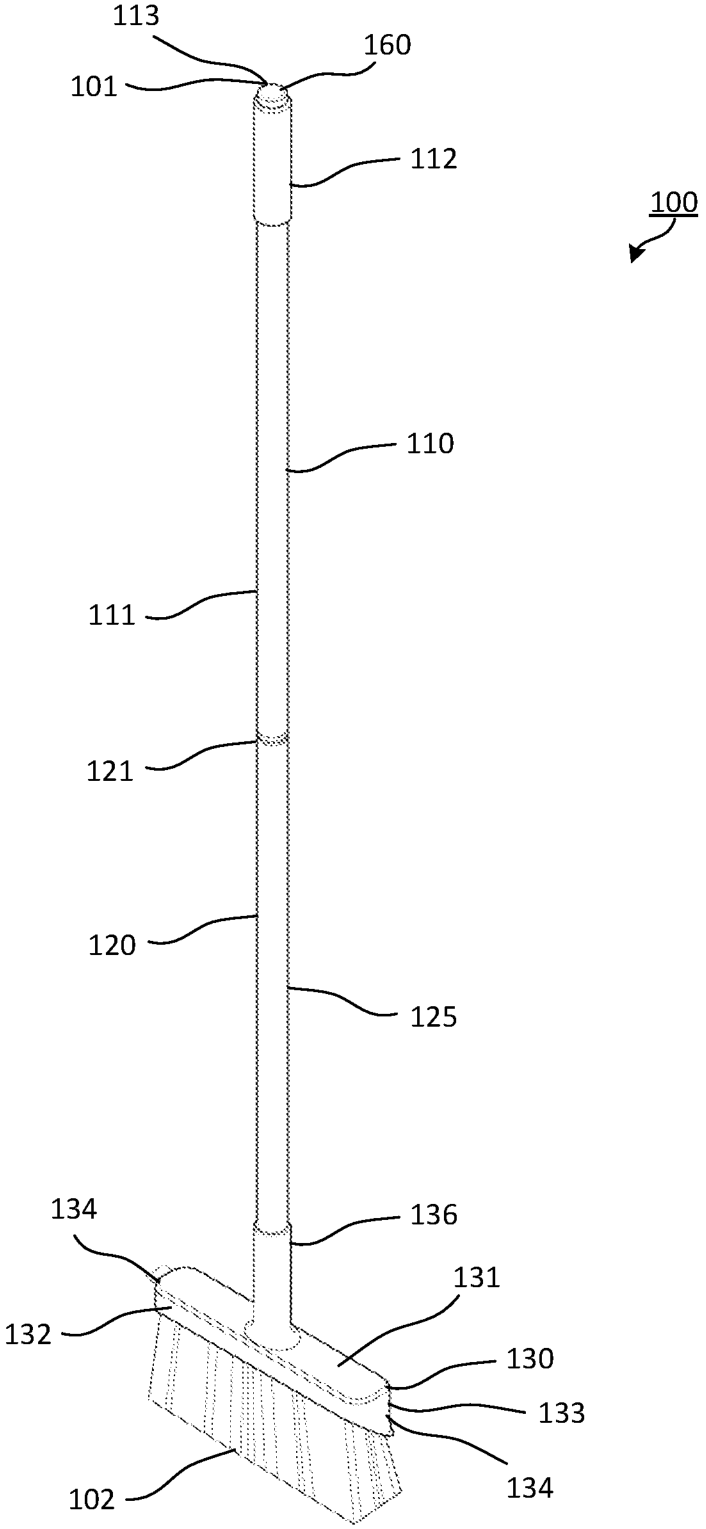
FIG. 7 is a perspective view of the broom.
Figure 8:
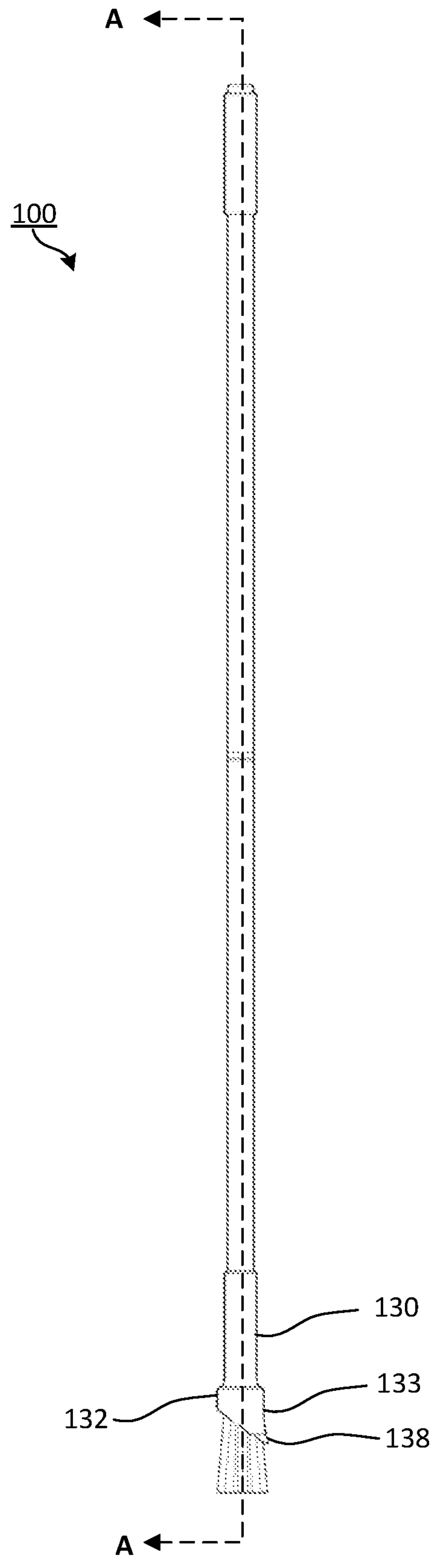
FIG. 8 is a left side view of the broom.

FIGS. 7-10 show various views of the broom 100, while FIGS. 11A-11E show a cross section of the broom 100 taken along section lines A-A in FIG. 8.

As shown in FIG. 7, the magnetically detachable rod 110 extends from a first end 101 of the broom 100 towards a second end 102. The magnetically detachable rod 110 may be a cylindrical rod. Alternatively, the magnetically detachable rod 110 may be another shape such as a square, oval, or a shape with multiple sides such as an octagon. In addition, the magnetically detachable rod 110 may have a hollow core. However, the magnetically detachable rod 110 may instead be filled rather than having a hollow core.

A rod portion 111 of the magnetically detachable rod 110 may be made of a ferromagnetic material such that the rod portion 111 may be attracted to a magnetic component. The magnetic attraction of the rod portion 111 to a magnetic component will allow the broom 100, or even the magnetically detachable rod 110 by itself, to be mounted to a magnetic hook or a magnetic component through magnetic attraction. Alternatively, the rod portion 111 may be made of other materials as well, such as wood, plastic, or any other non-pliable material. The rod portion 111 may also be covered by a thin coating (not shown) of a material such as plastic or silicone that will improve the aesthetics of the rod portion 111. The thin coating will allow for any magnetic attraction to occur between the rod portion 111 and another magnetic component. In addition, the thin coating may increase the fictional properties of the rod portion 111 in order to prevent slip between the rod portion 111 and another object.

A handle 112 may be disposed near a rod first end 113. The handle 112 may be made of a pliable material such as a foam-like material, that circumferentially or radially surrounds a portion of the rod portion 111. The length of the handle 112 may be large enough in order for a user to grip the handle 112 with their hand. Alternatively, the handle 112 may be longer as well. The purpose of the handle 112 is to allow the user to comfortably grip the magnetically detachable rod 110. The location of the handle 112 near the rod first end 113 also signifies to a user how the magnetically detachable rod 110 should be held. The handle 112 surrounds a push button 160 that is disposed at the rod first end 113.

Figure 11A:
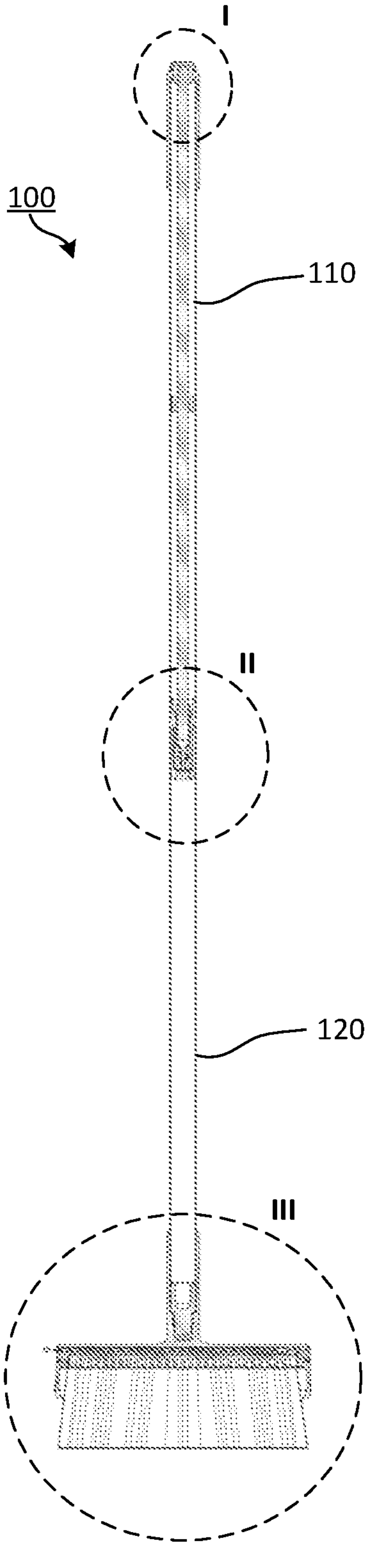
FIG. 11A is a sectional view of the broom taken at section lines A-A in FIG. 8
Figure 11B:
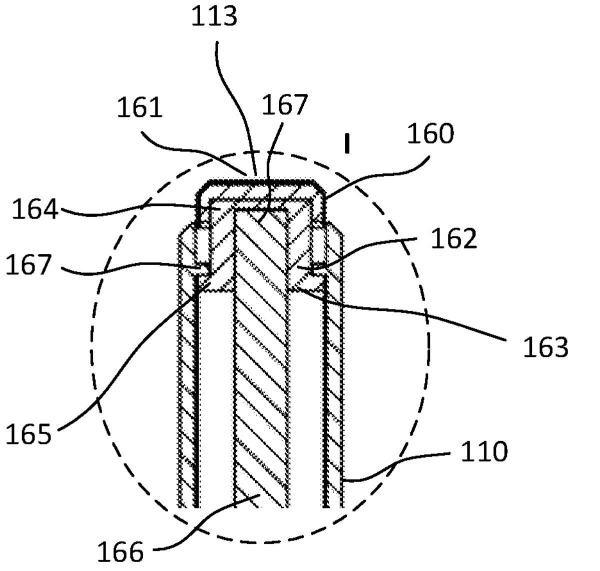
FIG. 11B is an enlarged view of the circled portion labeled "I" located at the top of FIG. 11A.

As shown in FIGS. 7, and 11B, the push button 160 may be disposed at the rod first end 113. Referring to FIG. 11B, a surface 161 of the push button 160 may be circular in shape. Alternatively, the surface 161 of the push button 160 may be square, hexagonal or any other shape. The push button 160 may be smaller in diameter (or alternatively in width) than the magnetically detachable rod 110. The tolerance between the push button 160 and the magnetically detachable rod 110 allows the push button 160 to move slightly downward into the magnetically detachable rod 110 when the push button 160 is pressed. Alternatively, the push button 160 may have a configuration such that there is larger diameter (or width) portion of the push button 160 that acts as a stop when depressed to allow disengagement of the magnetically detachable rod 110 from another object.

Below the surface 161 of the push button 160, the push button 160 contains a retaining member 162 that holds the push button 160 in position. The retaining member 162 may be fixedly attached to the push button 160 or substantially in contact with the push button 160. The retaining member 162 may be a cylindrical cap, having an open end 163 and a closed end 164. A shoulder or retaining skirt 165 extends radially outward at the open end 163 of the retaining member 162. Alternately, instead of being cylindrical, the retaining member 162 may be similar in shape to the magnetically detachable rod 110 such that the retaining member 162 can move longitudinally along the magnetically detachable rod 110. The closed end 164 of the retaining member 162 is substantially in contact with the push button 160. The open end 163 of the retaining member 162 is adapted to receive a first end 167 of a thin shaft or wire 166 that is substantially rigid. The retaining skirt 165 is positioned beneath an inward ledge 169, the inward ledge 169 located near the rod first end 113 within the magnetically detachable rod 110. The inward ledge 169 acts as a stop or barrier to prevent the retaining member 162 from moving further upward toward the rod first end 113.

Figure 12A:
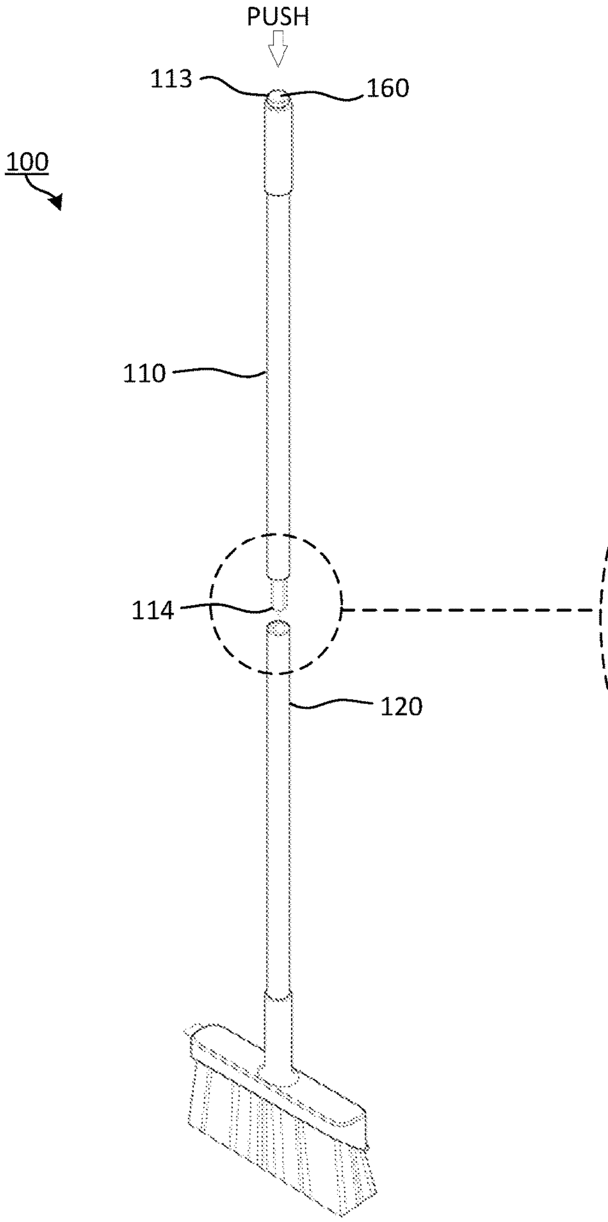
FIG. 12A is a perspective view of the broom, and the resulting disconnection of a magnetically detachable rod from a broomstick when a push button is pressed.
Figure 12B:
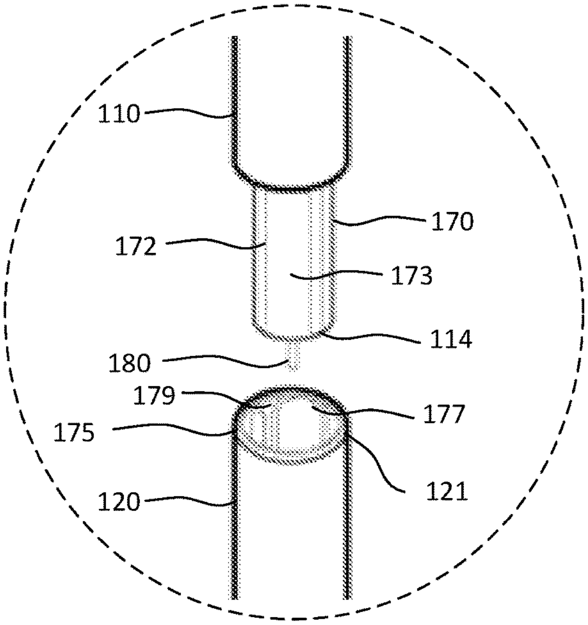
FIG. 12B is an enlarged cross sectional front view of FIG. 12A taken at the circled portion in FIG. 12A.

When the push button 160 is pressed, the push button 160 extends downwards towards the rod second end 114 (see FIG. 12B). As a result, the retaining member 162, and the wire 166 therein, is pushed or descended downward towards the rod second end 114 as well. When the push button 160 is released, a biasing element such as a spring, causes the wire 166, as well as the retaining member 162, to extend back upward toward the rod first end 113. The wire 166 and the retaining member are 162 eventually stopped due to the retaining skirt 165 coming into contact with the inward ledge 169. The upward movement of the retaining member 162, encouraged by a biasing element, causes the push button 160 to move back up into the unpressed state.

Figure 11C:
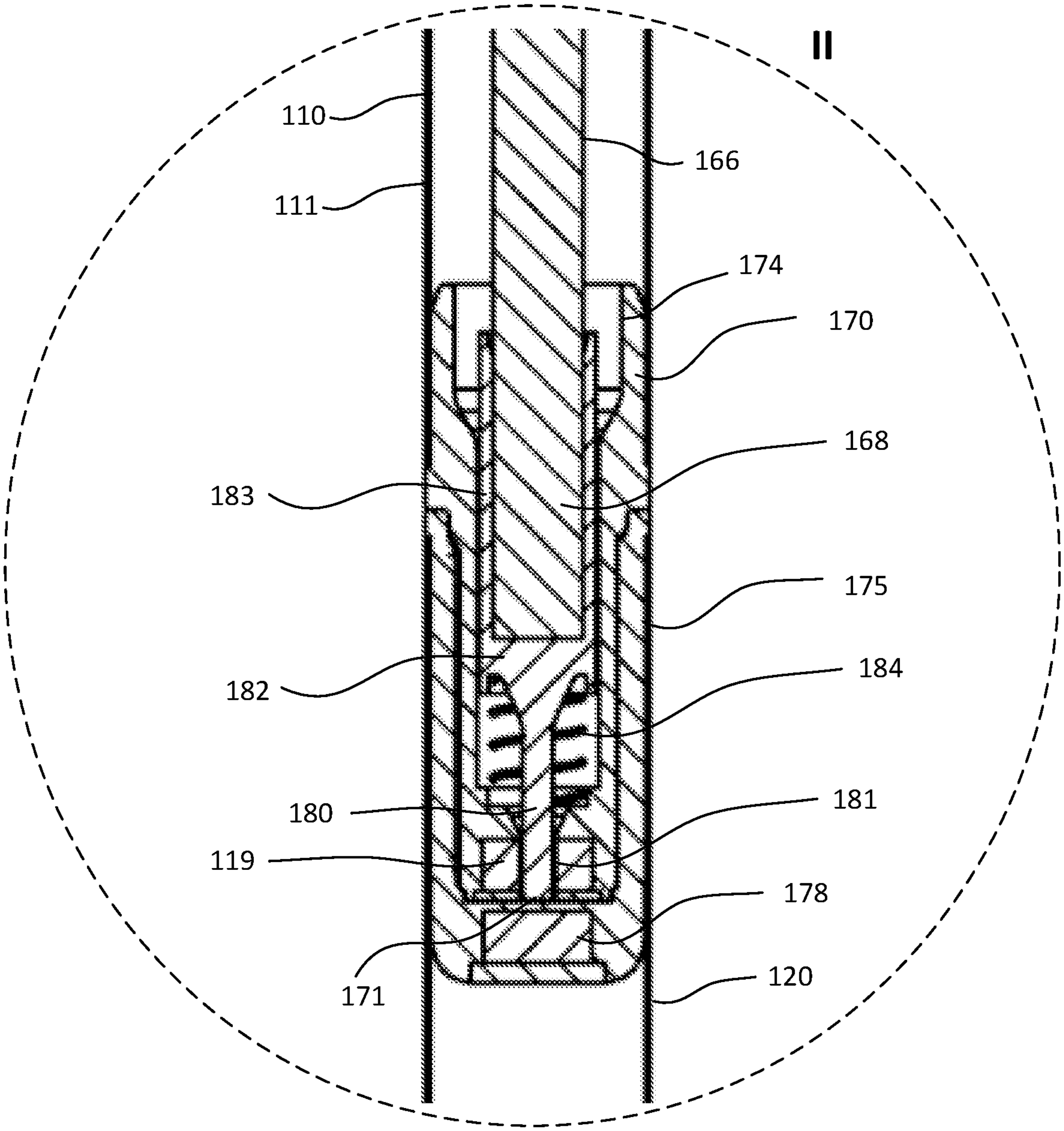
FIG. 11C is an enlarged view of the circled portion labeled "II" located at the middle of FIG. 11A.

Referring to FIG. 11C, the wire 166 within the magnetically detachable rod 110 extends from the retaining member 162 (see FIG. 11B) downward towards the rod second end 114 (see FIG. 12B). The rod second end 114 contains the upper attachment mechanism 170. The upper attachment mechanism 170 may be a male cap that can be fitted onto the rod portion 111. The upper attachment mechanism 170 extends longitudinally from the rod portion 111 towards the rod second end 114. At the rod second end 114, the upper attachment mechanism 170 has an aperture 171 that can be adapted for an ejecting pin 180 to pass through. Near the aperture 171, the upper attachment mechanism 170 may have a first magnetic connecting piece 119. The first magnetic connecting piece 119 may be a magnetic component or a ferromagnetic material. The first magnetic connecting piece 119 can also be a male snap lock or another similar mechanism to connect the magnetically detachable rod 110 with another rod. The first magnetic connecting piece 119 may be positioned like a ring around the aperture 171 at the rod second end 114. Alternatively, the connecting piece 119 may also be adjacent to the aperture 171.

The upper attachment mechanism 170 may be made of a resilient or non-pliable material such as plastic or metal.

As shown in FIG. 12B, the upper attachment mechanism 170 may have male mating bosses 172 on an outer surface 173 of the male cap 170. The male mating bosses 172 may be protrusions or male threading that are adapted to fit with female mating grooves with similar receiving extrusions. Alternatively, the male mating bosses 172 may be extrusions or female threaded portions that are adapted to fit within male threaded portions or protrusions.

As shown in FIG. 11C, in a rest position, the ejecting pin 180 is located on an inner surface 174 of the upper attachment mechanism 170 and substantially underneath the aperture 171, within the upper attachment mechanism 170. When the push button 160 (see FIG. 11B) is pressed, an ejecting end 181 of the ejecting pin 180 extends through the aperture 171. The ejecting pin 180 has an ejecting end 181 and a base end 182. The ejecting end 181 may be a thin rod with a diameter or thickness smaller than the aperture 171 located on the upper attachment mechanism 170. The ejecting end 181 may be cylindrical, square or any other accommodating shape. The base end 182 of the ejecting pin may be larger in width or diameter than the ejecting end 181. The base end 182 may also be larger in diameter than the aperture 171 on the upper attachment mechanism 170 such that only the ejecting end 181 of the ejecting pin 180 can pass through the aperture 171. Alternatively, the base end 182 may be smaller in width or diameter than the ejecting end 181. The base end 182 may also contain an ejecting bore 183 that is adapted to securely fit the wire 166. The ejecting bore 183 may have mating grooves (not shown) in order to fasten the wire to the ejecting pin 180. Alternatively, the ejecting pin 180 can be secured to the wire 166 through a friction fit between the ejecting bore 183 and the wire 166, or alternatively by an adhesive that secures the ejecting pin 180 and the wire 166 together.

Figure 12C:
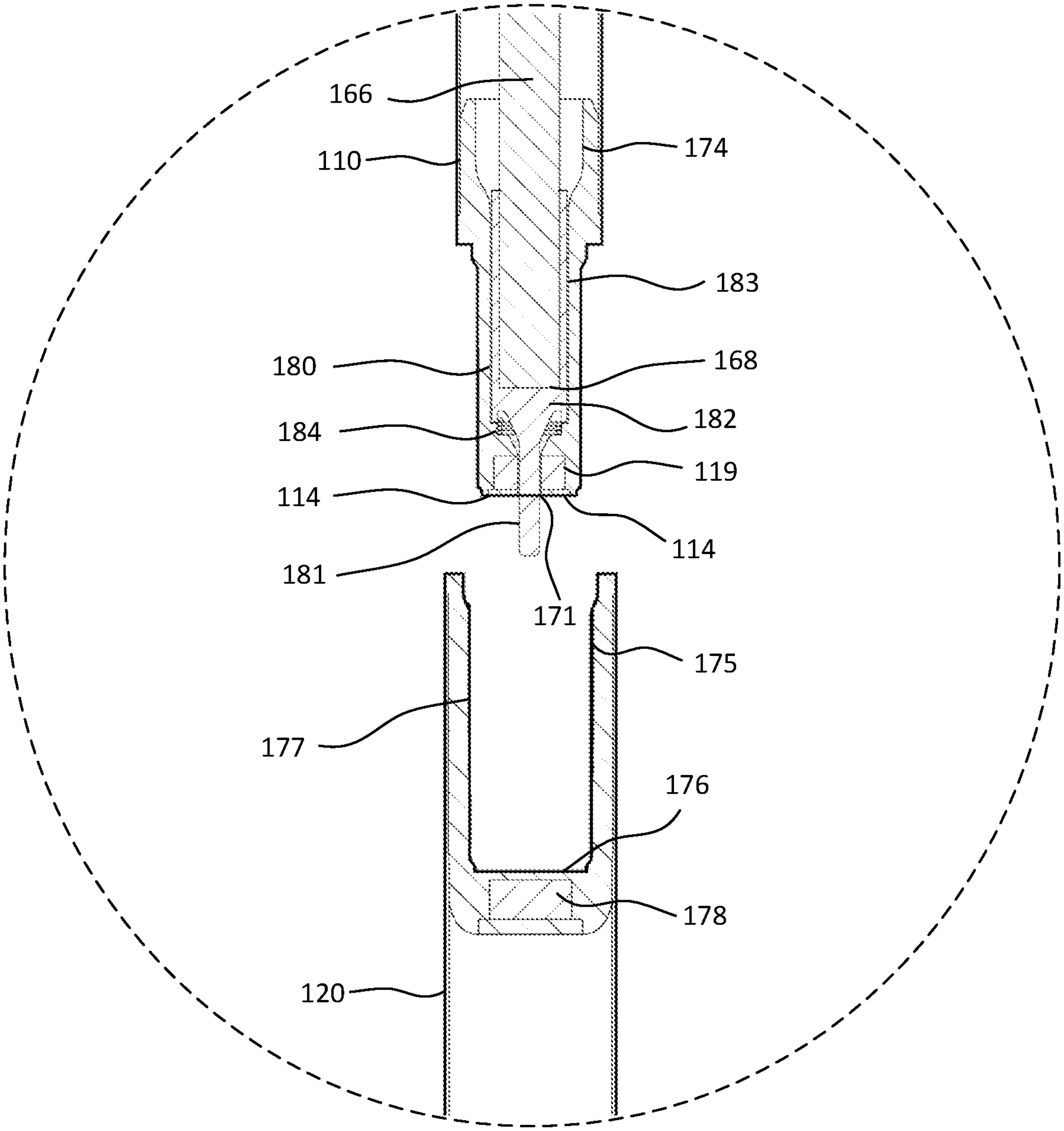
FIG. 12C is a cross sectional front view of the broom taken at the circled portion in FIG. 12.
Figure 13:
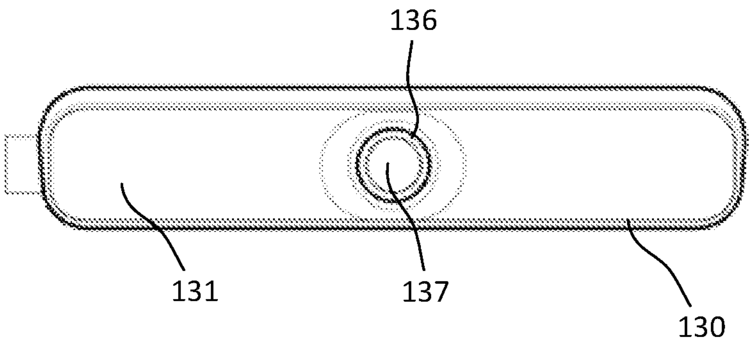
FIG. 13 is a top view of the broom.

As shown in FIG. 12C, When the push button 160 (see FIG. 11B) is pressed down, the retaining member 162 (see FIG. 11B) in contact with the push button 160 moves downward as well. The downward force of the retaining member 162 causes the wire 166, adapted therein, to move downward as well. The wire second end 168, fitted into the ejecting bore 183 of the ejecting pin 180, pushes the ejecting pin 180 downward and causes the ejecting end 181 to extend through and out of the aperture 171.

As shown in FIGS. 11C and 12C, an ejecting spring 184 may be located around the ejecting end 181 of the ejecting pin 180. Referring to FIG. 11C, the ejecting spring 184 may be larger in diameter than the ejecting end 181 such that the ejecting end 181 can pass through the ejecting spring 184 when the ejecting spring 184 is compressed. In addition, the ejecting spring 184 may be larger in diameter than the aperture 171. The difference in size would ensure that the ejecting spring 184 cannot pass through the aperture 171, yet the ejecting end 181 can pass through the ejecting spring 184 and the aperture 171. The ejecting spring 184 may also be smaller than the base end 182 of the ejecting pin 180 such that the base end 182 cannot pass through the ejecting spring 184. The size constraints between the ejecting spring 184, the base end 182, and the aperture 171, causes the ejecting spring 184 to compress between the base end 182 and the rod second end 114, around or near the aperture 171, when a when a force is acted upon the ejecting pin 180. Alternatively, the ejecting end 181, the ejecting spring 184, the base end 182 and the aperture 171 are not constrained in size.

As shown in FIG. 12C, when a downward force is acted upon the ejecting pin 180, such as the pressing of the push button 160 (see FIG. 12A), the ejecting pin 180 is pushed downwards towards and past the rod second end 114. As a result, the base end 182 of the ejecting pin 180 pushes the ejecting spring 184 downward towards the rod second end 114 as well. The downward force of the base end 182 onto the ejecting spring 184 causes the ejecting spring 184 to compress between the base end 182 and the rod second end 114, near the aperture 171. The compressing of the ejecting spring 184 allows the ejecting end 181 of the ejecting pin 180 to pass through the compressed ejecting spring 184 and out of the aperture 171. When the force is removed, such as the release of the push button 160, the expansion force of the compressed ejecting spring 184, causes the ejecting spring 184 to expand, and with it, push the ejecting pin 180 upwards back through the aperture 171 and back through the ejecting spring 184.

As shown in in FIGS. 7, 11A, and 11C-11D, the broomstick 120 is a long rod that may be cylindrical. Referring to FIG. 7, the broomstick 120 extends from the rod portion 111 towards the second end 102 of the broom 100. The broomstick 120 may contain similar material properties to the magnetically detachable rod 110. For example, as mentioned previously, a broomstick rod 125 may be made of a ferromagnetic material, similar to the rod portion 111 of the mechanically detachable rod 110.

As shown in FIGS. 11C and 12C, the lower attachment mechanism 175 is located at the broomstick top 121 (see FIG. 12B) which engages and disengages with the upper attachment mechanism 170. Referring to FIG. 12C, the lower attachment mechanism 175 is a female cap having an inner base 176 and inner sidewalls 177. The lower attachment mechanism 175 is adapted to receive a male cap such as the upper attachment mechanism 170. A second magnetic connecting piece 178 is located on or beneath the inner base 176. The second magnetic connecting piece 178 may be a magnetic component or a ferromagnetic material. The second magnetic connecting piece 178 can also be a male snap lock or another similar mechanism to connect the broomstick 120 with another rod such as the magnetically detachable rod 110. The second magnetic connecting piece 178 may be shaped like a ring and positioned on the inner base 176. Alternatively, the second magnetic connecting piece 178 may be any other shape covering a portion on or under the inner base 176.

As shown in FIG. 12B, on the inner sidewalls 177, the lower attachment mechanism 175 may contain female receiving extrusions 179 that are adapted to mate with male mating bosses 172 in the upper attachment mechanism 170. When the upper attachment mechanism 170 and the lower attachment mechanism 175 are connected together, the male mating bosses 172 and the female receiving extrusions 179 prevent the upper attachment mechanism 170 from rotating relative to the lower attachment mechanism 175.

As shown in FIGS. 7, 11C and 12B, when the broom 100 is assembled, the upper attachment mechanism 170 and the lower attachment mechanism 175 are connected together as the upper attachment mechanism 170 is located substantially within the lower attachment mechanism 175. Referring to FIG. 11C, the first magnetic connecting piece 119 and the second magnetic connecting piece 178 are connected together and prevent the upper attachment mechanism 170 and the lower attachment mechanism 175 from disengaging from each other. Referring to FIG. 12B, the male mating bosses 172 on the upper attachment mechanism 170 and the female receiving extrusions 179 on the lower attachment mechanism 175 prevent the magnetically detachable rod 110 and the broomstick 120 from rotating relative to each other.

Figure 11D:
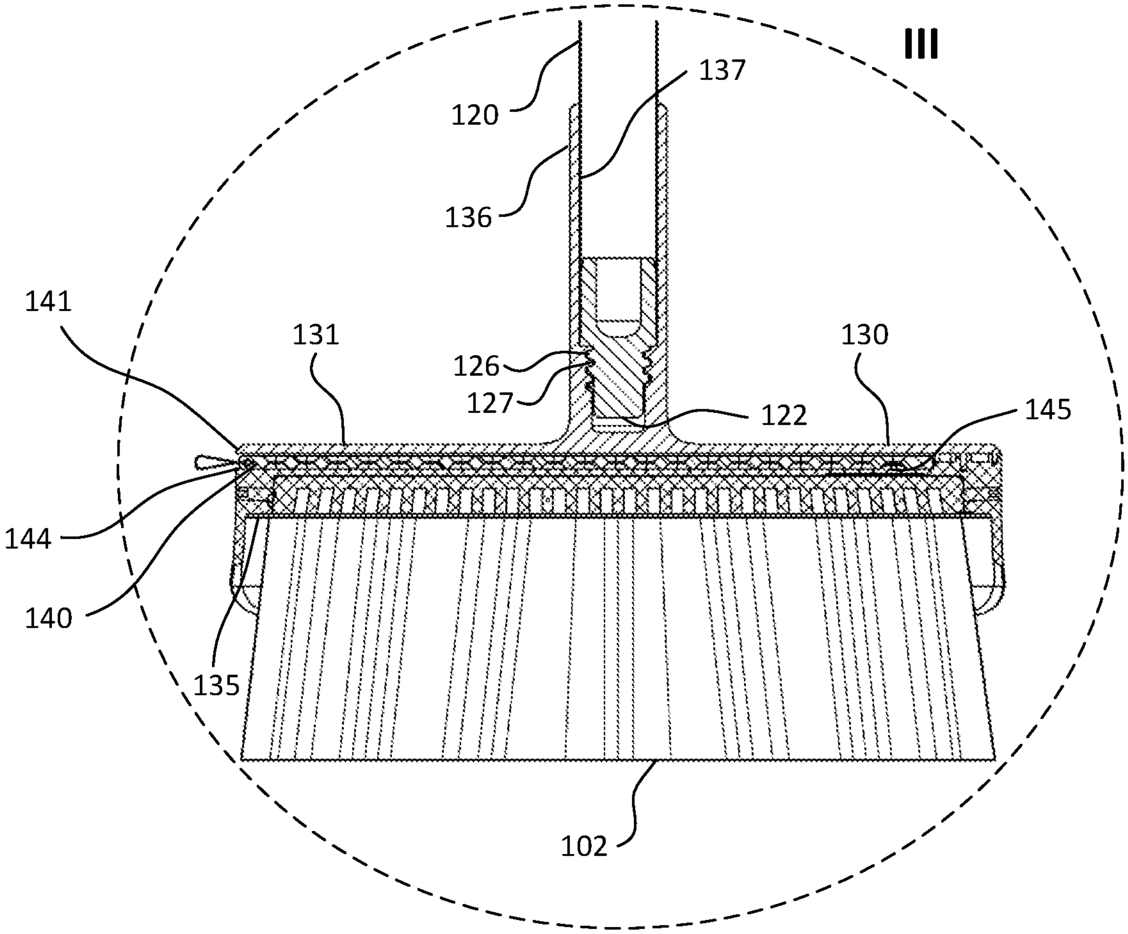
FIG. 11D is an enlarged view of the circled portion labeled "III" located at the bottom of FIG. 11A.

As shown in FIG. 11D, the broomstick bottom 122 may contain a male threaded portion 126 that can be secured to a female threaded portion 127 located within broomhead bore 137 on the broomhead 130. The male threaded portion 126 may also contain other fastening mechanisms to secure the broomstick bottom 122 to another object. For example, the male threaded portion 126 may contain a snap fit, or magnets to secure to objects with a snap fit or oppositely charged magnet or ferromagnetic material. The broomstick bottom 122 may also contain an alternate securing mechanism such as the upper attachment mechanism 170 or the lower attachment mechanism 175 described earlier.

As shown in FIGS. 7-14, the broom 100 contains the broomhead 130. Referring to FIG. 7, The broomhead 130 has the top wall 131, a front wall 132 extending perpendicularly from the top wall 131, a back wall 133 extending perpendicularly from the top wall 131, and two side walls 134 extending perpendicularly from the top wall 131 and connecting the front wall 132 to the back wall 133. A bottom wall 135 (see FIG. 14) is located beneath the top wall 131 of the broomhead 130. The walls 132, 133, 134 extend from the top wall 131 in the same direction downwards towards the second end 102 of the broom 100. Alternatively, the walls 132, 133, 134 may extend in another direction as well, such as upward.

As shown in FIGS. 7 and 11D, the tubular section 136 of the broomhead 130 extends from the top wall 131 in a direction towards the first end 101 of the broom 100. Referring to FIG. 11D, the tubular section 136 contains a broomhead bore 137 that is adapted to receive the broomstick 120 or a similar rod. The broomhead bore 137 may contain the female threaded portion 127 such that the broomstick 120, or a similar rod having the male threaded portion 126, can be twisted and tightened into the broomhead bore 137. Alternatively, the broomhead bore 137 may contain magnetic components, or any other fastening mechanisms such as a snap fit in order to fasten a rod to into the broomhead bore 137.

Figure 9:
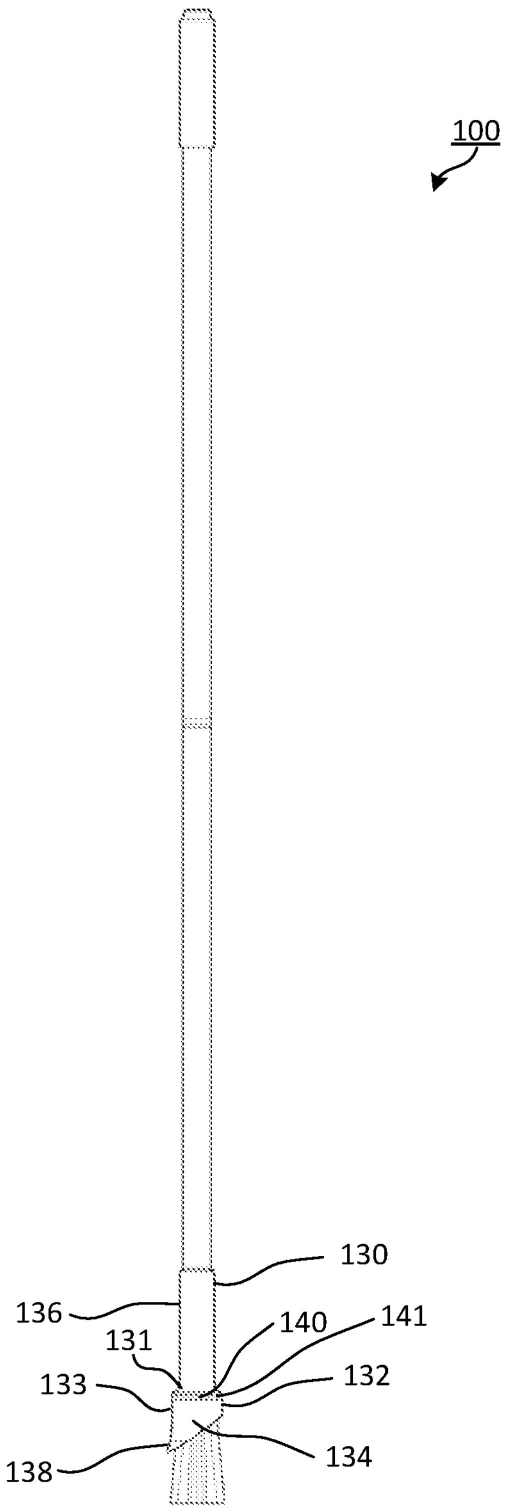
FIG. 9 is a ride side view of the broom.

As shown in FIGS. 8-9, the front wall 132 of the broomhead 130 may be shorter in height than the backwall 133. Alternatively, the backwall 133 may be shorter in height than the front wall 132. The backwall 133 may contain a scraping edge 138 that can be used to scape unwanted materials from a surface. The larger height of the backwall 133 allows the scraping edge 138 to be closer to the surface that is being cleaned. As will be discussed later on, the user can simply tilt the broomhead 130 in order to allow the scraping edge 138 to come into contact with a surface.

The scraping edge 138 may be made of any material that may be beneficial in the removal of unwanted materials, such as stuck-on food, from a surface. The scraping edge 138 can be made by a variety of materials such as hard plastic, metal, polyurethane, or even rubber. For example, the scraping edge 138 can made of a non-pliable material, such as metal, for surfaces that are not sensitive to scrapers. Alternatively, the scraping edge 138 may be made of rubber or plastic for sensitive surfaces that may be damaged by the use of a metal scraper. In addition, the scraping edge 138 may be made of rubber or polyurethane for gathering liquids on a surface similar to a squeegee.

Figure 11E:
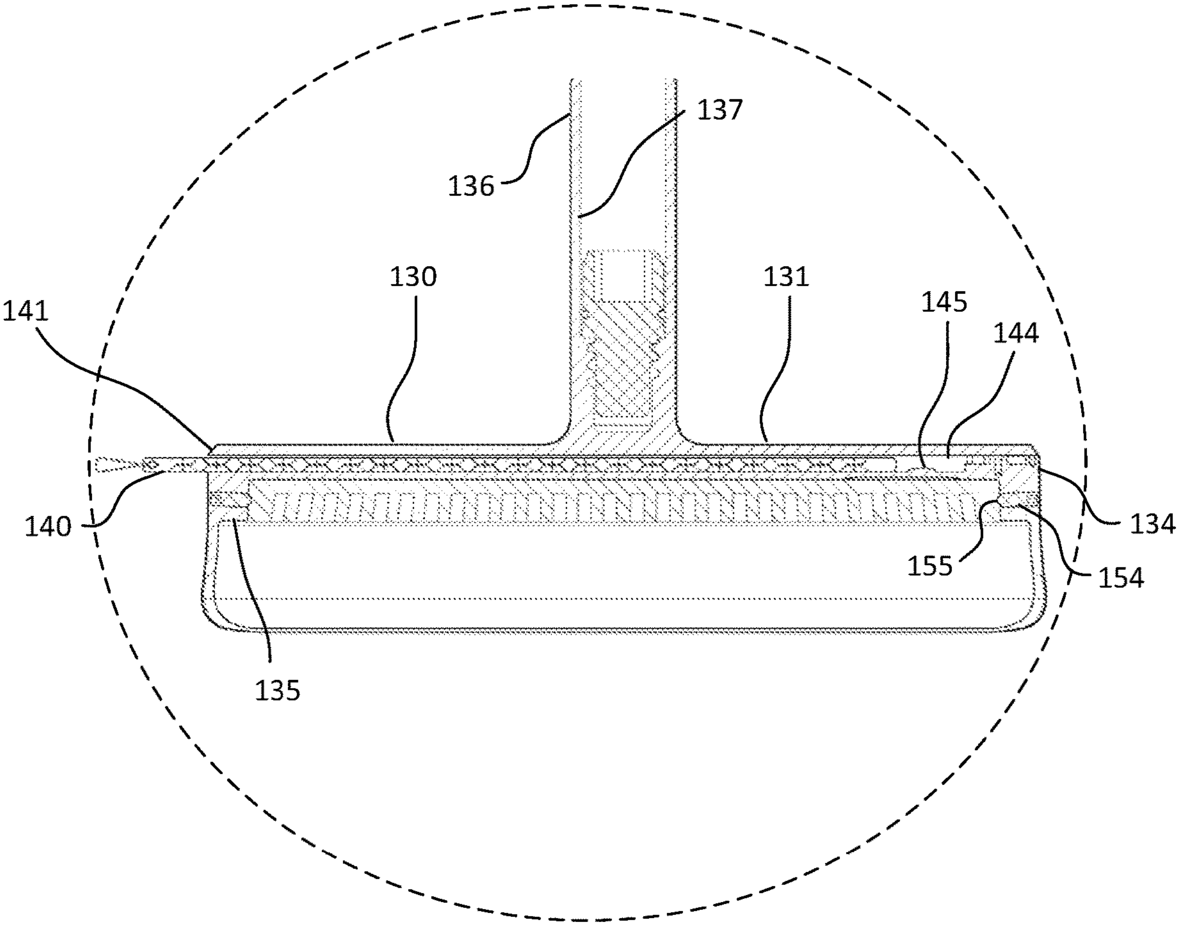
FIG. 11E is an enlarged view of the circled portion labeled "III" located at the bottom of FIG. 11A with a comb partially removed from a comb slot.

As shown in FIGS. 9 and 11E, the comb slot 141 is located on the sidewall 134 of the broomhead 130. Referring to FIG. 9, the comb slot 141 may be positioned on a side wall 134, between the top wall 131 and the bottom wall 135 (see FIG. 14). Referring to FIG. 11E, the comb slot 141 contains a receiving aperture 144 that is adapted to receive the comb 140. A locking protrusion 145 is located within the receiving aperture 144 such that the locking protrusion 145 prevents the comb 140 from slipping out of the comb slot 141 without a force applied to pull the comb 140 from engagement with the receiving aperture 145. The locking protrusion 145 may be a protrusion within the comb aperture 144 that prevents the comb 140 from slipping. Alternatively, the locking protrusion 145 may be a magnetic component that is adapted to magnetically attract to an oppositely charged magnetic component, or a ferromagnetic material, on the comb 140 (not shown).

Figure 14:
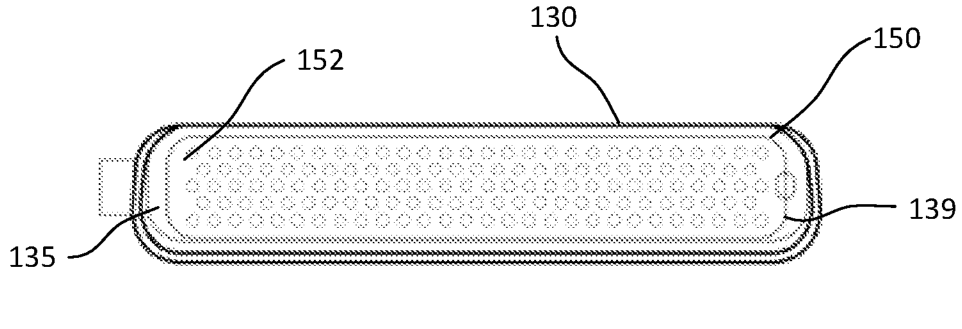
FIG. 14 is a bottom view of the broom with a removable bristle head situated therein.
Figure 15:
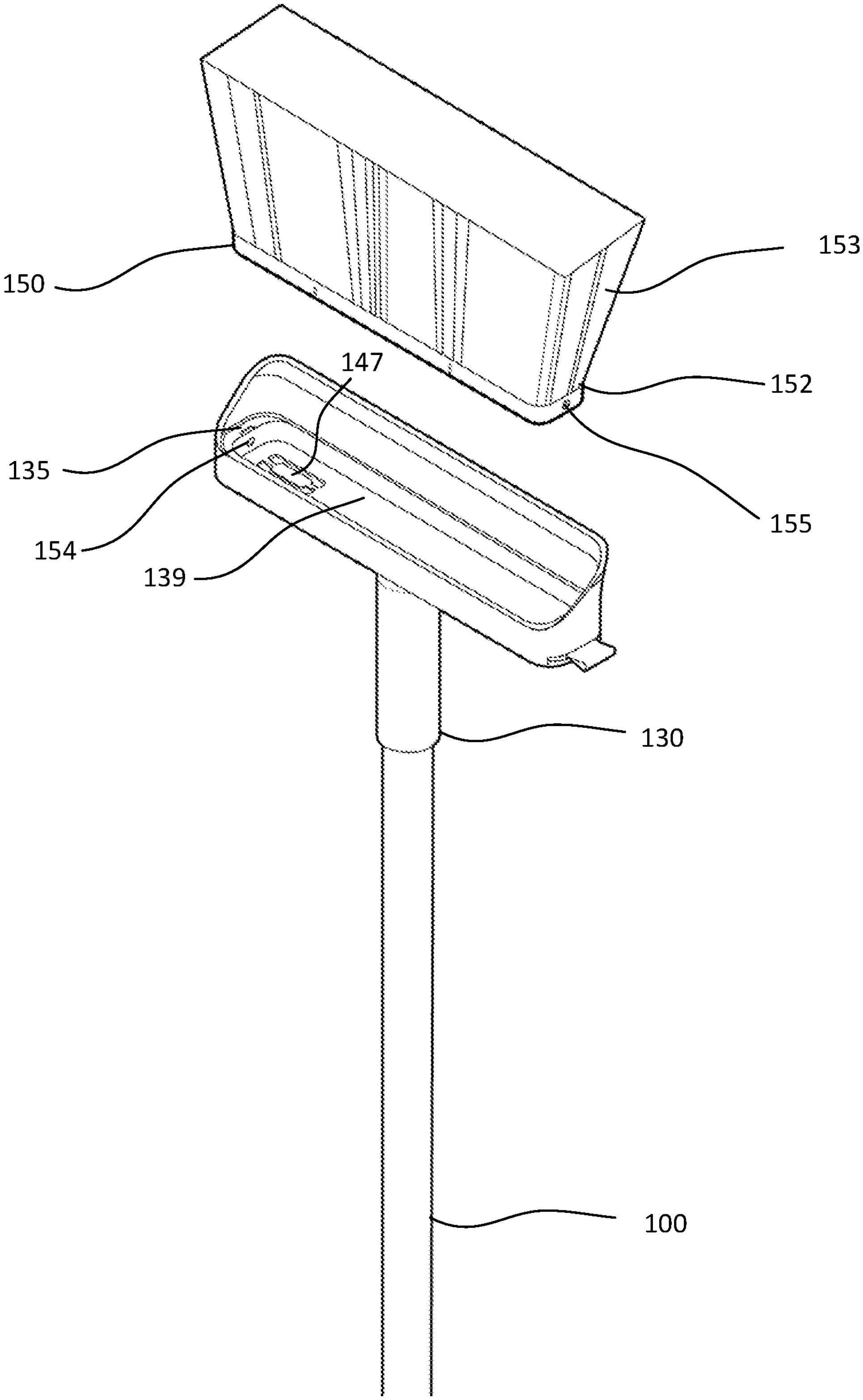
FIG. 15 is a partial perspective view of the broom with the removeable bristle head removed.

As shown in FIGS. 14-15, the bottom wall 135 contains an indent 139 that is adapted to receive a removeable bristle head base 150. Referring to FIG. 15, a plurality of broom bristles 153 extend from a bristle head bottom 152 located on the removeable bristle head base 150. When the removable bristle head base 150 is placed within the indent 139, the bristle head bottom 152 and the bottom wall 135 are substantially flush.

The broomhead 130 may contain a snap lock mechanism 154 on or near the indent 139 that connects to an oppositely mating snap lock mechanism 155 located on the removeable bristle head base 150. The oppositely mating snap lock mechanism 155 may be an indent adapted to fit the snap lock mechanism 154. Alternatively, the removable bristle head base 150 may contain fasteners such as Velcro, magnetic components, or screws in order to fasten the removable bristle head base 150 to the bottom wall 135. In the present disclosure, the snap lock mechanism 154 is a ball bearing and the oppositely attracted snap lock mechanism 155 is an indent adapted to receive the ball bearing. Lastly, the removeable bristle head base 150 may contain more than one securement mechanism to ensure that the removable bristle head base 150 is securely connected to the broomhead 130. Alternatively, the removeable bristle head base 150 may be fixedly attached to the bottom wall 135. If desired, a user can remove the removable bristle head base 150 from the bottom wall 135 of the broomhead 130 and replace the removeable bristle head base 150 with another removeable cleaning head. This would include a removeable squeegee head (not shown) or a removable mop head (not shown) depending on a user's current needs.

Figure 23:
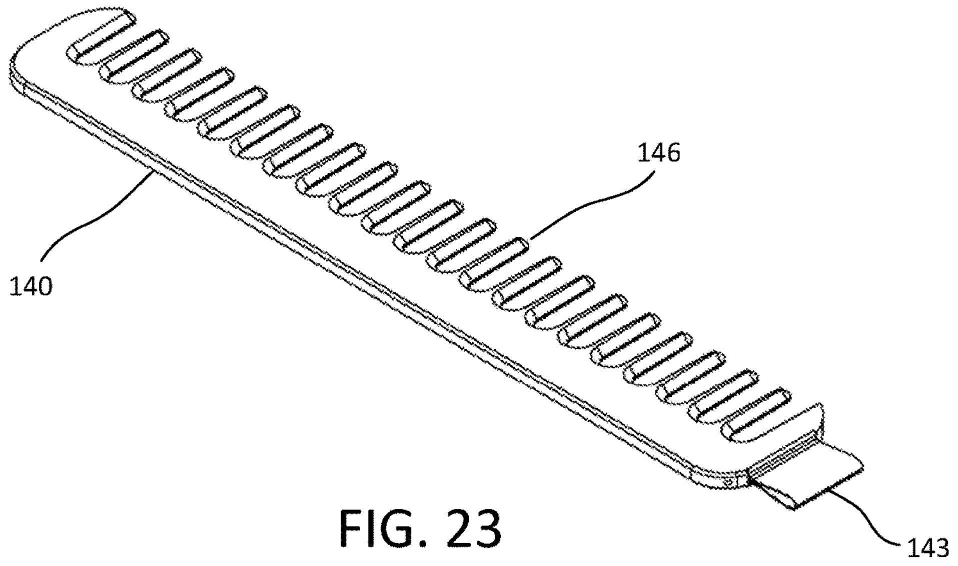
FIG. 23 is a perspective view of the comb.
Figure 24:
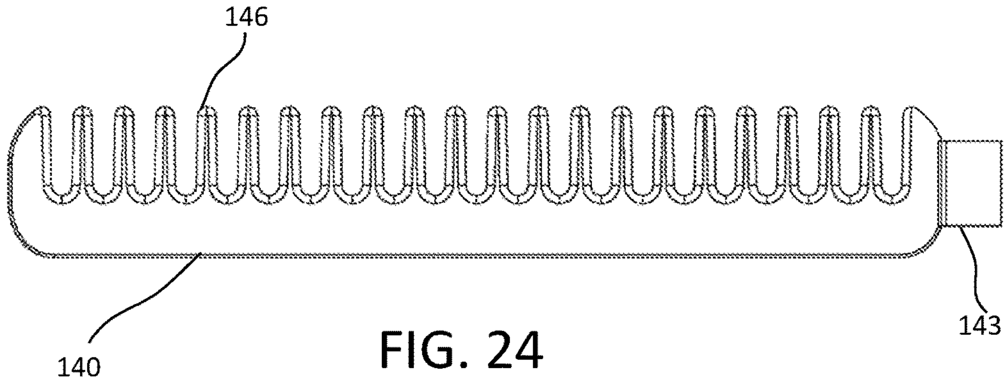
FIG. 24 is a top view of the comb
Figure 25:
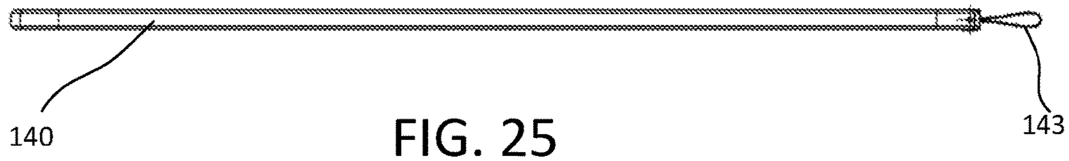
FIG. 25 is a back view of the comb
Figure 26:
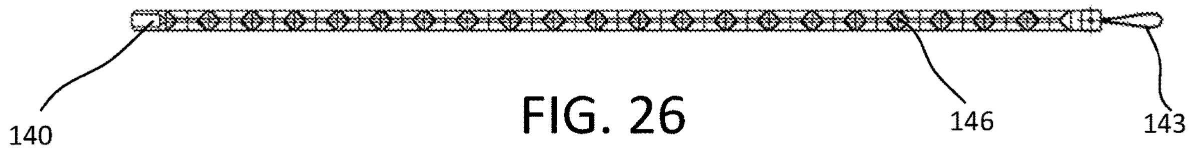
FIG. 26 is a front view of the comb.

Within the indent 139, the broomhead 130 contains a flexible catch 147 directly underneath the locking protrusion 145 (see FIG. 11D). The flexible catch 147 is a perforated area such that the flexible catch 147 may be able to move slightly up or down. Referring to FIG. 11E, when the comb 140 is inserted into the comb slot 141 and the comb 140 comes into contact with the locking protrusion 145, the resulting force of the comb 140 on the locking protrusion 145, causes the locking protrusion 145 to move slightly downward to allow for the comb 140 to pass. Once the comb 140 is fully inserted, the flexible catch 147 (see FIG. 15) moves back upward and the locking protrusion 145, now elevated, sits between a plurality of comb teeth 146 (see FIG. 23) and prevents the comb 140 from slipping out of the comb slot 141.

Figure 10:
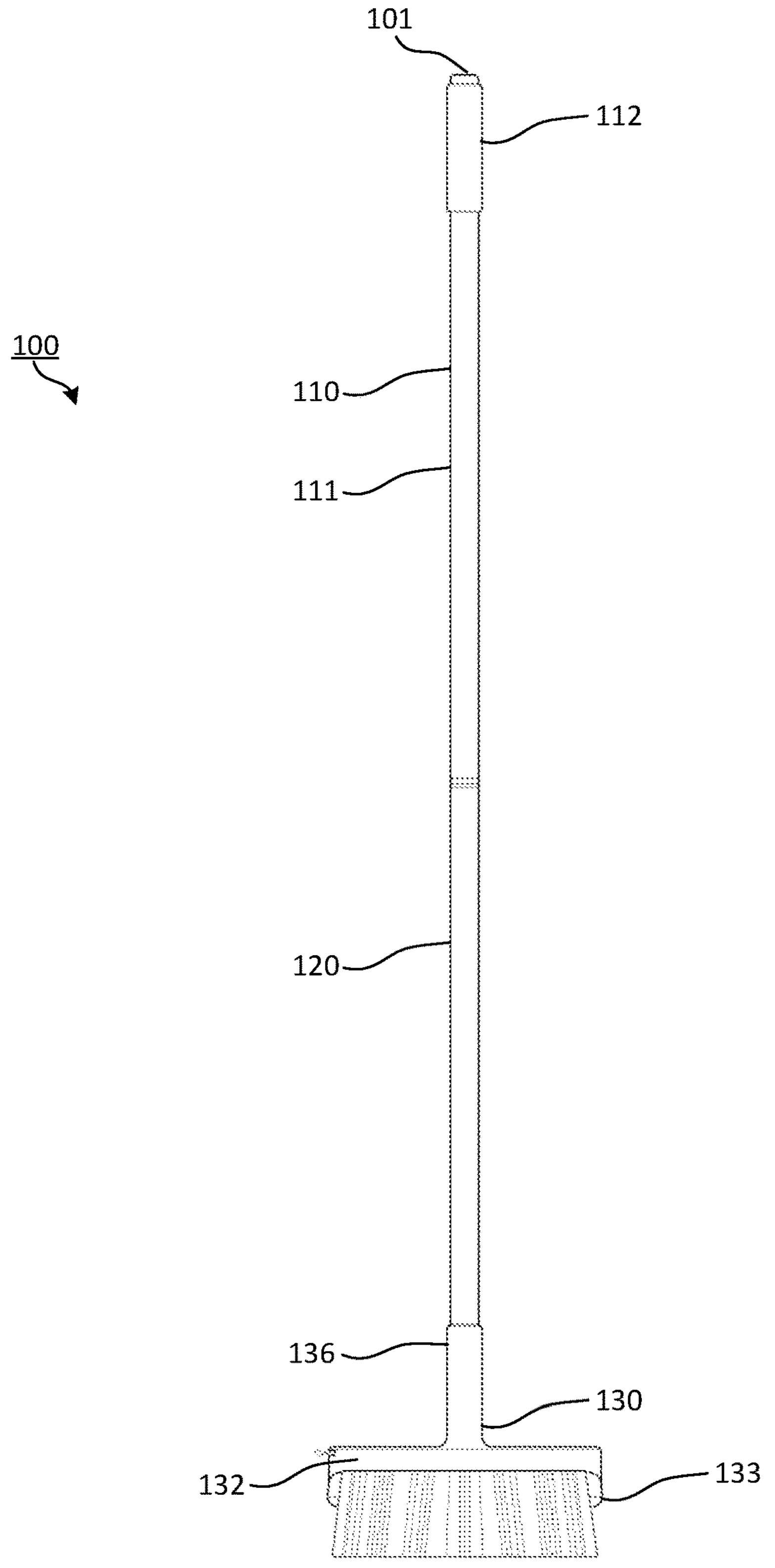
FIG. 10 is a front view of the broom.

As shown in FIGS. 10-11, the broom 100 is in an assembled state. Referring to FIG. 10, starting at the first end 101, the magnetically detachable rod 110 is connected to the broomstick 120. Referring to FIG. 11C, the upper attachment mechanism 170 is fitted into the lower attachment mechanism 175. The first magnetic connecting piece 119, located on the upper attachment mechanism 170, is magnetically attracted to the second magnetic connecting piece 178 located on the lower attachment mechanism 175. As a result, the magnetically detachable rod 110 cannot be easily removed from the broomstick 120. In addition, the male mating bosses 172 (see FIG. 12B) and the receiving extrusions 179 (see FIG. 12B) are aligned such that the magnetically detachable rod 110 and the broomstick 120 cannot rotate relative to one another when connected.

Referring to FIG. 11D and moving lower down the broom 100, the broomstick 120 is connected to the broomhead 130 through the male threaded portion 126 on the broomstick 120 and broomhead bore 137 located on the tubular section 136 of the broomhead 130. The male threaded portion 126 is inserted into the broomhead bore 137 and is fastened to the broomhead 130 by twisting the broomstick 120 into the broomhead 130 and using the male threaded portion 126 on the broomstick 120 and the female threaded portion 127 within the broomhead bore 137 to secure the broomstick 120 to the broomhead 130. Alternatively, as discussed above, the mating between the broomhead 130 and the broomstick bottom 122 may be similar to the mating between the magnetically detachable rod 110 and the broomstick 120.

As shown in FIGS. 12A-C, the broom 100 can be disassembled. Referring to FIG. 12A, the magnetically detachable rod 110 can be removed from the broomstick 120 by pressing the push button 160 located at the rod first end 113. Referring to FIG. 12C, when the push button 160 (see FIG. 12A) is pressed down with sufficient force to overcome the compressive force of the ejecting spring 184, the wire 166 is pushed downward toward the rod second end 114. The wire second end 168, in turn, pushes the ejecting pin 180 downward towards the rod second end 114 as well. The downward force of the ejecting pin 180 overcomes the compressive force of the ejecting spring 184 and causes the ejecting spring 184 to compress between the rod second end 114 and the base end 182 of the ejecting pin 180. When the ejecting spring 184 is compressed, the ejecting end 181 can pass through the compressed ejecting spring 184 and through the aperture 171. The ejecting end 181, now in contact with the inner base 176 of the lower attachment mechanism 175, pushes against the inner base 176 and separates the first magnetic connecting piece 119 from the second magnetic connecting piece 178. The magnetically detachable rod 110 and the broomstick 120 can now be disconnected with ease as the first magnetic connecting piece 119 and the second magnetic connecting piece 178 are no longer holding the broomstick 120 and the magnetically detachable rod 110 together. Once the magnetically detachable rod 110 and the broomstick are disconnected, the user can release the push button 160 (see FIG. 12A) and allow the ejecting end 181 to return back into the upper attachment mechanism 170.

Figure 16A:
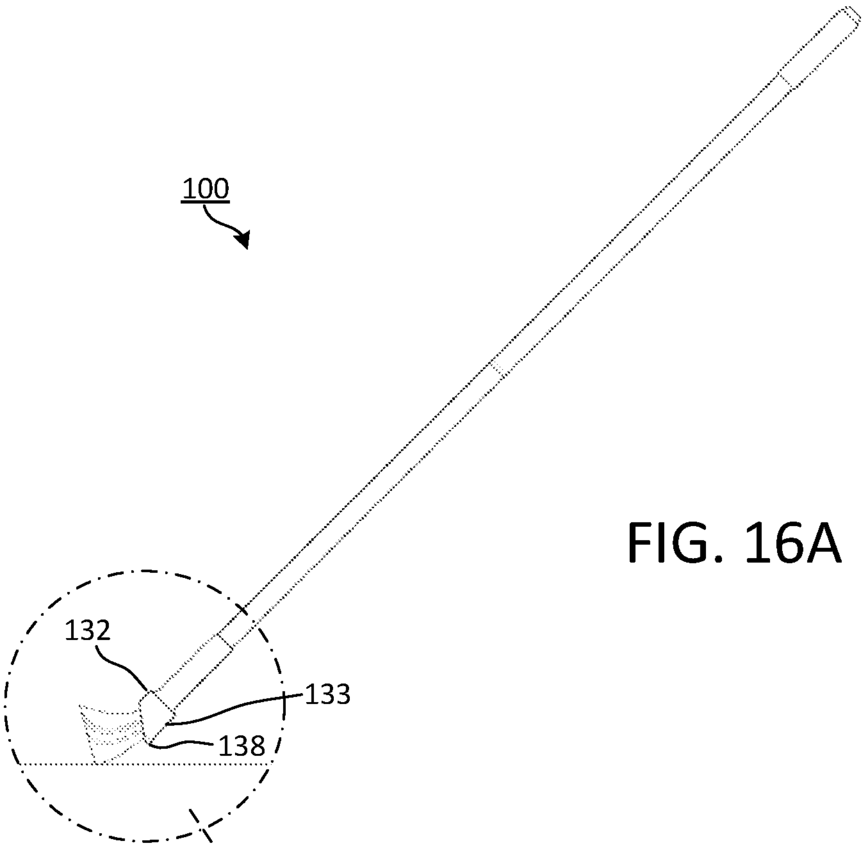
FIG. 16A is an angled right-side view of the broom in use swept in a first direction.
Figure 16B:
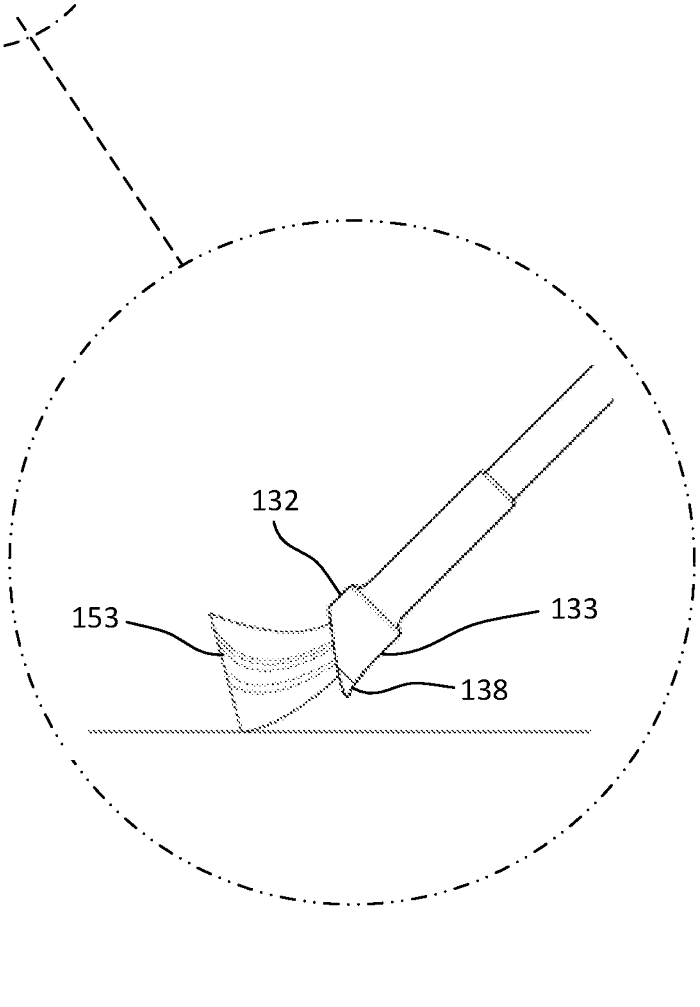
FIG. 16B is an enlarged view of the circled portion located in FIG. 16A.
Figure 17:
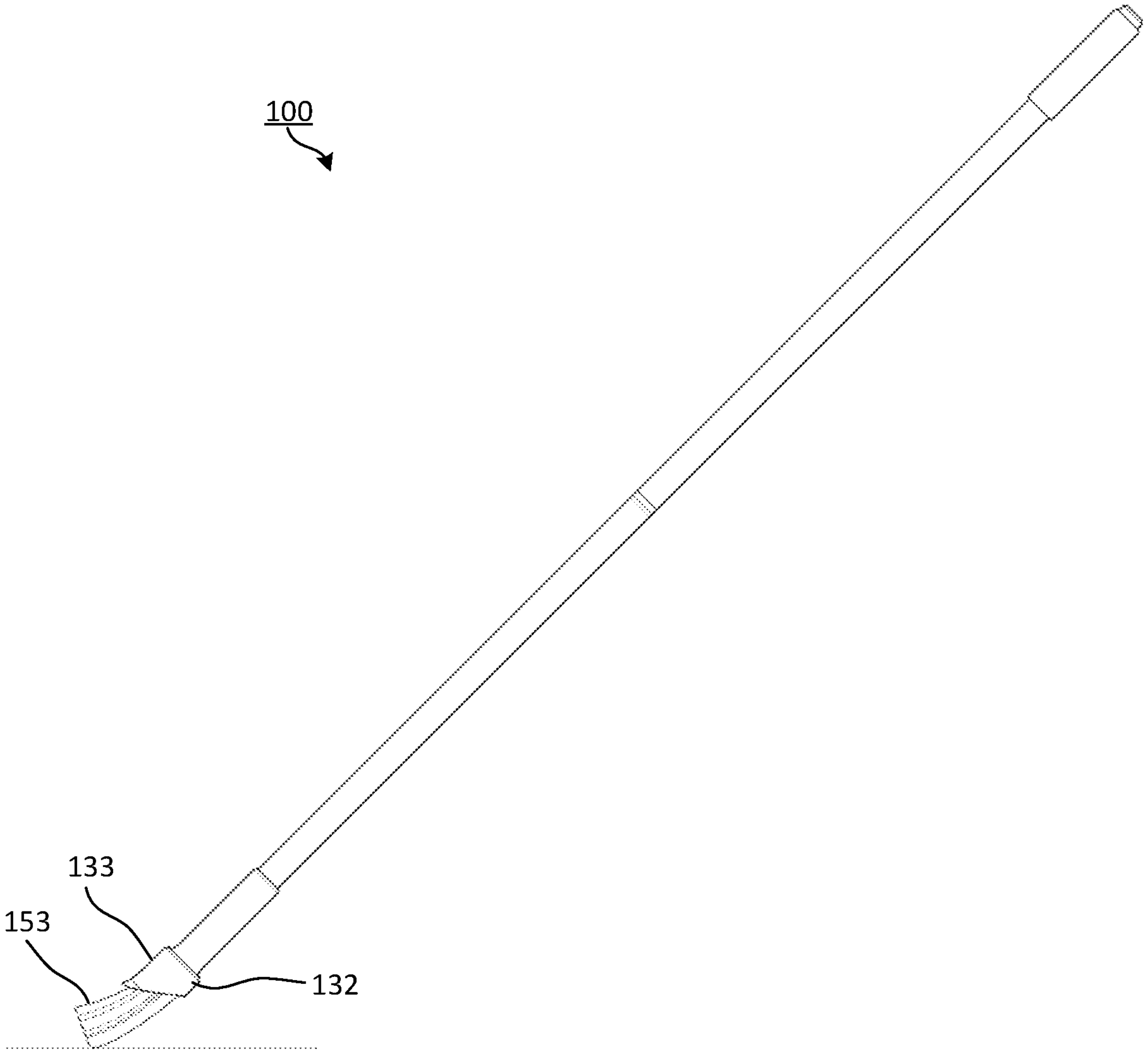
FIG. 17 is an angled side view of the broom in use swept in a second direction.

As shown in FIGS. 16A-17, the advantage of a back wall 133 and a front wall 132 with varying lengths allows the broom 100 to perform different functions when swept in different directions. Referring to FIGS. 16A-16B, when the broom 100 is swept in a direction where the back wall 133 is close to and facing a surface, the broom 100 causes the plurality of broom bristles 153 to feel soft due to the relatively free movement of the plurality of broom bristles 153. A user would use the broom 100 in this direction when cleaning easy messes or on sensitive surfaces. In addition, as shown in FIG. 16A-16B, the scraping edge 138 can be used to scrape off harder to clean stains on a surface. A pressure is applied onto the broom 100, or alternatively the broom 100 is angled slightly in the direction of the scraping edge 138, and as a result the scraping edge 138 comes into contact with a surface. The scraping edge 138 can also be used as a squeegee to guide gathered liquids on a surface into a collecting area to be disposed of.

Alternatively, in FIG. 17, when the broom 100 is angled such that the front wall 132 is close to and facing a surface, the length of the back wall 133 stiffens the plurality of broom bristles 153 as the plurality of broom bristles 153 are no longer given the freedom to move as easily. The stiffness of the plurality of broom bristles 153 allows the user to clean surfaces that would require stiffer broom bristles.

Figure 18:
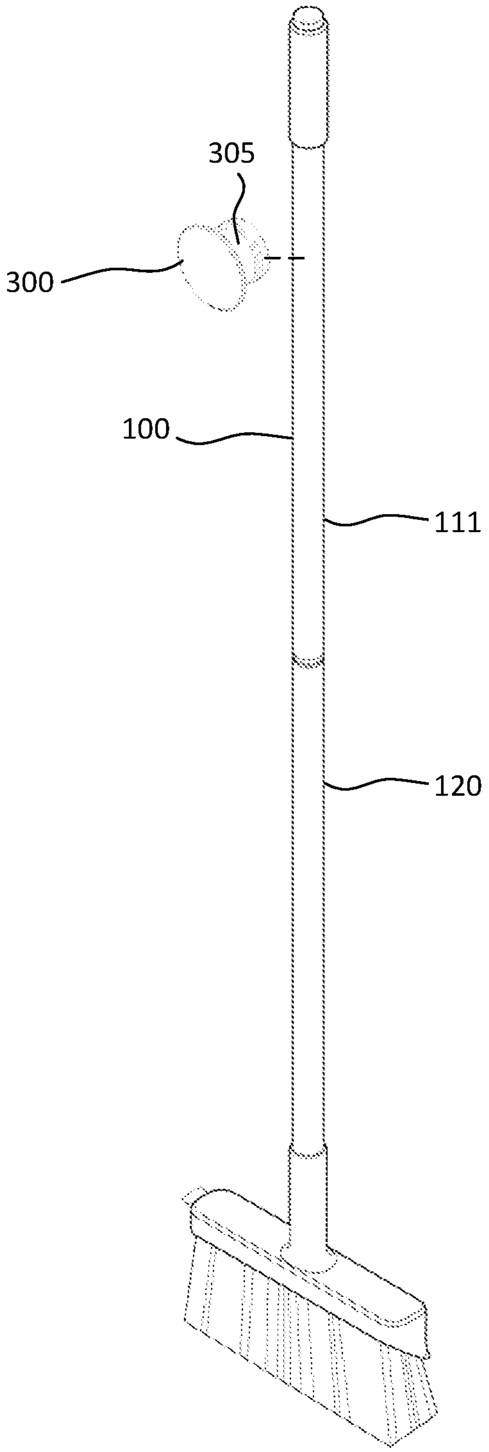
FIG. 18 is a perspective view of the broom unmounted from the magnetic mount.
Figure 19:
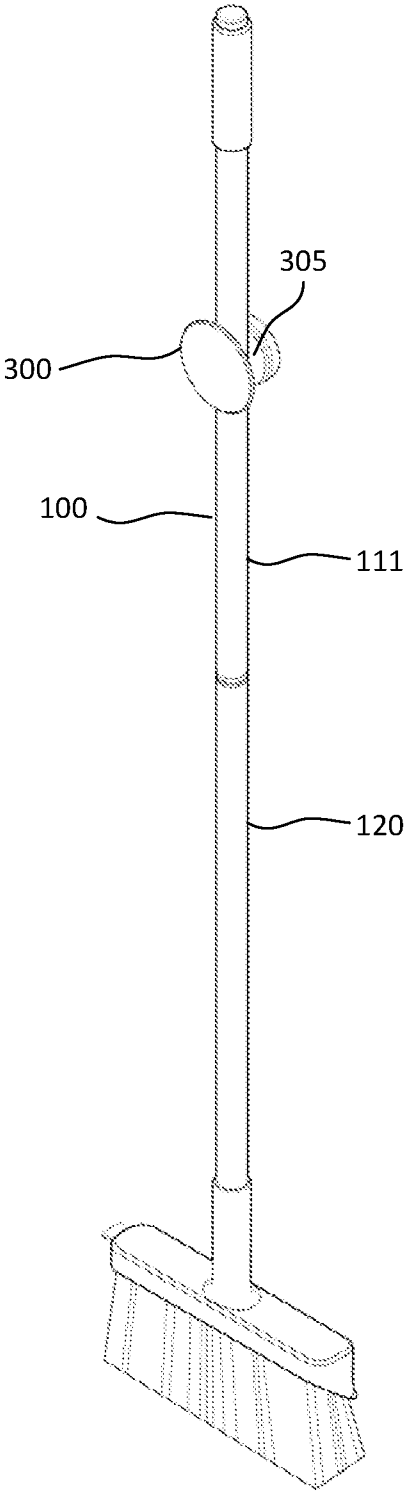
FIG. 19 is perspective view of the broom mounted on to the magnetic mount.

As shown in FIGS. 18-19, the broom 100 may be mounted onto the magnetic mount 300. As explained earlier, the rod portion 111 may be made of a ferromagnetic material and therefore can be magnetically mounted onto the magnetic mount 300. Additionally, because the broomstick 120 may be made of a ferromagnetic material as well, the broom 100 can be magnetically mounted to the magnetic mount 300 through the broomstick 120 as well. To mount the broom 100 onto the magnetic mount 300, the user simply places the broom 100 within a first side indent 305 on the magnetic mount wherein a magnetic element 306 (see FIG. 43) magnetically attracts the broom 100 to the magnetic mount 300. It is understood that the broom 100 may be mounted on to other portions of the magnetic mount 300 that is capable of magnetically attracting the broom 100. More detail of the attraction between the broom 100 and the magnetic mount 300 will be discussed later on. In order to remove the broom 100 from the magnetic mount 300 the user simply grabs any portion of the broom 100 and pulls to overcome the magnetic forces between the broom 100 and the magnetic mount 300.

Figure 21:
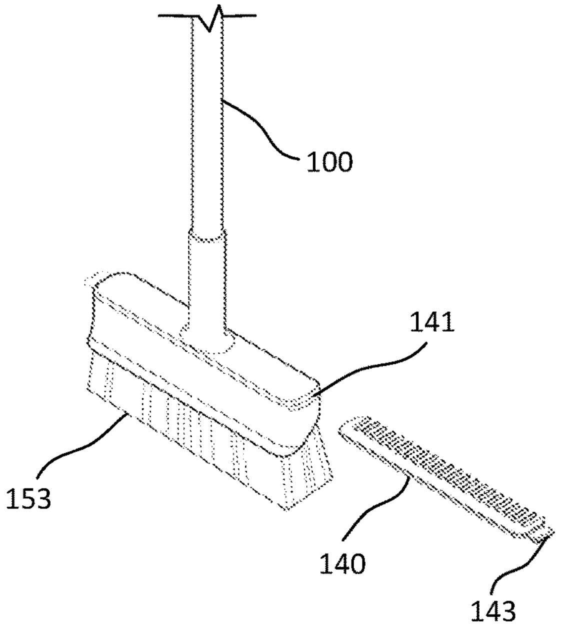
FIG. 21 is a partial perspective back view of the broom and the comb fully removed from the comb slot.
Figure 20:
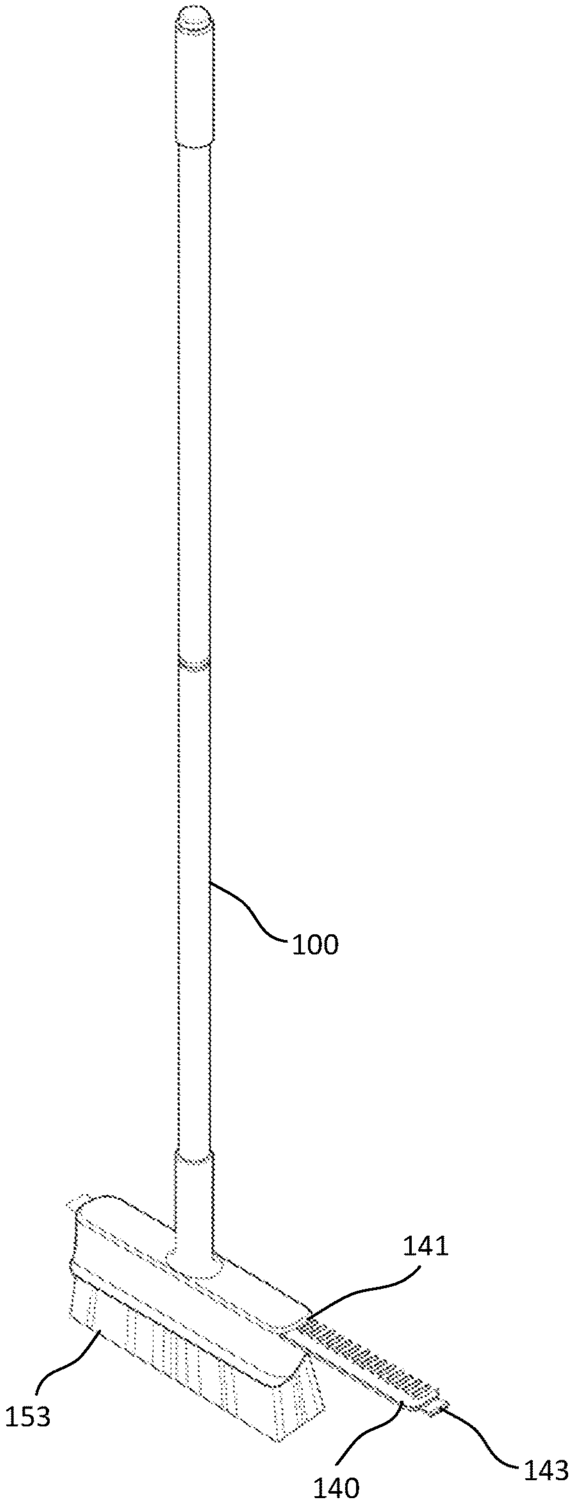
FIG. 20 is a perspective back view of the broom and the comb partially removed from a comb slot.
Figure 22:
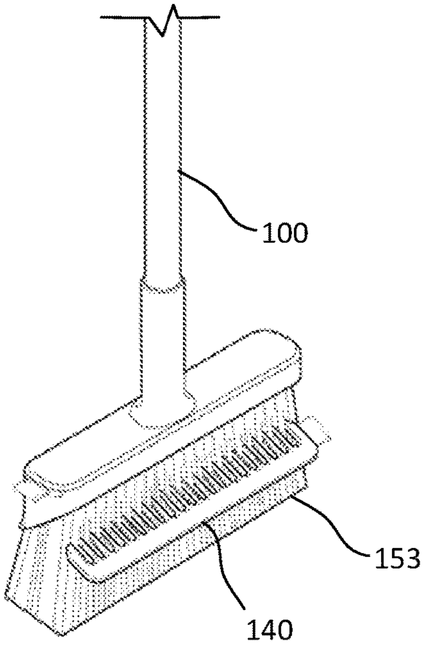
FIG. 22 is a partial perspective view of the broom and the comb in use on the broom.

FIGS. 20-22 show the use of the comb 140. As shown in FIG. 20, the comb 140 may be removed from the comb slot 141. The pull tag 143 may be used to conveniently remove the comb 140 from the comb slot 141. Alternatively, another area of the comb 140 may be gripped in order to remove the comb 140 from the comb slot 141.

Referring to FIGS. 21-22, to use the comb 140, The user grips a portion of the comb 140 and slides the plurality of comb teeth 146 through the plurality of broom bristles 153 to remove any debris stuck in the plurality of broom bristles 153. The user then grips a portion of the comb 140 and slides the comb 140 back into the comb slot 141. The user will understand that the comb 140 is fully inserted into comb slot 141 from the resulting clicking sound made by the locking protrusion 145 (see FIG. 11E) when the locking protrusion 144 receives the comb 140.

FIGS. 23-26 show various views of the comb 140. The comb 140 may have the plurality of comb teeth 146. The comb 140 may be a fine-tooth comb such that the plurality of comb teeth 146 are spaced evenly and very close together. By spacing the plurality of comb teeth 146 close together, the comb 140 can thoroughly clean the plurality of broom bristles 153 (see FIG. 20) even when smaller objects are trapped within the plurality of broom bristles 153. Alternatively, the comb 140 may be an all-purpose comb such that the plurality of comb teeth 146 are not spaced evenly, By having different special relationships between the plurality of comb teeth 146, a user can use the comb 140 for various tasks. For example, when a larger object is stuck in the plurality of broom bristles 153, a user can use a section of the comb 140 where the plurality of comb teeth 146 are spaced further apart. Similarly, when a smaller object is trapped between the broom bristles 153, the user can use a section of the comb 140 where the plurality of comb teeth 146 are spaced closer together.

Figure 27:
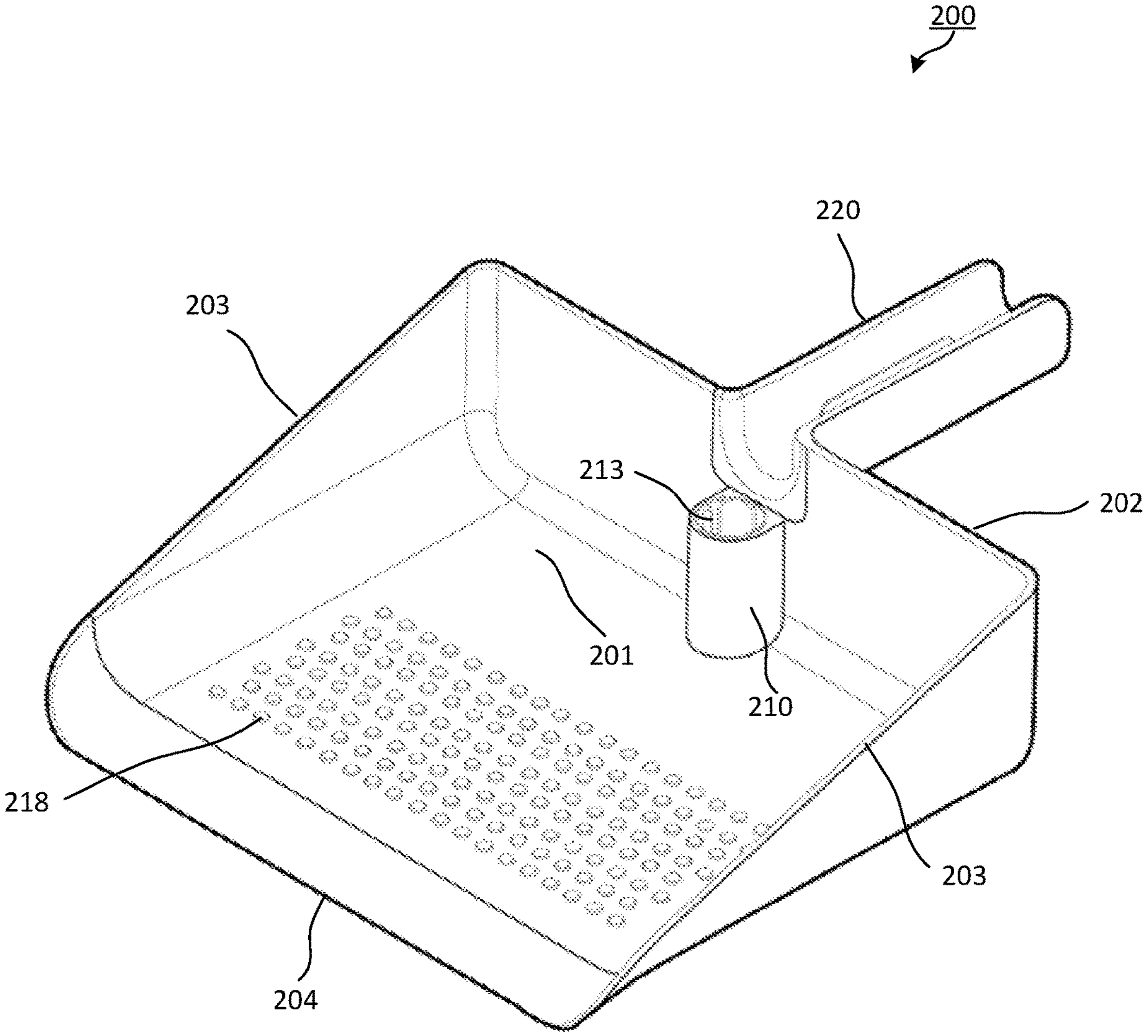
FIG. 27 is an upper perspective view of the dustpan.

FIG. 27 shows a perspective view of the dustpan 200. The dustpan 200 has a collecting area 201, a dustpan back wall 202 extending perpendicularly from the collecting area 201, two dustpan sidewalls 203 extending perpendicularly from the collecting area 201 and connected to the dustpan backwall 202, and a free edge 204. A dustpan handle 220 may extend from the dustpan backwall 202 in a direction opposite the collecting area 201.

Figure 31:
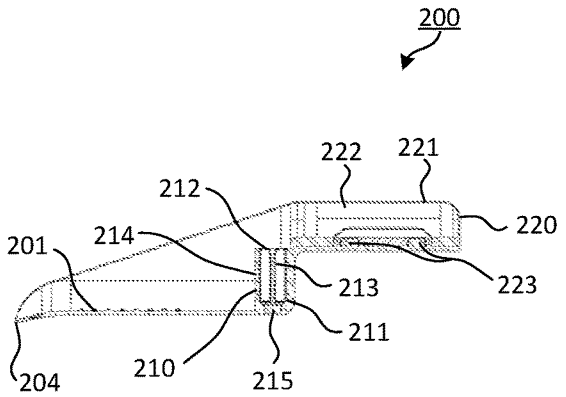
FIG. 31 is a sectional view of the dustpan taken along section lines B-B in FIG. 28.
Figure 32:
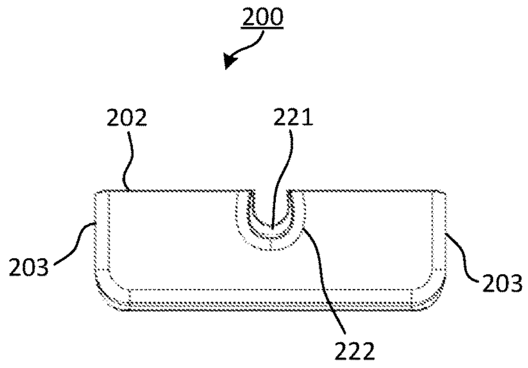
FIG. 32 is a back view of the dustpan.
Figure 33:
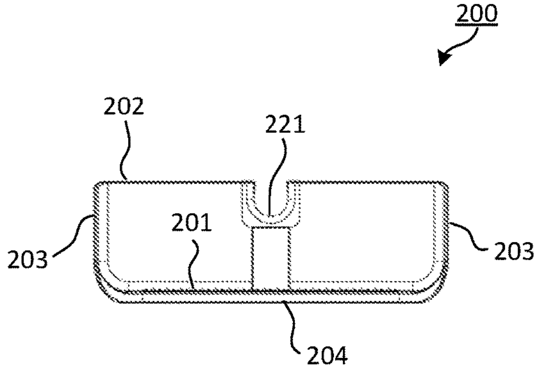
FIG. 33 is a front view of the dustpan.

As shown in FIGS. 27 and 31, the dustpan 200 may have a dustpan attachment mechanism 210 that extends perpendicularly from the collecting area 201. Referring to FIG. 31, the dustpan attachment mechanism 210 may be a cylindrical cup wherein the dustpan attachment mechanism 210 has a closed end 211 and an open end 212. Alternatively, the dustpan attachment mechanism 210 may take another shape as well, such as rectangular or octagonal. Similar to the lower attachment mechanism 175 (Shown in FIG. 12C), the dustpan attachment mechanism 210 is adapted to receive a rod such as the magnetically detachable rod 110 (see FIG. 12A). The dustpan attachment mechanism 210 may have female mating grooves 213 on a dustpan mechanism sidewall 214 that are adapted to align with the male mating bosses 172 on the magnetically detachable rod 110 (see FIG. 12B). In addition, the closed end 211 of the dustpan attachment mechanism 210 may contain a third magnetic connecting piece 215 that will magnetically attract to the first magnetic connecting piece 119 on the magnetically detachable rod 110 (see FIG. 12C).

The dustpan 200 may be me made of any non-pliable material such as a hard plastic like acrylonitrile butadiene styrene (ABS). Alternatively, the dustpan 200 may be of any nonporous material that is capable of holding debris in the dustpan 200.

Figure 28:
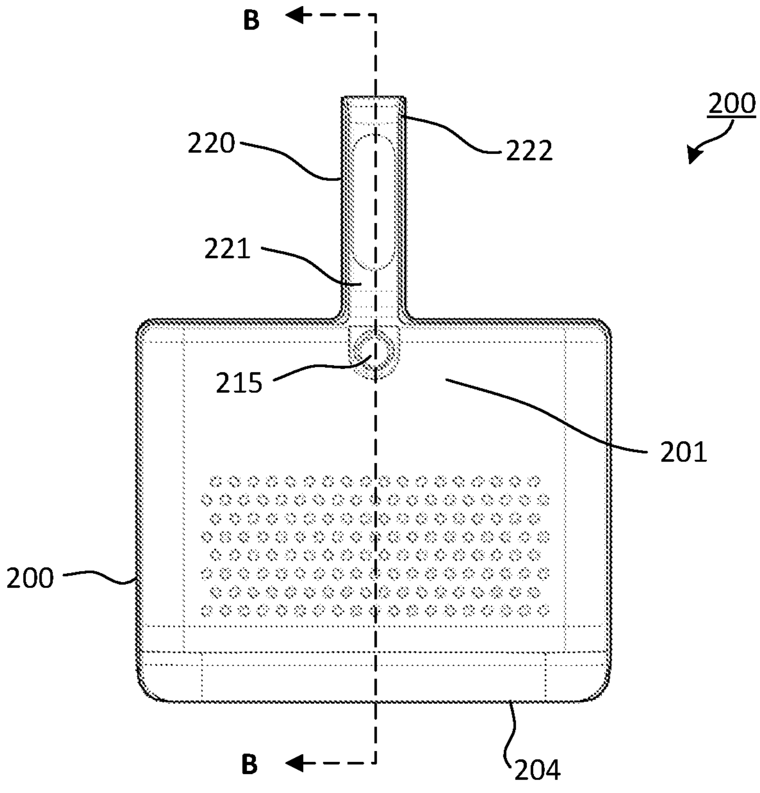
FIG. 28 is a top view of the dustpan
Figure 29:
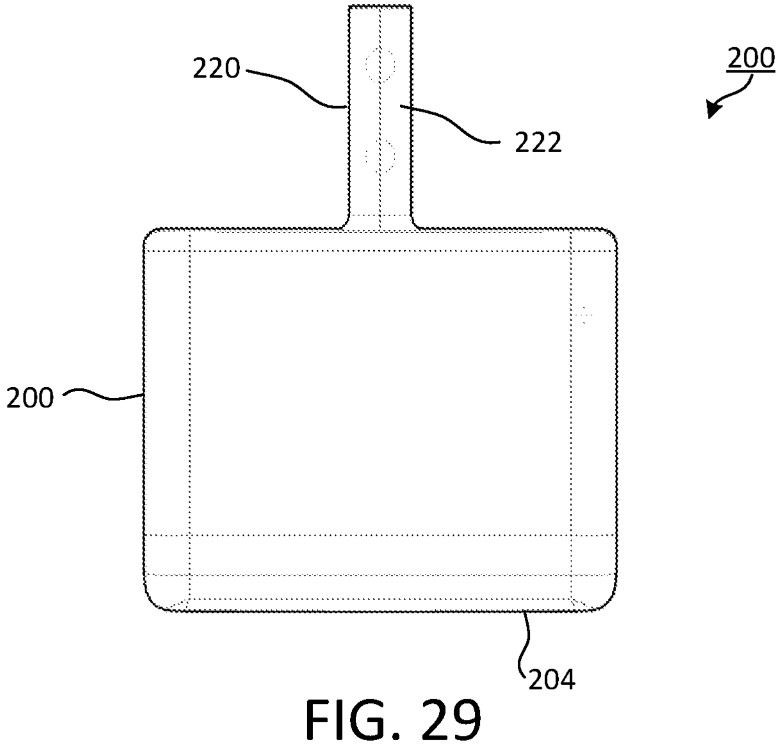
FIG. 29 is a bottom view of the dustpan.
Figure 30:
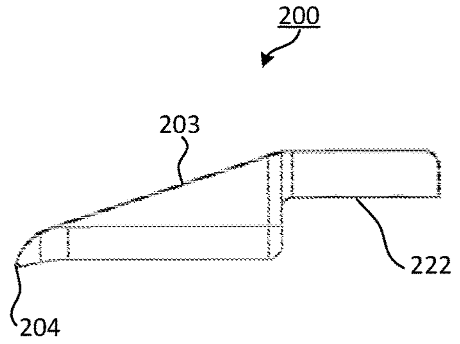
FIG. 30 is a side view of the dustpan.

As shown in FIGS. 27-33, the dustpan 200 may have a dustpan handle 220 that extends from the dustpan back wall 202 in a direction away from the collecting area 201. Referring to FIG. 28, the dustpan handle 220 may be semicylindrical having a handle inner surface 221 and a handle outer surface 222. Alternatively, the dustpan handle 220 may be another shape as well. The handle inner surface 221 may have a diameter or width that substantially similar to the magnetically detachable rod 110 or the broomstick 120 (see FIG. 6). The similarity in diameter or width between the handle inner surface 221 and the magnetically detachable rod 110 will allow a user to mount the dustpan 200 to the broom 100, as shown in FIG. 6. The handle inner surface 221 may be made comprised of a thin coating (not shown) of a material such as silicon or rubber, that would prevent the dustpan 200 from slipping on the broom 100. The coating would be thin enough to allow for a magnetic attraction to pass through, provided that a magnetic element or a ferromagnetic material is placed under the coating.

Referring to FIG. 31, the dustpan handle 220 may have a magnetic element 223 disposed on or within the dustpan handle 220. The magnetic element 223 may be disposed between the handle inner surface 221 and the handle outer surface 222. The magnetic element 223 can be used to magnetically attract the dustpan 200 to a section of the broom 100 that contains ferromagnetic materials such as the rod portion 111 of magnetically detachable rod 110 or the broomstick 120. Alternatively, instead of the magnetic element 223, the dustpan 200 may contain a hook or another securing mechanism (not shown) to connect the dustpan 200 to the broom 100 (see FIG. 6) when the dustpan 200 is not in use. As shown in FIG. 31, in the present disclosure, the dustpan handle 220 contains two magnetic elements 223 encased between the handle inner surface 221 and the handle outer surface 222. A thin coating (not shown) on the handle inner surface 221 allow the magnetic attractions to pass through the handle inner surface 221 and to mate with another magnetic element or ferromagnetic material.

Continuing in FIG. 31, to mount the dustpan 200 to the broom 100 (as shown in FIG. 3), a user simply grabs the handle outer surface 222 and places the handle inner surface 221 in contact with a section of the broom 100 (see FIG. 6.). The magnetic attraction between the broom 100 and the magnetic elements 223 disposed in the dustpan handle 220, hold the dustpan 200 and the broom 100 together. To remove the dustpan 200 from the broom 100 (See FIG. 6), the user simply overcomes the magnetic force between the dustpan 200 and the broom 100 by gripping a portion of the dustpan 200 and pulling, with a force greater than the force of the magnetic attraction, in a direction opposite of the broom 100.

As shown in FIGS. 27-33, the dustpan 200 contains a free edge 204. Referring to FIG. 27, the free edge 204 may be angled downward relative to the collecting area 201. The angle may vary between zero and ninety degrees. When the dustpan 200 is placed on a flat surface, such as a floor or countertop, the angle of the free edge 204 limits any gaps between the free edge 204 and a flat surface. As a result, when particles or liquids are swept, the particles are swept up the free edge 204 and into the collecting area 201 of the dustpan 200. In contrast, when the free edge 204 is not angled, particles that are swept into the dustpan 200 may travel between a gap that may be created between the free edge 204 and a surface. In addition, the angled free edge 204 causes the dustpan 200 to be angled slightly such that the collecting area 201 is angled downward towards the dustpan back wall 202. As a result, any liquids or particles that are swept into the dustpan 200 will travel down the collecting area 201 towards the dustpan back wall 202. The resulting angled collecting area 201 ensures that liquids and particles remain in the dustpan 200 until a user decides to empty the contents within the dustpan 200.

The free edge 204 may be made of rubber, plastic or another material that would aid in the scooping of particles off a surface. In addition, the free edge 204 may be used to scrape harder to clean surfaces that may have unwanted particles stuck to the surface. Also, the free edge 204 of the dustpan 200 can be used as a squeegee to gather liquids on a surface.

As shown in FIG. 27, the collecting area 201 of the dustpan 200 may contain textured protrusions 218. The textured protrusions 218 inhibit the movement of particles or liquids within the dustpan 200. In addition, when an ordinary broom is swept onto the dustpan 200, the textured protrusions 218 aid in the removal of particles that may be attached to bristles on an ordinary broom.

Figure 34:
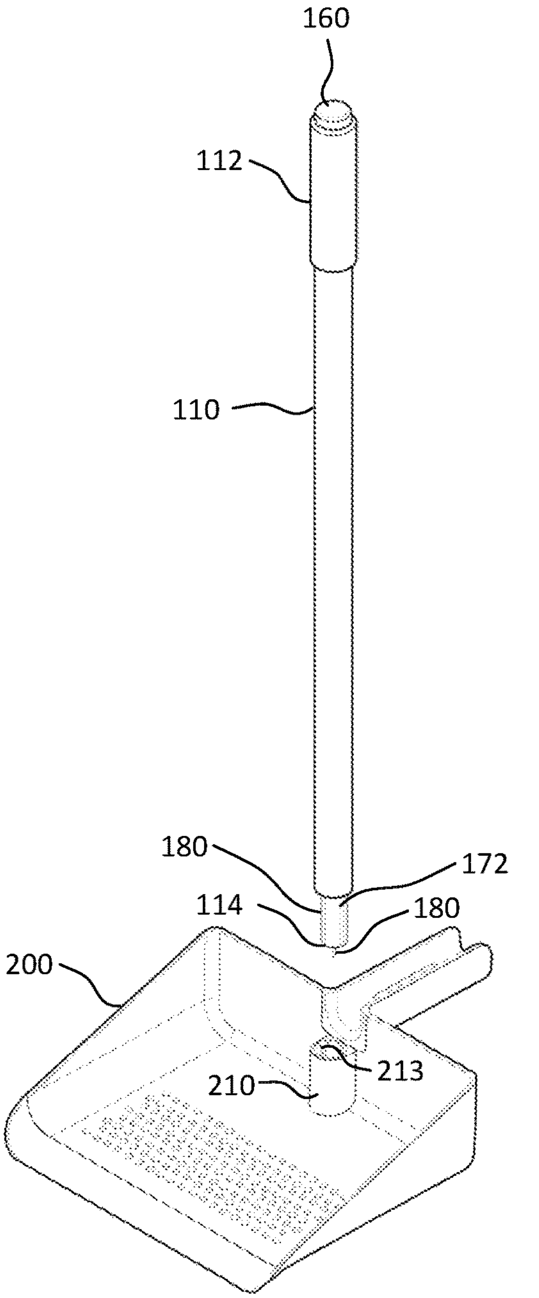
FIG. 34 is a perspective view of the magnetically detachable rod removed from the dustpan.
Figure 35:
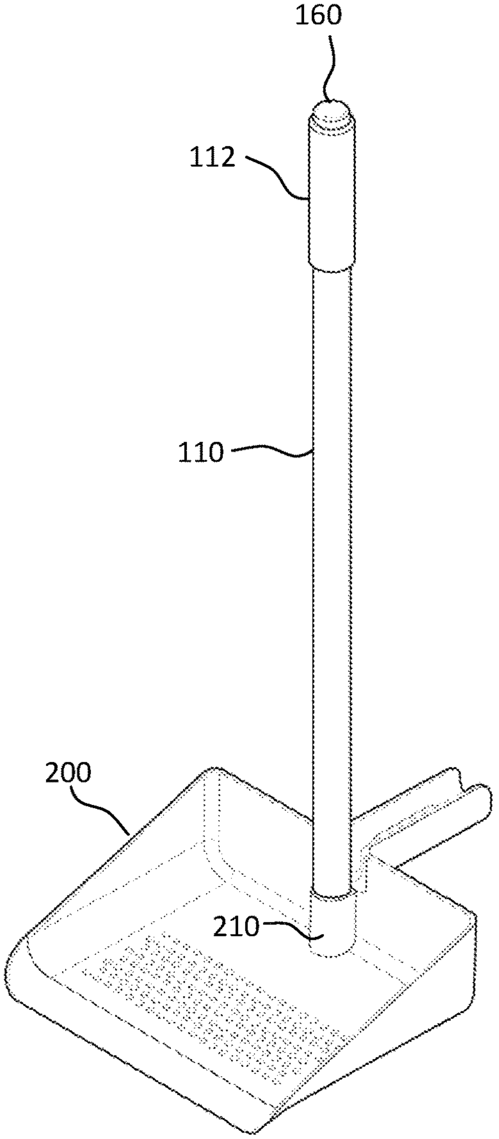
FIG. 35 is a perspective view of the magnetically detachable rod inserted into the dustpan.

As shown in FIGS. 34-35, the magnetically detachable rod 110 may be connected to the dustpan 200. Similar to the previous broom assembly 100 described in FIG. 6, the magnetically detachable rod 110 can be attached to the dustpan 200 by simply placing the upper attachment mechanism 170 within the dustpan attachment mechanism 210. The male mating bosses 172 will align with the female mating grooves 213 and prevent the magnetically detachable rod 110 from twisting relative to the dustpan 200. In addition, the first magnetic connecting piece 119 located at the rod second end 114 (Shown in FIG. 12C) will magnetically attract to the third magnetic connecting piece 215 located at the closed end 212 of the dustpan attachment mechanism 210 (Shown in FIG. 31). The magnetic attraction between the first magnetic connecting piece 119 (See FIG. 12C) and the third magnetic connecting piece 215 (see FIG. 31) will prevent the magnetically detachable rod 110 from being removed from the dustpan 200 unless a sufficient force is used to overcome the magnetic attraction.

Continuing in FIGS. 34-35, once the magnetically detachable rod 110 and the dustpan 200 are connected, the user is free to grip the magnetically detachable rod 110 by the handle 112 and use the magnetically detachable rod 110 to control the dustpan 200.

To remove the magnetically detachable rod 110, the user presses on the push button 160 located on the magnetically detachable rod 110. The pressing of the push button 160 causes the ejecting pin 180 to be ejected at the rod second end 114. The ejecting pin 180 pushes against the third magnetic connecting piece 215, or alternatively near the third magnetic connecting piece 215 (see FIG. 31) and overcomes the magnetic attraction between first magnetic connecting piece 119 (See FIG. 12C) and the third magnetic connecting piece 215. While holding the push button 160, the user pulls the magnetically detachable rod 110 away from the dustpan 200 to remove the magnetically detachable rod 110 from the dustpan 200.

Figure 36:
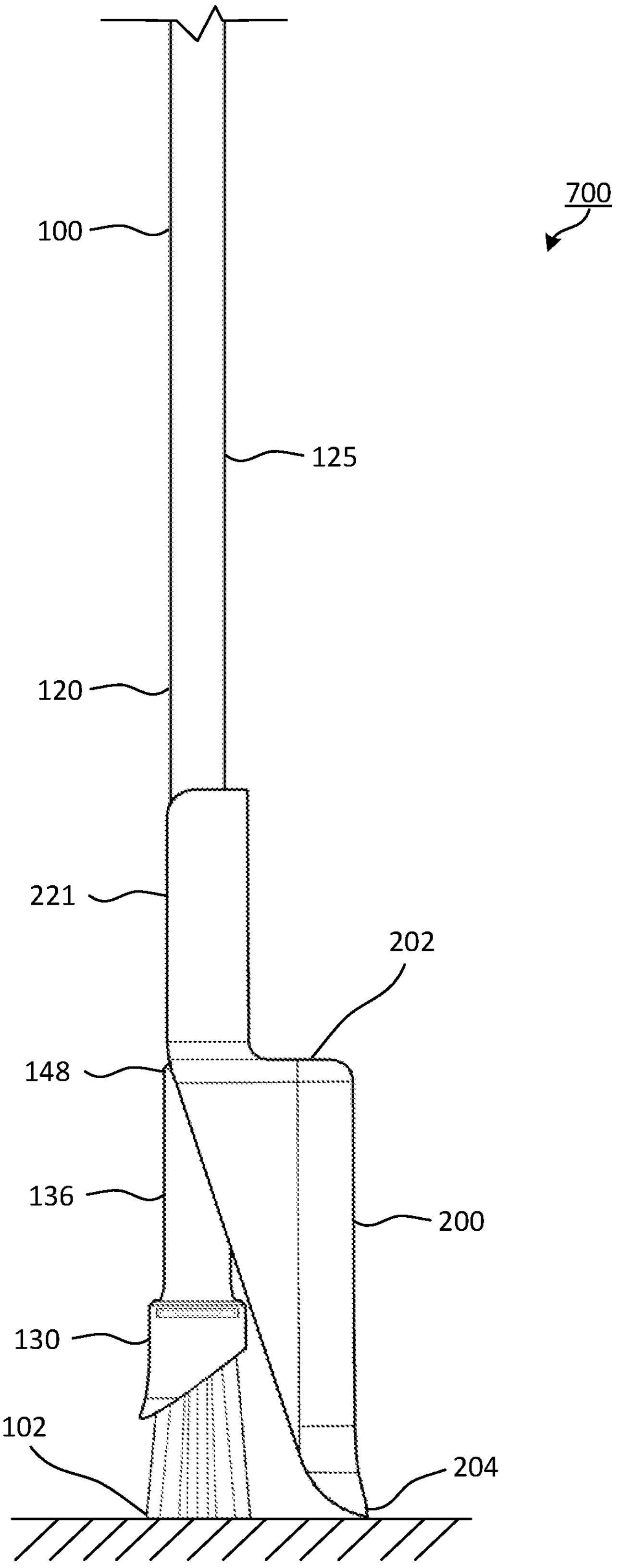
FIG. 36 is partial view of the broom and the dustpan mounted onto the broomstick wherein the broom and the dustpan are in contact with a surface.

As shown in FIG. 36, the broom 100 and dustpan 200 comprise a simple cleaning assembly 700. The simple cleaning assembly 700 stands vertically and freely on a surface. The length from the dustpan backwall 202 to the dustpan free edge 204 may be substantially similar to the length from a tubular section top 148 of the broomhead 130 to the broom second end 102. In the simple cleaning assembly 700, the handle inner surface 221 is substantially in contact with the broomstick rod 125 and the dustpan backwall 202 is substantially in contact with the tubular section top 148. As a result, the free edge 204 of the dustpan 200 and the broom second end 102 will both be extending the same distance. The dustpan free edge 204 and the broom second end 102 are substantially in contact with a surface, while the broomstick 120 is substantially vertical. This configuration allows for the simple cleaning assembly 700 to stand freely. The broom second end 102 and the free edge 204 act as a base to support the simple cleaning assembly 700 in an upright vertical state. It is understood that the distance from the dustpan backwall 202 to the free edge 204 may be longer while still allowing for the simple cleaning assembly 700 to stand freely on a surface. To do so, the dustpan 200 is mounted on to the broom 100, a distance closer to the broom first end 101 (see FIG. 7) to compensate for the larger distance of the dustpan 200 length. The mass of the dustpan 200 coupled with the mass of the broom 100 creates a center of mass positioned between the dustpan 200 and the broom 100 that allows for the simple cleaning assembly to stand vertically. It is further understood that the dustpan 200 and the broom 100 may have differing sizes while still allowing for a center of mass located between the broom 100 and the dustpan 200. Any change in size or mass of the broom 100 may be accompanied by a change in size or mass of the dustpan 200 to compensate for the shift in the center of mass.

The plurality of bristles 153 may be uniform in length such that a larger surface area of the plurality of broom bristles 153 are in contact with a surface. The larger surface area would aid in the standing of the simple cleaning assembly 700.

Figure 37:
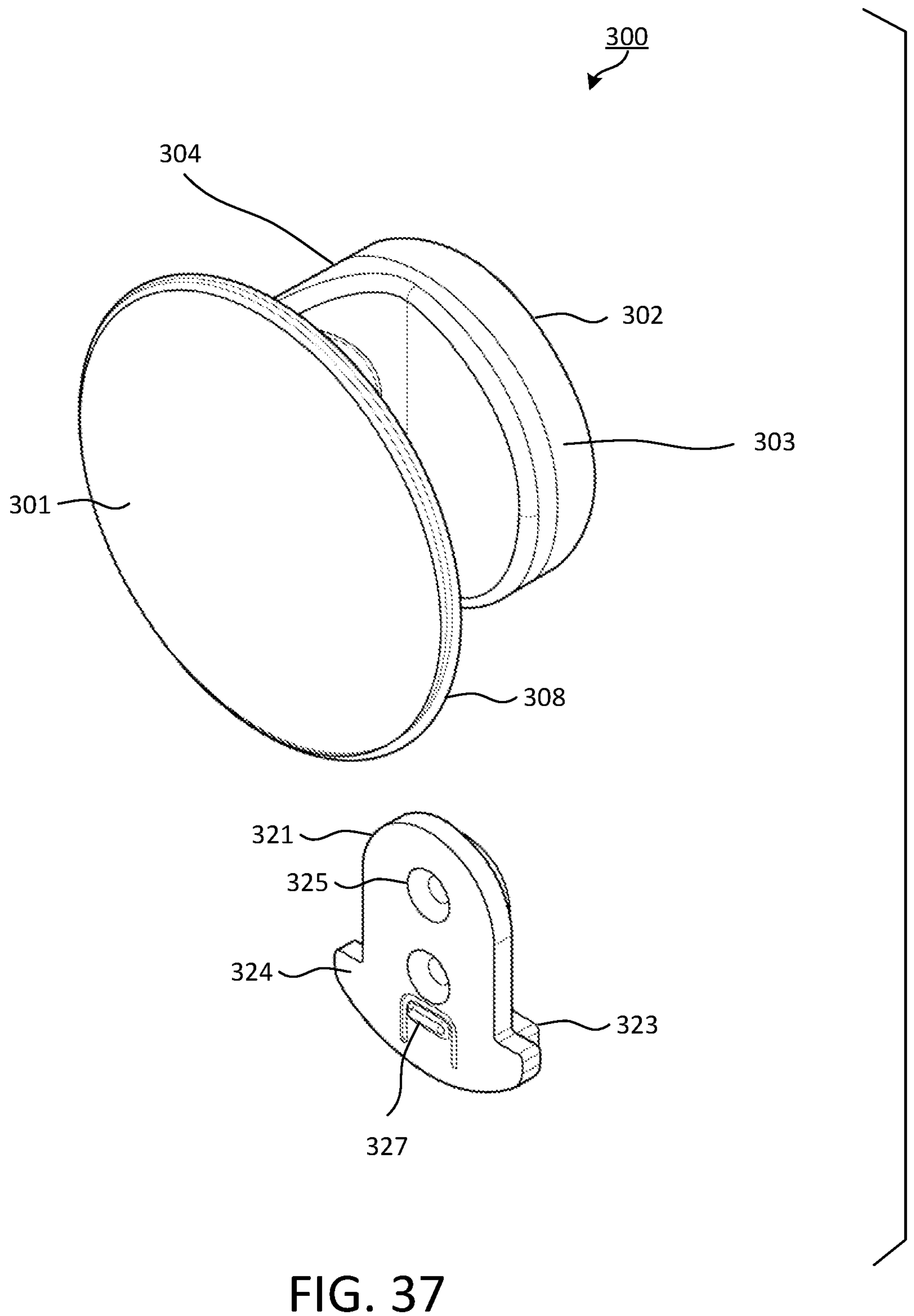
FIG. 37 is a perspective view of the magnetic mount with a removable bracket removed.
Figure 38:
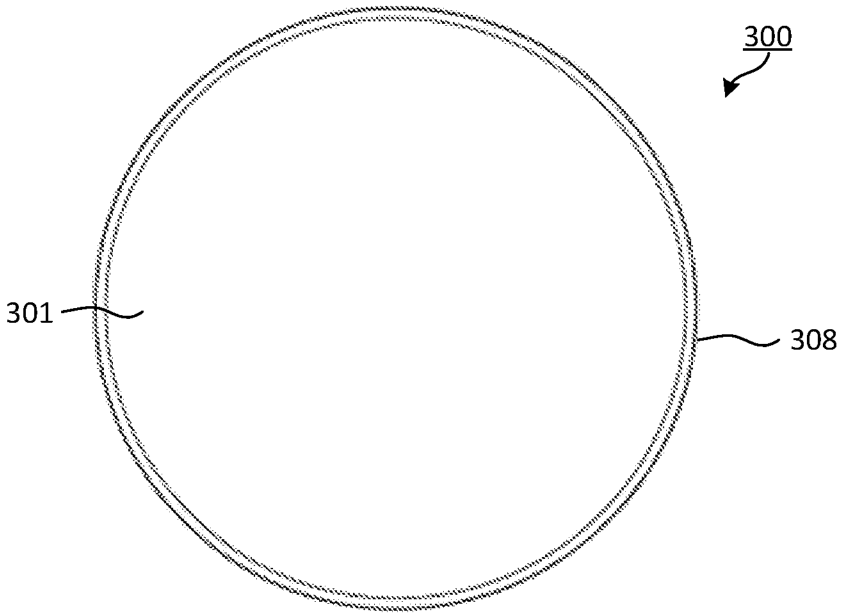
FIG. 38 is a front view of the magnetic mount.
Figure 39:
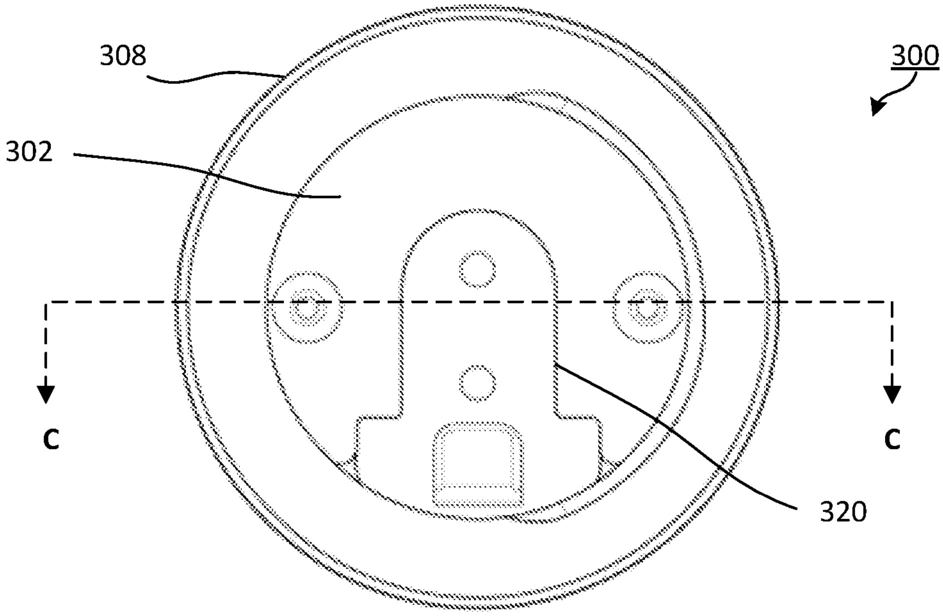
FIG. 39 is a back view of the magnetic mount.

FIGS. 37-39 show the magnetic mount 300. Referring to FIG. 37, the magnetic mount 300 is a block having a front surface 301, a back surface 302, a first mounting side wall 303 extending from the front surface 301 to the back surface 302, and a second mounting sidewall 304 extending from the front surface 301 to the back surface 302. The first mounting sidewall 303 and the second mounting sidewall 304 may be located on different sides of the magnetic mount 300. Alternatively, they can be on the same side of the magnetic mount 300 as well. The magnetic mount 300 may be cylindrical such that the first mounting sidewall 303 and the second mounting sidewall 304 are substantially curved, while the front surface 301 and back surface 302 are substantially flat.

The front surface 301 may have a skirt 308 that extends radially outward. As a result, the front surface 301 may contain a larger surface area than the back surface 302. Alternatively, the front surface 301 may have a smaller surface area than the back surface 302.

Figure 40:
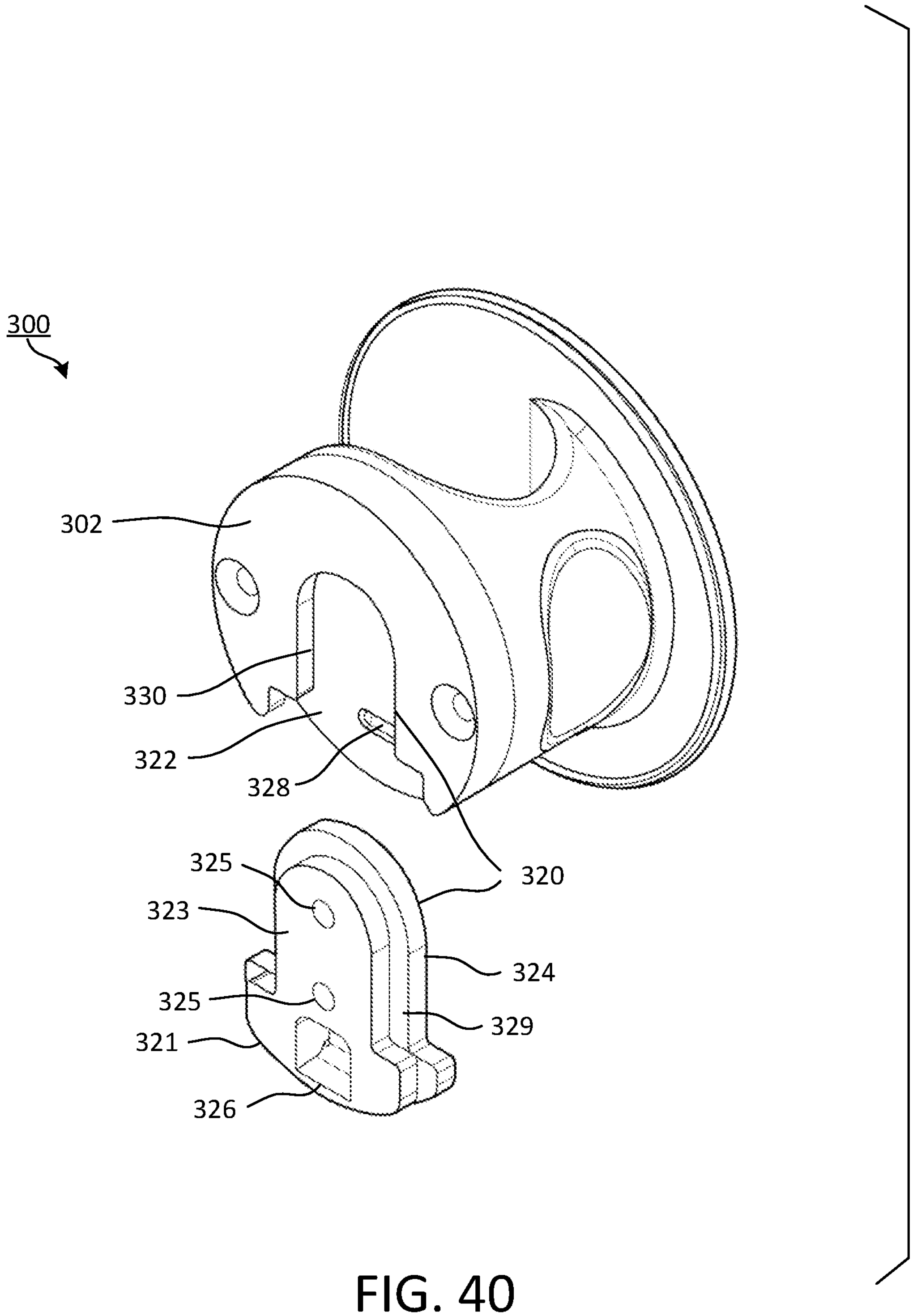
FIG. 40 is a back perspective view of the magnetic mount with the removable bracket slot removed.

As shown in FIGS. 39-40, the back surface 302 may have a wall mount 320 to secure the magnetic mount 300 to a surface. Referring to FIG. 40, the wall mount 320 consists of a removable bracket 321 and a bracket slot 322. The removable bracket 321 can be inserted into and removed from the bracket slot 322. When the removable bracket 321 is inserted into the bracket slot 22, the removable bracket 321 and the back surface 302 are substantially flush.

The removable bracket 321 is a plate having two sides, a wall side 323 and a mount side 324 (see FIG. 37), wherein the wall side 323 is substantially flush with the rear surface 302 of the magnetic mount 300. The removable bracket 321 may contain a through hole 325 extending from the mount side 324 to the wall side 323. The through hole 325 is used to mount the removable bracket 321 to a surface such as a wall. A user may place a screw into the through hole 325 to secure the removable bracket 321 to a surface. More than one through hole 325 may be placed on the removable bracket 321 to ensure proper securement of the removable bracket 321 to a wall or another flat surface.

A finger indent 326 may be located on the wall side 323 of the removable bracket 321. The purpose of the finger indent 326 is to allow a user to grip a portion of the removable bracket 321, by placing their finger within the finger indent 326, and sliding the removeable bracket 321 out of the bracket slot 322. Beneath the finger indent 326, on the mount side 324, the removable bracket 321 contains a mount protrusion 327 (see FIG. 37) that is adapted to mate with a mount extrusion 328 located within the bracket slot 322. The purpose of the mount protrusion 327 and the mount extrusion 328 is to ensure that the removable bracket 321 is not easily removed from the bracket slot 322. In addition, a user will understand that the removable bracket 321 is fully inserted into the bracket slot 322 from a resulting clicking sound when the mount protrusion 327 and mount extrusion 328 are properly mated.

The removable bracket 321 also contains a shoulder 329 along a side of the removeable bracket 321. The shoulder 329 is adapted to slide within a flange 330 located in the bracket slot 322. The shoulder 329 ensures that the removable bracket 321 is secured within the bracket slot 322 when the shoulder 329 is slid into the flange 330.

To secure the magnetic mount 300 to a surface, a user removes the removable bracket 321 using the finger indent 326. The user then places the removable bracket 321 against a surface with the wall side 323 of the removable bracket 321 substantially in contact with the surface. A screw is then placed through the through hole 325 and into a surface to secure the removable bracket 321 to a surface. Next, the user holds the magnetic mount 300 with the rear surface 302 facing the surface. The user then slides the magnetic mount 300 onto the removable bracket 321 through the bracket slot 322 located on the rear surface 302. A user will understand that the removable bracket 321 is correctly inserted into the bracket slot 322 when they hear the resulting click from the mount extrusion 327 and mount protrusion 328 mating together.

Alternatively, instead of the wall mount 320 shown in FIGS. 39-40, the magnetic mount 300 may contain another means to secure the magnetic mount 300 to a surface. For example, the magnetic mount 300 may contain Velcro, a magnet, or even an adhesive, to mount the magnetic mount 300 to another surface.

Figure 41:
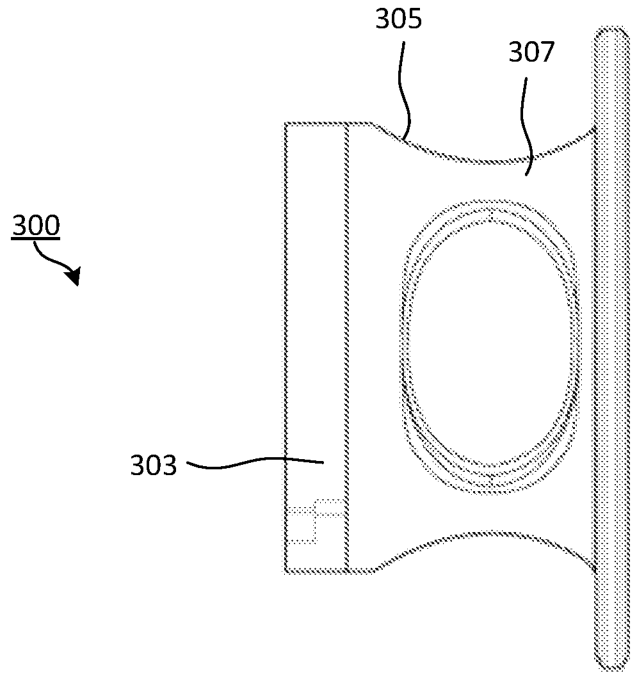
FIG. 41 is a right-side view of the magnetic mount.
Figure 42:
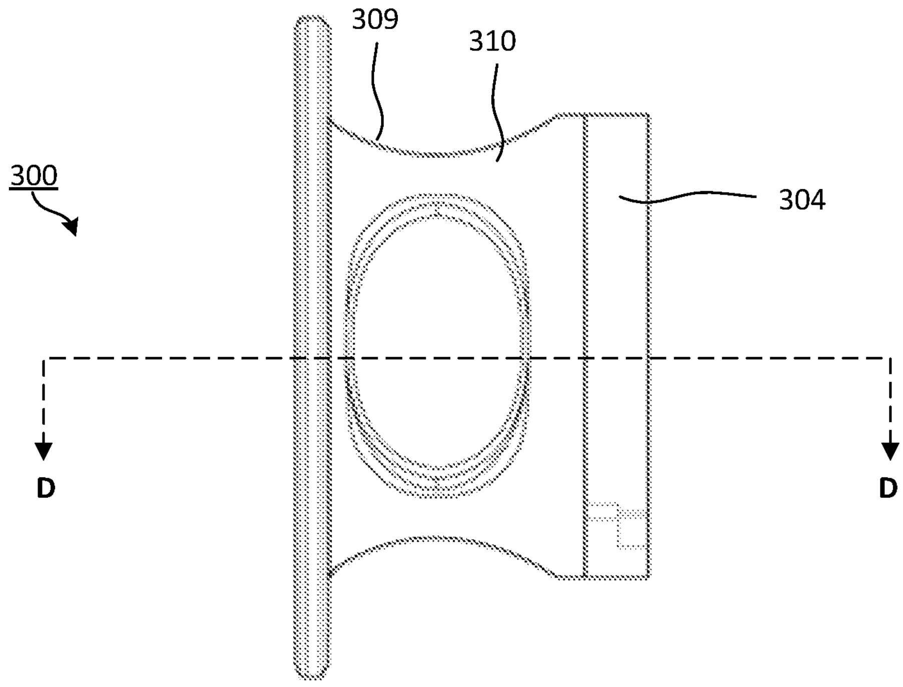
FIG. 42 is a left side view of the magnetic mount.
Figure 43:
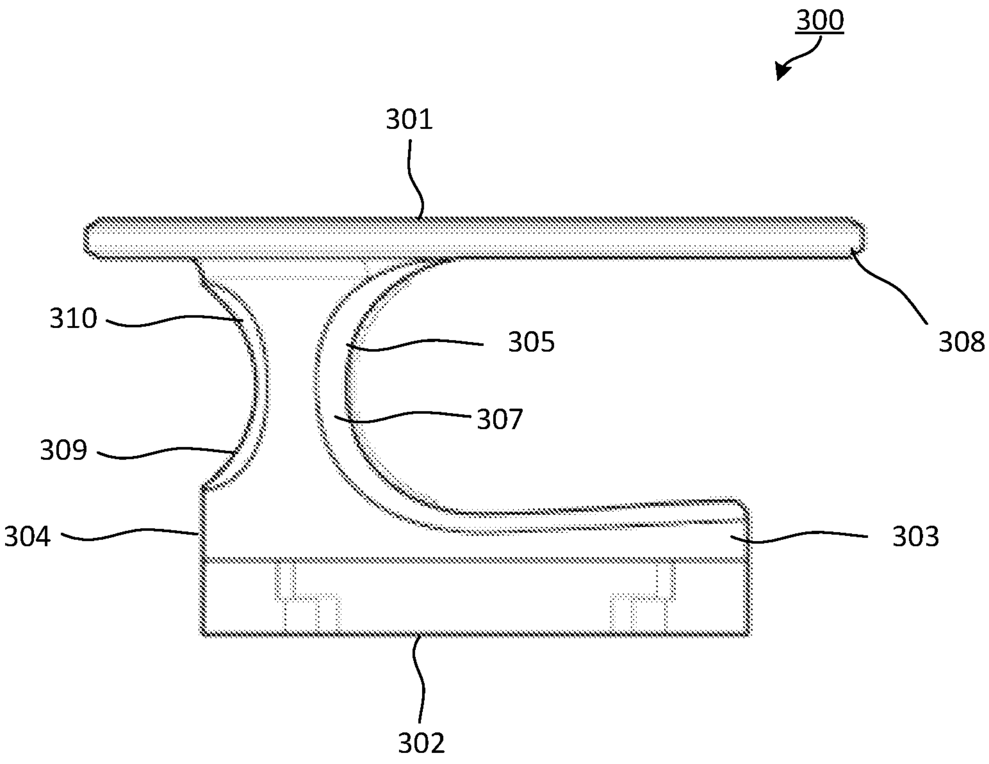
FIG. 43 is a top view of the magnetic mount.

As shown in FIGS. 41-43, the magnetic mount 300 contains the first mounting sidewall 303 and the second mounting sidewall 304. Referring to FIG. 43, the first mounting sidewall 303 may contain a first side indent 305. The first side indent 305 may be semicylindrical in shape. Alternatively, the first side indent 305 may be a similar shape to the rod portion 111 of the magnetically detachable rod 110 (See FIG. 7) or the broomstick 120. The first side indent 305 is adapted to receive the broom 100 (see FIG. 7) or any other device or apparatus with a similar shape. A first side indent surface 307 may be covered in a thin coating such as rubber, silicon, or plastic (not shown). The thin coating may be used to increase the frictional properties between the broom 100 and the magnetic mount 300 to prevent slip.

Similarly, the second mounting sidewall 304 may contain a second side indent 309. The second side indent 309 may be semicylindrical in shape. Alternatively, the second side indent 309 may be a similar shape to the rod portion 111 or the broomstick 120 of the broom (See FIG. 6). The second side indent 309 is adapted to receive the broom 100 or any other device or apparatus with a similar shape. A second side indent surface 310 may be covered in a thin coating (not shown) such as rubber, silicon, or plastic. The thin coating may be used to increase the frictional properties between the broom 100 and the magnetic mount 300 to prevent slip.

Figure 44:
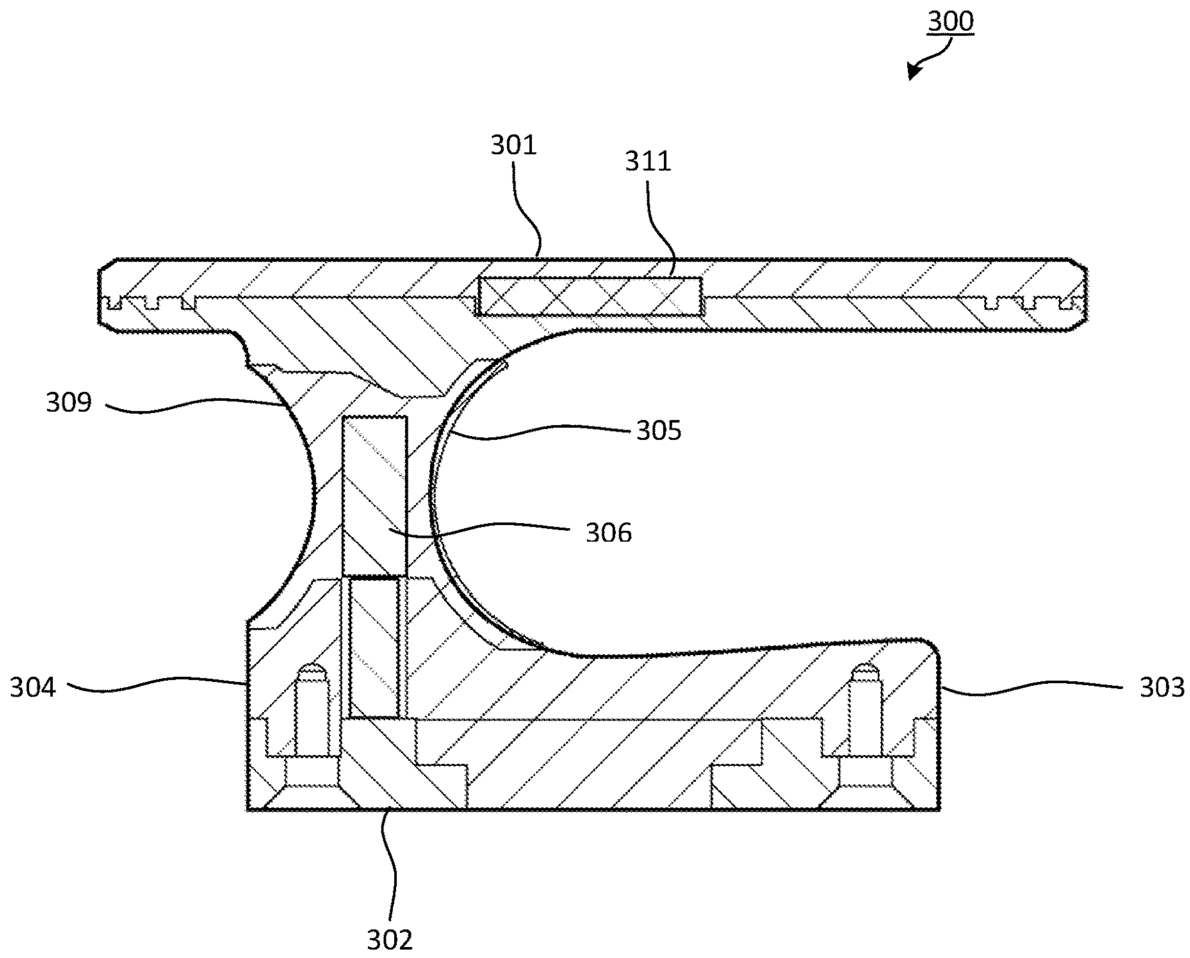
FIG. 44 is a cross sectional view of the magnetic mount taken along section lines D-D IN FIG. 42.

As shown in FIG. 44, the magnetic element 306 may be disposed within the magnetic mount 300 between the first side indent 305 and the second side indent 309. Alternatively, the magnetic element 306 may disposed on the first side indent surface 307 or the second side indent surface 310 (See FIG. 43). The purpose of the magnetic element 306 is to create a magnetic attraction between the magnetic element 306 and a ferromagnetic rod that is positioned within the first side indent 305 or the second side indent 309.

A magnetic element 311 may be disposed at or substantially near the front surface 301. The purpose of the magnetic element 311 is to magnetically attract various ferromagnetic cleaning devices such as the miniboom 500 and the mini dustpan 550 (see FIG. 5).

Figure 45:
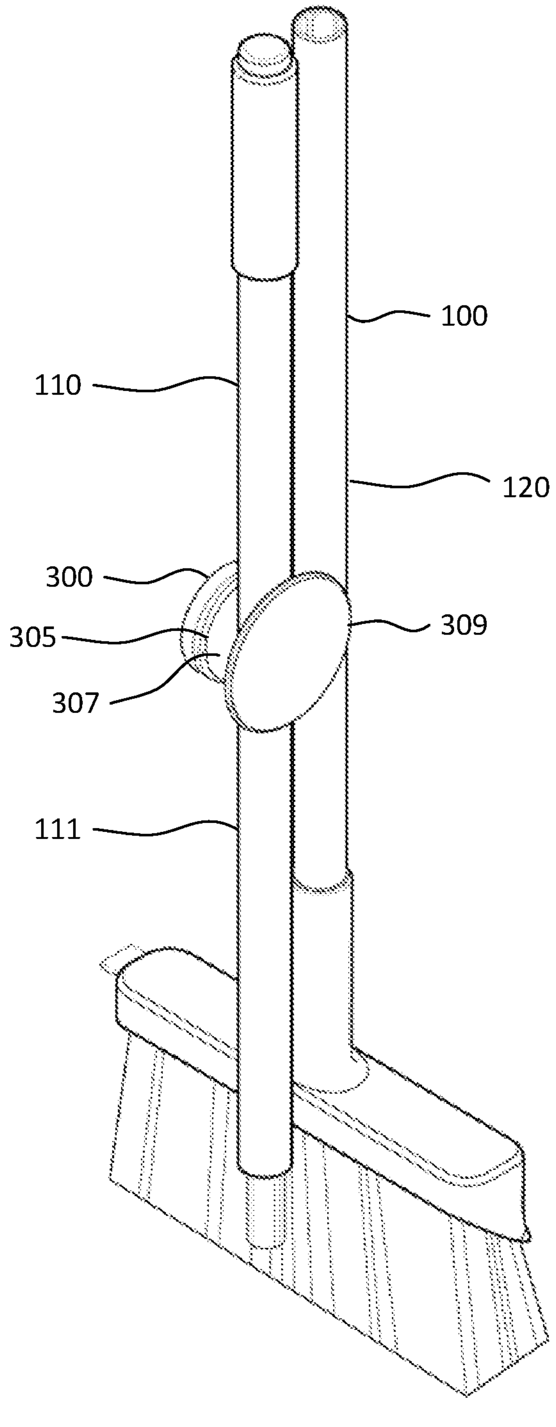
FIG. 45 is a perspective view of the broom partially disassembled and mounted onto the magnetic mount, wherein the magnetically detachable rod is mounted onto a first side of the magnetic mount and the rest of the broom is mounted onto a second side of the magnetic mount.

As shown in FIG. 45, the broom 100 is partially dissembled and connected to the magnetic mount 300. The magnetically detachable rod 110 is disposed within the first side indent 305. The magnetically detachable rod 100 is held in position due to the frictional properties of the first side indent surface 306 and the magnetic attraction between the magnetic element 306 (shown in FIG. 44) and the magnetically detachable rod 110. Similarly, the broomstick 120 is disposed within the second side indent 309. The broomstick 120 is held in position due to the frictional properties of the second side indent surface 310 and the magnetic element 306 (shown in FIG. 44).

To remove the magnetically detachable rod 110 from the magnetic mount 300, the user simply grips a portion of the magnetically detachable rod 110 and pulls the magnetically detachable rod 110 out of the first side indent 305, thereby overcoming the magnetic force between the magnetically detachable rod 110 and the magnetic element 306 disposed within the magnetic mount 300. A similar process is required to remove the broomstick 120 from the second side indent 309.

To mount the broom 100 onto the magnetic mount 300 (as shown in FIGS. 17-18) the user simply places the rod portion 111 of the broom 100 within the first side indent 305. The magnetic element 306 (See FIG. 44) disposed within the magnetic mount 300 attracts the rod portion 111 that is comprised of a ferromagnetic material, and as a result, the rod portion 111 is substantially in contact with the first side indent surface 307. The frictional properties between the rod portion 111 and the first side indent surface 307 increases the securement between the broom 100 and the magnetic mount 300. Similar to the rod portion 111, The broom 100 can also be mounted to the magnetic mount 300 through the broomstick 120 or through the second side indent 309.

Figure 46:
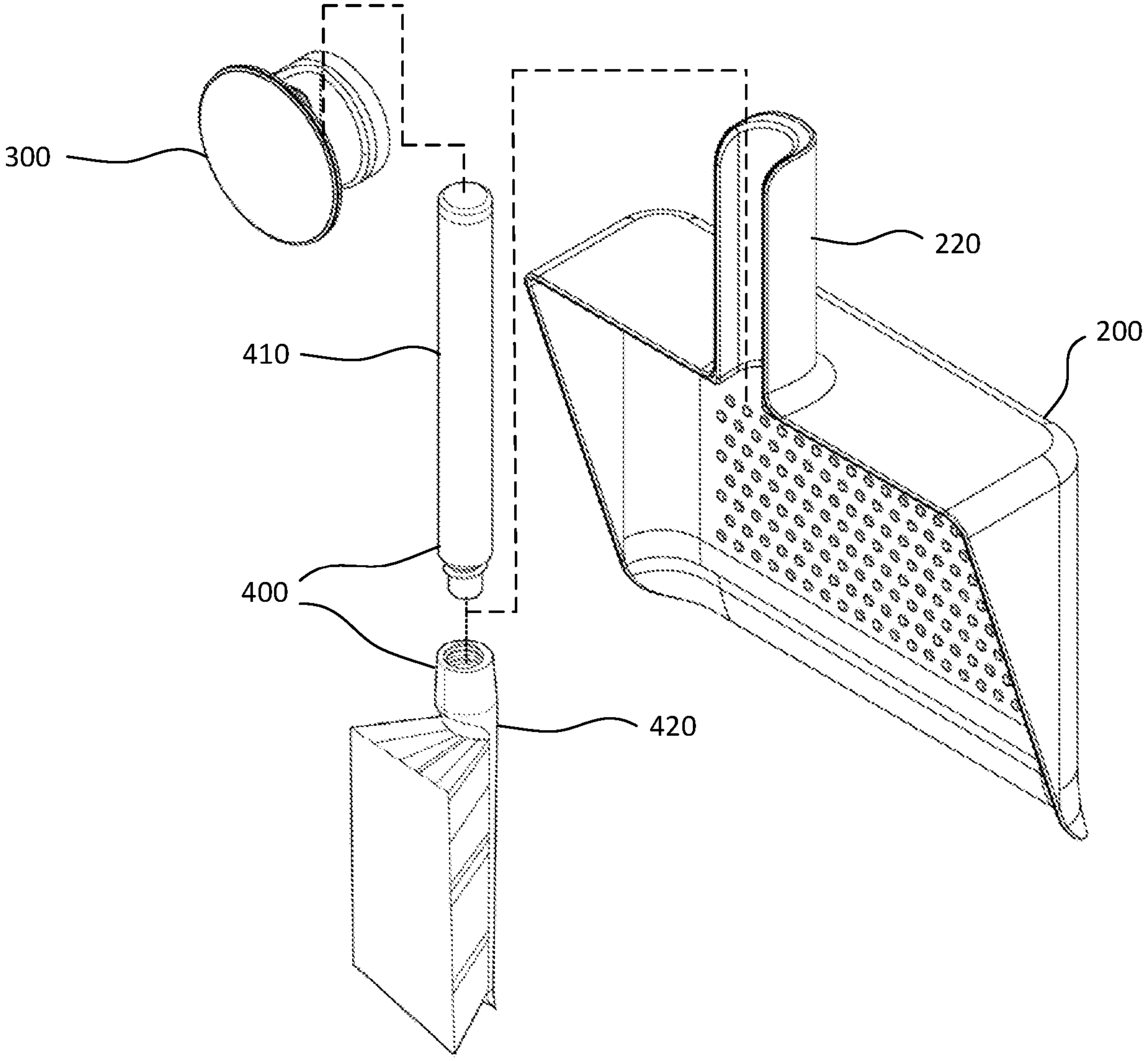
FIG. 46 is an exploded perspective view of the assembly shown in FIG. 4.

FIG. 46 shows an exploded view of the assembly in FIG. 4. As will be discussed later on, the dustpan 200 may be mounted onto the handheld broom 400 through magnetic attraction. The resulting handheld broom 400 and dustpan 200 combination may be mounted onto the magnetic mount 300.

Figure 47:
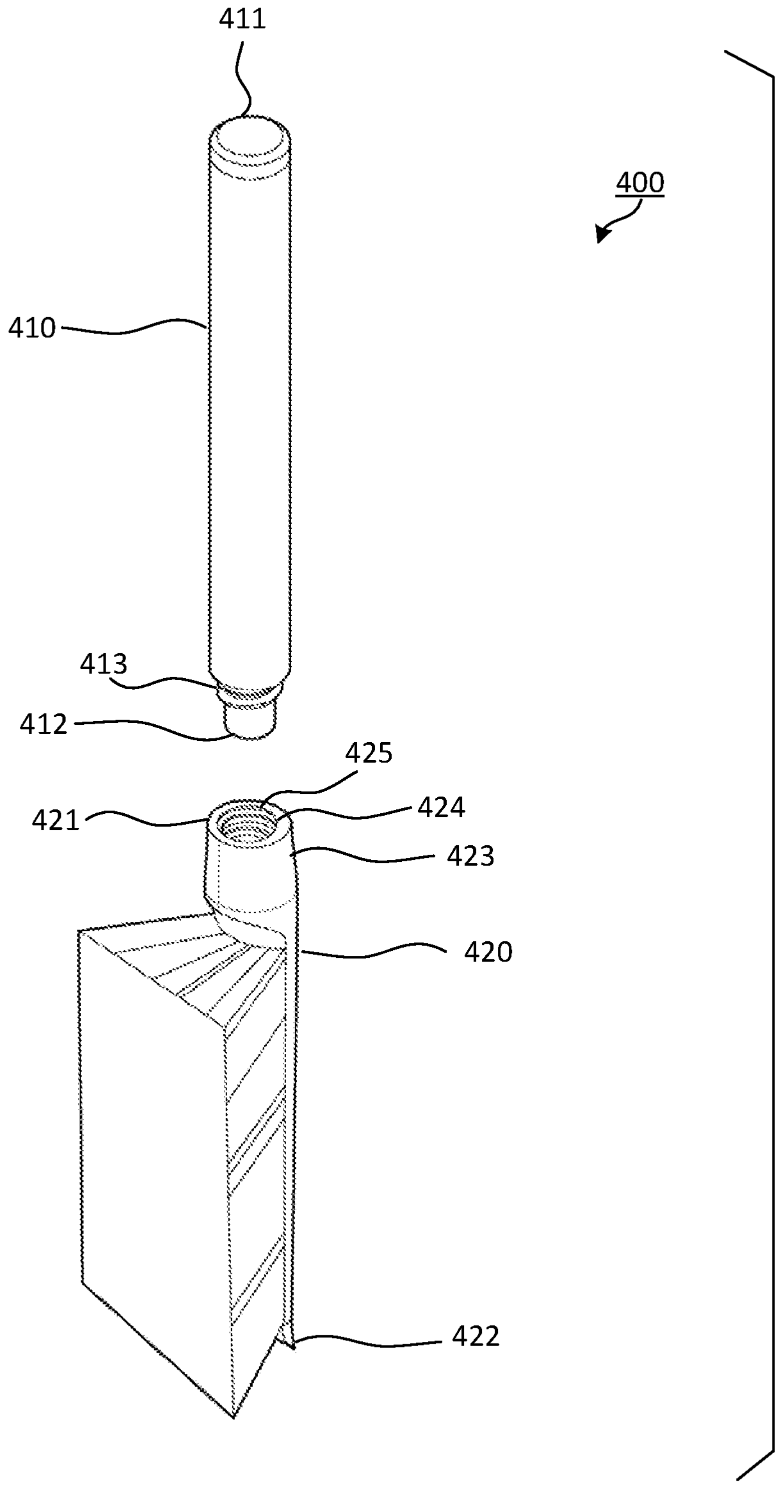
FIG. 47 is an exploded perspective view of the handheld broom.

FIGS. 47-50 show the handheld broom 400. Referring to FIG. 47, the handheld broom 400 contains a handheld rod 410 and a handheld broomhead 420. The handheld rod 410 may be a cylindrical rod with a handheld rod top 411 and a handheld rod bottom 412 similar to the broomstick 120 (see FIG. 6). Near the handheld rod bottom 412, the handheld broom 400 may contain a male threaded portion 413 similar to that of the broomstick 120 (as shown in FIG. 11D). The male threaded portion 413 may be twisted and secured to a female threaded portion 425 on the handheld broomhead 420. In addition, the male threaded portion 413 on the handheld broom 400 may be twisted and secured to similar receiving threaded portions such as the female threaded portion 127 on the broomstick 120 (see FIG. 11D). Alternatively, the handheld rod bottom 412 may be similar to the magnetically detachable rod 110 (See FIG. 12C). Similar to the magnetically detachable rod 110, the handheld rod bottom 412 may contain an upper attachment mechanism (not shown) that is adapted to be secured to a device adapted to receive an upper attachment mechanism such as the lower attachment mechanism 175 on the broomstick 120 (see FIG. 12C).

The handheld rod 410 may be similarly constructed as the broomstick 120 (see FIG. 6). The handheld rod 410 may be made of a ferromagnetic material. The ferromagnetic material will allow the handheld broom 400 to be magnetically attracted to the magnetic mount 300 (see FIG. 46) or to the dustpan handle 220 (See FIG. 46). In addition, the handheld rod 410 may be covered in a thin coating (not shown) such as silicone, rubber, or plastic in order to increase the frictional properties of the handheld rod 410. The increase in frictional properties will minimize slip between the handled rod 410 and the dustpan handle 220 or between the handheld rod 410 and the magnetic mount 300.

The handheld rod 410 may also contain magnetic elements (not shown) such that the handheld rod 410 may be attracted to ferromagnetic surfaces. The magnetic elements (not shown) may be disposed near the handheld rod top 411 such that the handheld rod top 411 may be magnetically attracted to a ferromagnetic surface. Alternately, the magnetic elements (not shown) may be disposed in any portion of the handheld rod 410 or the handheld broomhead 420.

The handheld broomhead 420 has a handheld broomhead top 421 and a handheld broomhead bottom 422. The handheld broomhead top 421 may contain a handheld tubular section 423. The handheld tubular section 423 may contain a handheld bore 424 that is adapted to receive a rod such as the handled rod 410 or the broomstick 120 (see FIG. 11D). The handheld bore 424 may have the female threaded portion 425 within the handheld bore 424 that is adapted to mate with the male threaded portion 413 of the handheld rod 410 or the male threaded portion 126 of the broomstick 120 (see FIG. 11D). Alternatively, the handheld broomhead 420 may be constructed similar to the lower attachment mechanism 175 of the broomstick 120 (See FIG. 12C). As a result, the handheld broomhead 420 may be connected to the magnetically detachable rod 110 similar to the magnetic mating between the magnetically detachable rod 110 and the broomstick 120 as shown in FIG. 12C.

Figure 48:
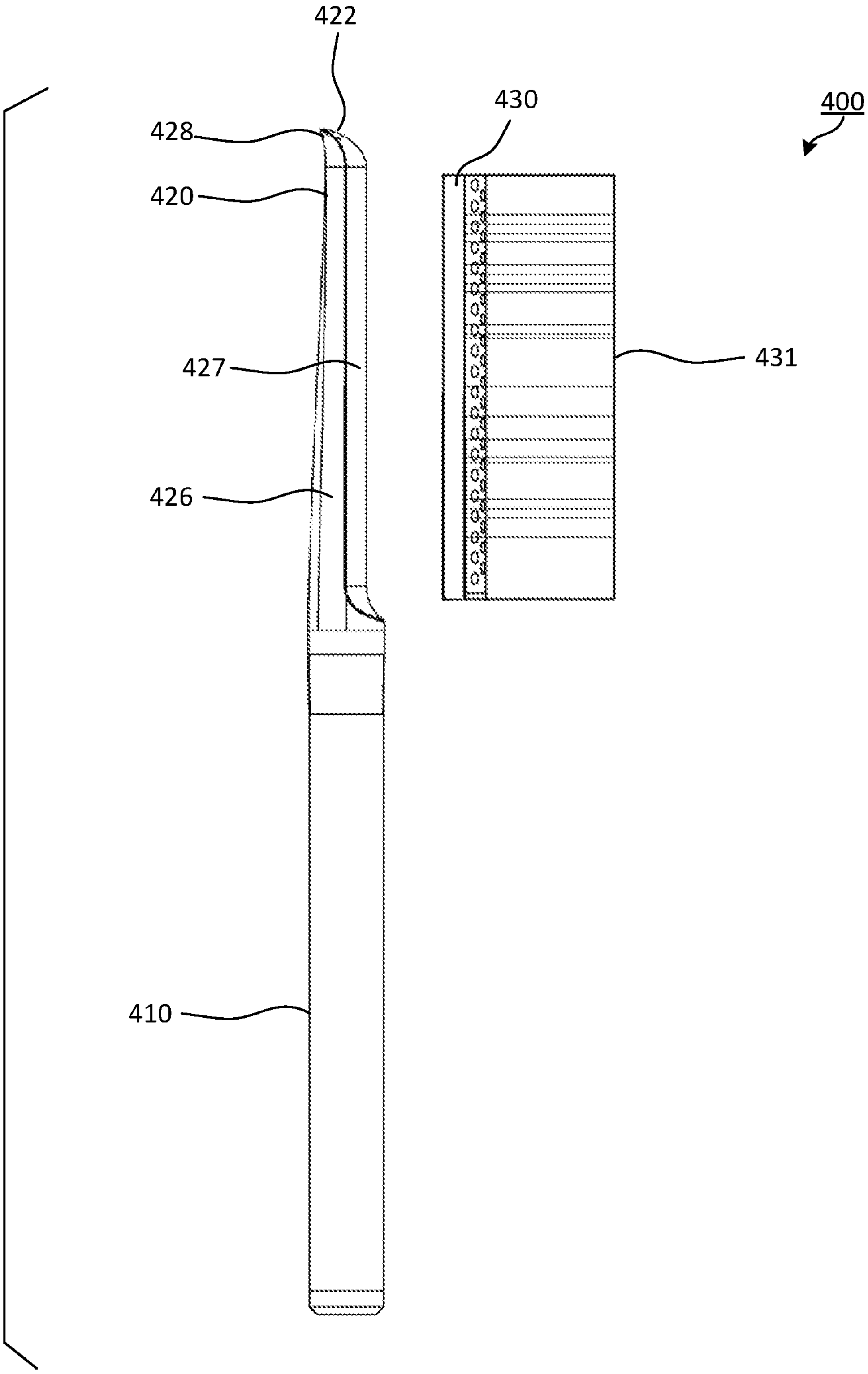
FIG. 48 is a side view of the handheld broom with a handheld removable bristlehead base removed.
Figure 49:
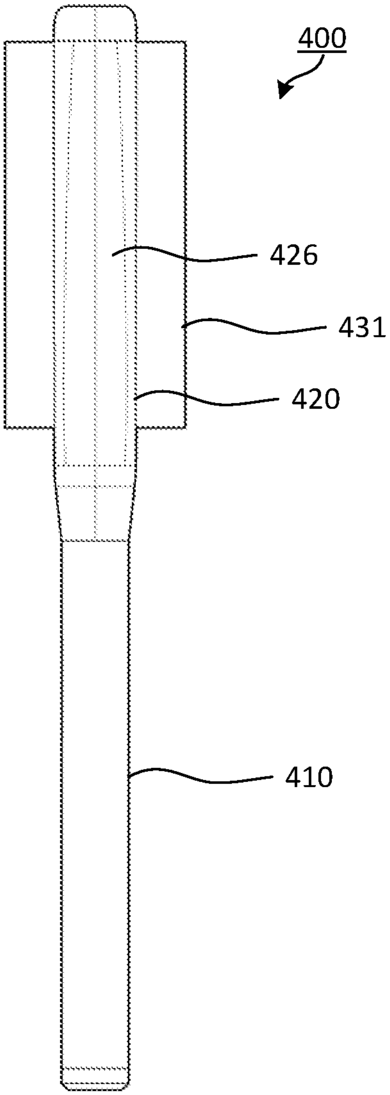
FIG. 49 is a back view of the handheld broom.
Figure 50:
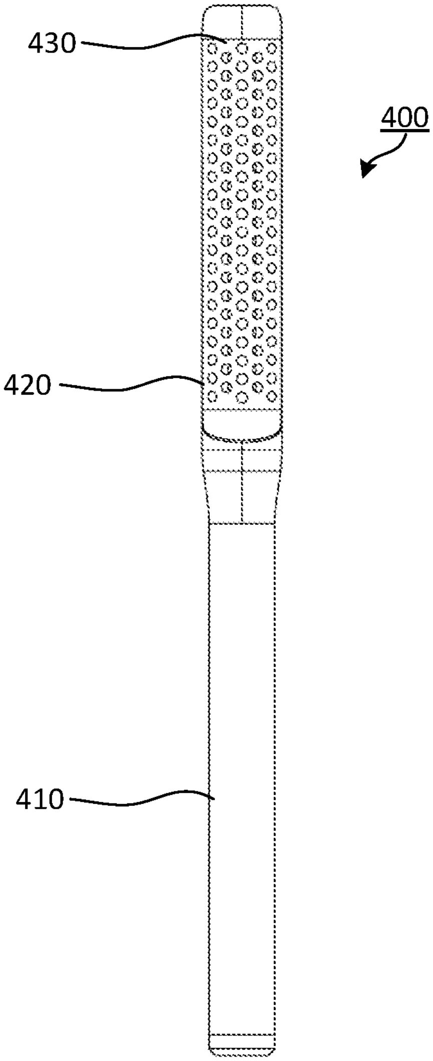
FIG. 50 is a front view of the handheld broom with a plurality of the bristles removed.

As shown in FIG. 48, the handheld bristlehead base 430 may be secured to a handheld broomhead side 426. The handheld bristlehead base 430 may contain a plurality of bristles 431 extending from the handheld bristlehead base 430. The handheld broomhead side 426 may be semi-cylindrical in shape wherein the handheld bristlehead base 430 extends from a flat side 427 of the handheld broomhead side 426. Alternatively, the handheld broomhead side 426 may be another shape as well. In addition, the handheld bristlehead base 430 may extend from another section of the handheld broomhead 420 as well.

The handheld bristlehead base 430 may be fixedly attached to the handheld broomhead side 426. Alternatively, the handheld bristlehead base 430 may be detachable from the handheld broomhead 420 similar to the removable bristle head base 150 on the broom 100 (as shown in FIG. 14). As a result, the handheld bristlehead base 430 may be removed and replaced with a handheld squeegee head or a similar removeable cleaning head (not shown).

The handheld broomhead bottom 422 may contain a scraping edge 428 extending from the handheld broomhead bottom 422. The scraping edge 428 may be made of silicon, rubber, plastic, or any other material suitable for scraping unwanted stains on a surface the scraping edge 428 may also be used to gather liquids on a surface. In addition, the scraping edge 428 may extend from the handheld broom 400 at an angle in order to allow the user to grip the handheld broom 400 at a comfortable angle when scraping.

Figure 51:
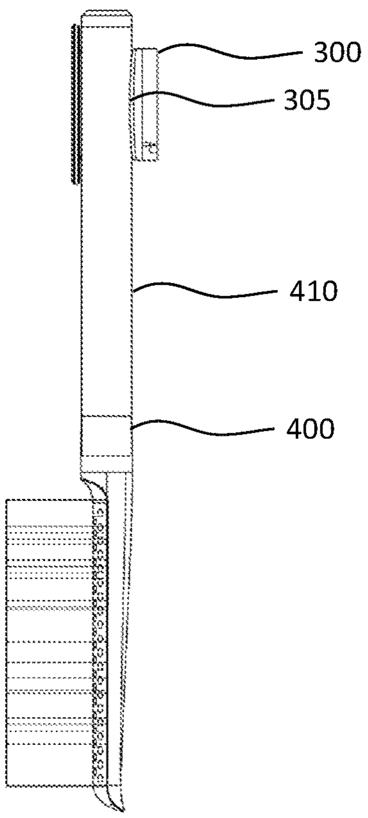
FIG. 51 is a side view of the handheld broom mounted onto the magnetic mount.
Figure 52:
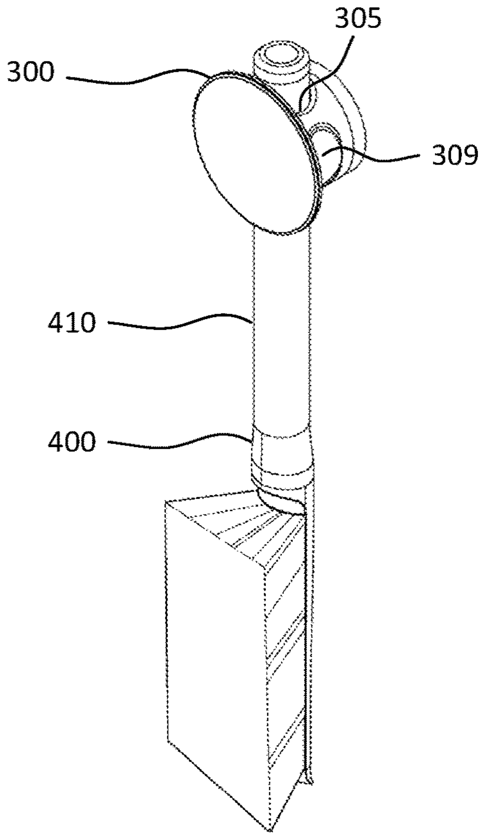
FIG. 52 is a perspective view of the handheld brush mounted onto the magnetic mount.

As shown in FIGS. 51-52, the handheld broom 400 may be mounted to the magnetic mount 300 through magnetic attraction. The handheld broom 400 may be placed within the first side indent 305 such that the handled rod 410 is magnetically attracted to the magnetic element 306 (See FIG. 44) of the magnetic mount 300. Alternatively, the handheld broom 400 may be placed within the second side indent 309 (see FIG. 52) of the magnetic mount 300 such that the handheld rod 410 is magnetically attracted to the magnetic element 306 on the magnetic mount 300.

Figure 53:
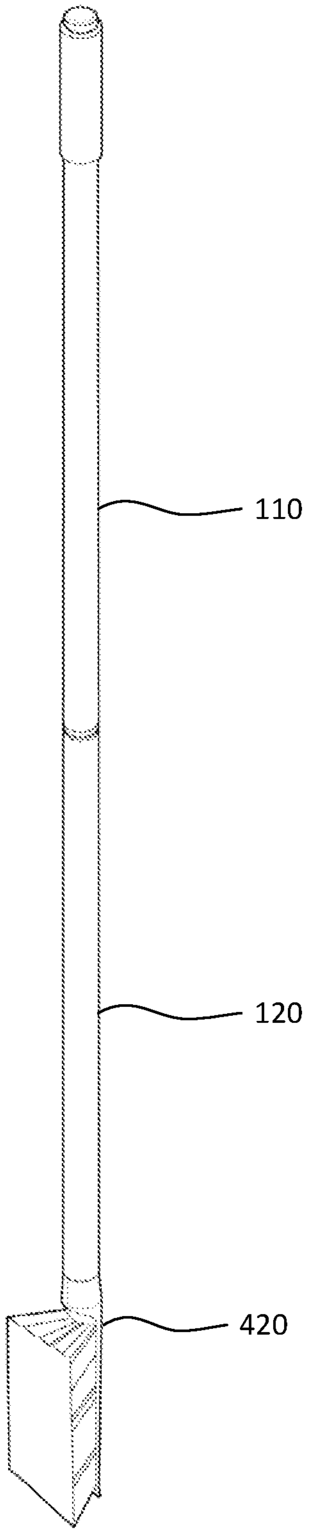
FIG. 53 is a perspective view of a handheld broomhead with the broomstick and the magnetically detachable rod connected therein.
Figure 54:
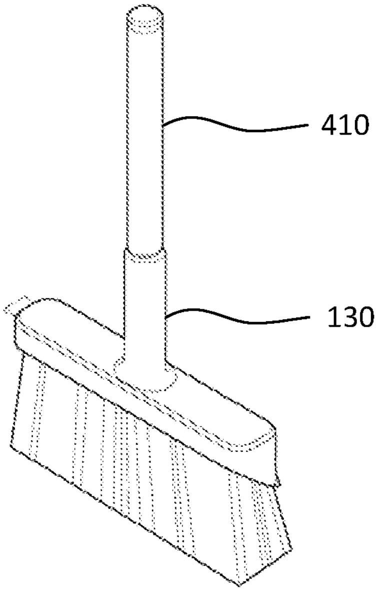
FIG. 54 is a perspective view of a broomhead with a handheld rod connected therein.

As shown in FIGS. 53-54, the handled rod 410 and the broomstick 120 can be interchanged between the handheld broomhead 420 and the broomhead 130. As explained earlier, the male threaded portion 413 on the handheld rod 410 (see FIG. 47) and the male threaded portion 126 on the broomstick 120 (see FIG. 11D) may be similar, allowing for the handheld rod 410 and the broomstick 120 to be interchanged.

Referring to FIG. 53, the handheld rod 410 (see FIG. 54) may be removed from the handheld broomhead 420. In its place, the broomstick 120, with the magnetically detachable rod 110 connected therein, may be secured to the handheld broomhead 420. The benefit of securing the broomstick 120 to the handheld broomhead 420 is that a user can now clean areas that may require a different sized rod. For example, a user can use the assembly in FIG. 53 to clean windows, ceiling fans, or shelves that may be more difficult to reach when using the traditional handheld broom 400 assembly (as shown in FIG. 47).

Alternatively, as shown in FIG. 54, the broomstick 120 (see FIG. 53) may be removed from the broomhead 130, and in its place, the handheld rod 410 may be secured to the broomhead 130. The benefit of a smaller rod on the broomhead 130 allows a user to clean areas that do not require a larger rod. For example, a user may use the assembly shown in FIG. 54 to clean countertops, shelves or windows that are positioned relatively close to the user.

Figure 55:
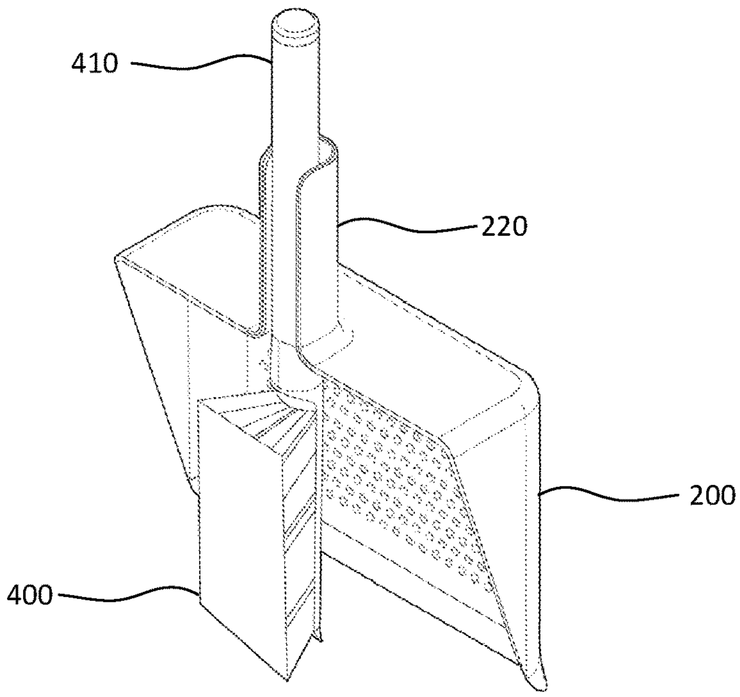
FIG. 55 is a perspective view of the handheld broom with the dustpan mounted onto to the handheld rod.
Figure 56:
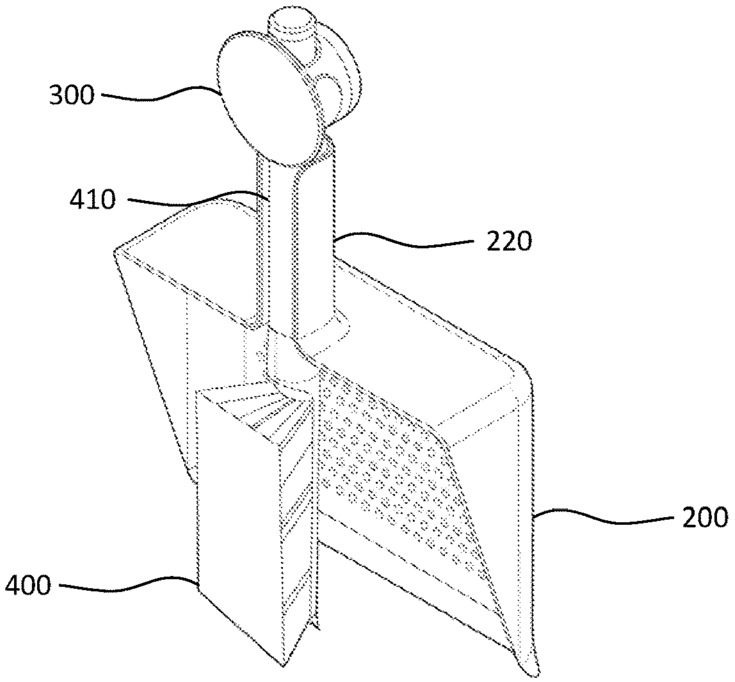
FIG. 56 is a perspective view of the handheld broom with the dustpan and the magnetic mount mounted onto the handheld rod.

As shown in FIGS. 55-56, the dustpan 200 may be magnetically attracted to the handheld broom 400. Referring to FIG. 55, the magnetic element 223 (see FIG. 31) disposed within the dustpan handle 220 is magnetically attracted to the handheld rod 410. In addition, referring to FIG. 56, the length of the handheld rod 410 may be long enough such that the dustpan handle 220 may be magnetically connected to the handheld rod 410 while the handheld rod 410 is magnetically attracted to the magnetic mount 300.

Figure 57:
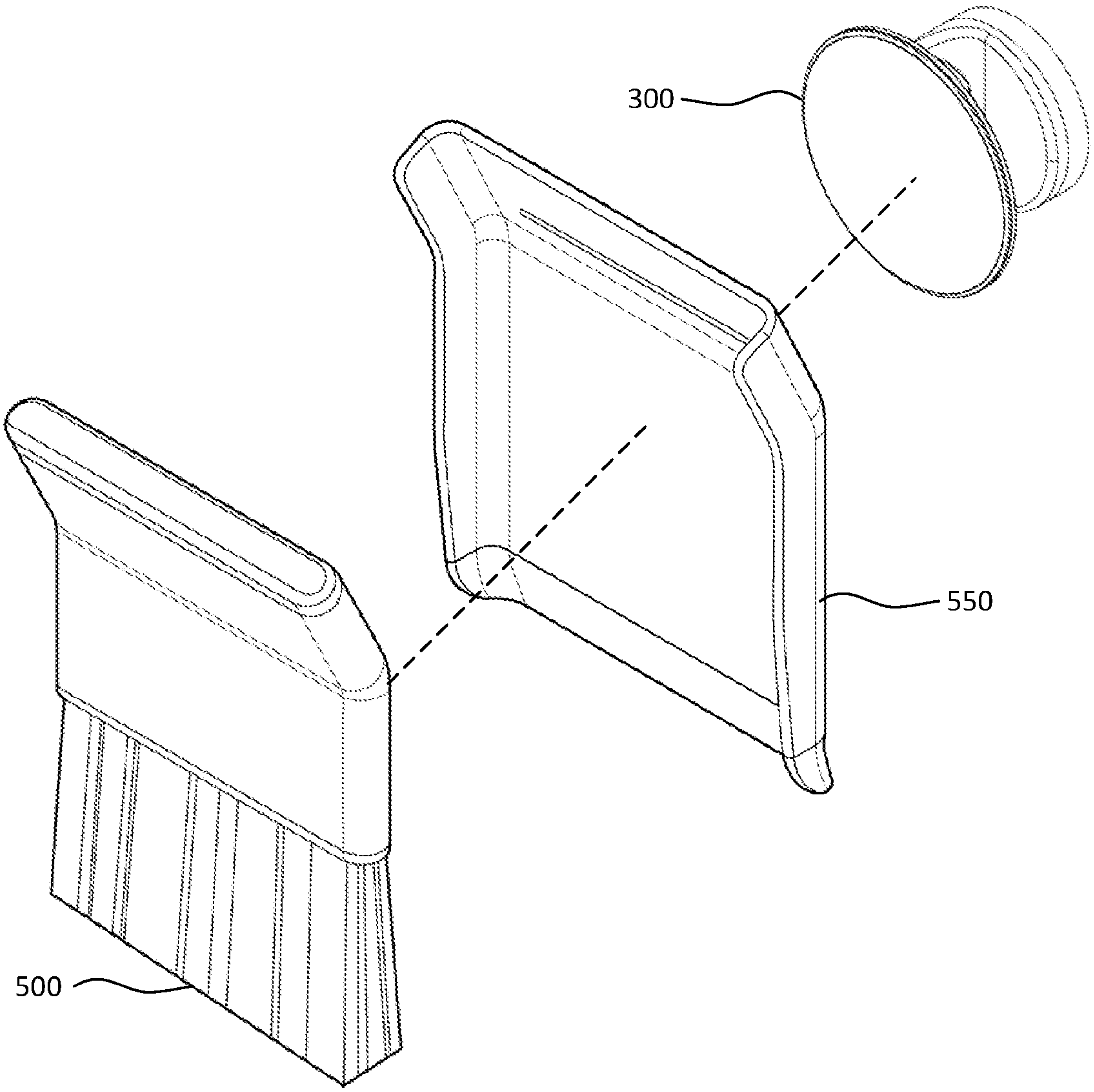
FIG. 57 is an exploded view of the assembly shown in FIG. 5.

FIG. 57 shows an exploded view of the assembly shown in FIG. 5. The assembly includes the mini broom 500, the mini dustpan 550 and the magnetic mount 300.

Figure 58:
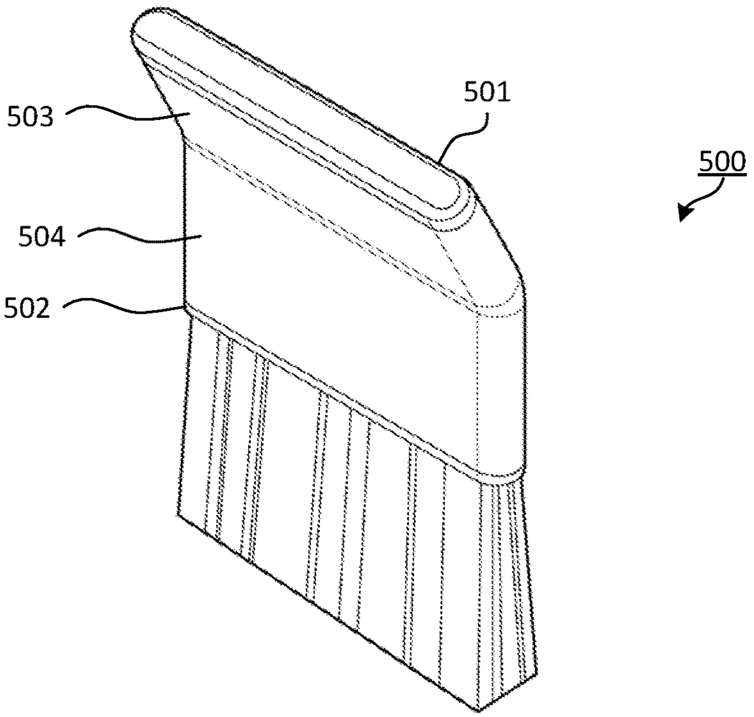
FIG. 58 is a perspective view of the mini broom.
Figure 59:
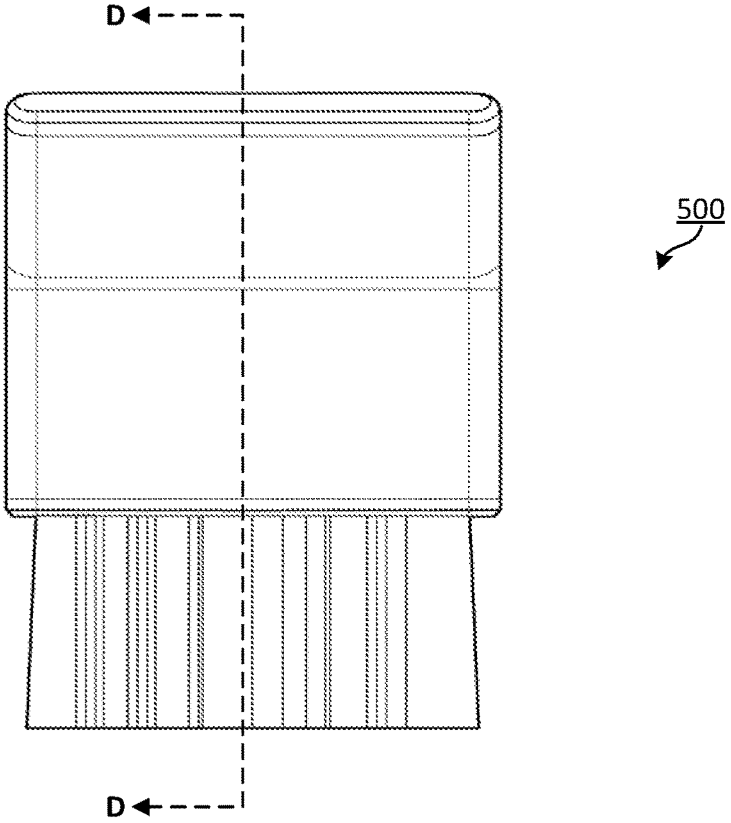
FIG. 59 is a front view of the mini broom.
Figure 60:
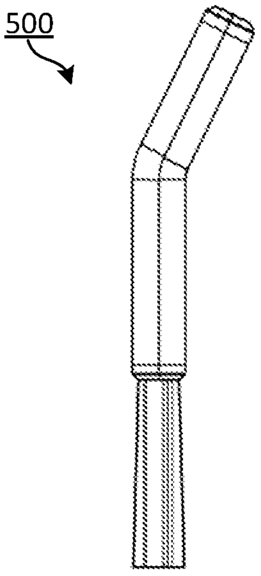
FIG. 60 is a side view of the mini broom.

FIGS. 58-63 show various views of the mini broom 500. Referring to FIG. 58, the mini broom 500 is a cleaning device comprising a mini broom first end 501 and a mini broom second end 502. A top portion 503 extends from the mini broom first end 501 towards the mini broom second end 502. A bottom portion 504 extends from the mini broom second end 502 towards the mini broom first end 501 and connects to the top portion 503 at an angle.

The angle between the top portion 503 and the bottom portion 504 allows for the mini broom 500 to be connected to the mini dustpan 550 (see FIG. 67) as will be discussed later on.

Figure 61:
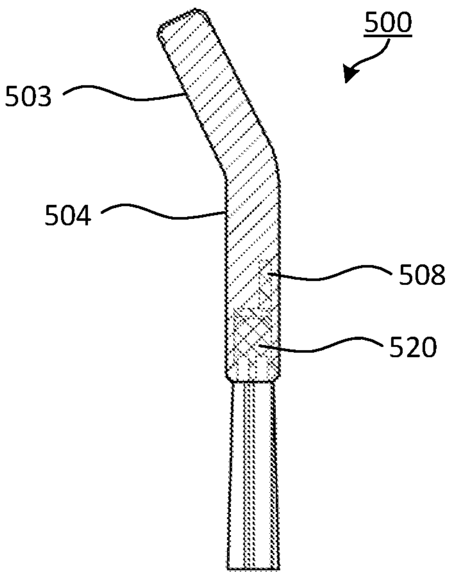
FIG. 61 is a sectional view of the mini broom taken at section lines C-C in FIG. 60.
Figure 62:
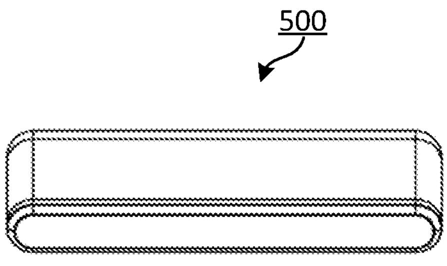
FIG. 62 is top view of the mini broom
Figure 63:
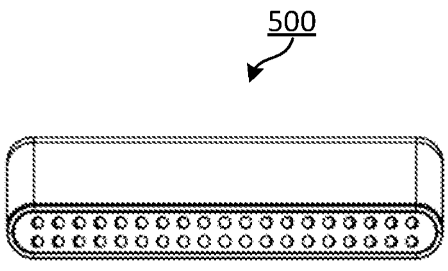
FIG. 63 is a bottom view of the mini broom.

As shown in FIG. 61, a magnetic element 508 may be disposed within the bottom portion 504 of the mini broom 500. Alternatively, the magnetic element 508 may be disposed within the top portion 503 of the mini broom 500. The purpose of the magnetic element 508 is to allow a user to magnetically mount the mini broom 500 to a ferromagnetic or magnetic surface when the user is not using the mini broom 500. For example, the mini broom 500 may be magnetically mounted to the mini dustpan 550 (see FIG. 75) or to the front surface 301 of the magnetic mount 300

Figure 64:
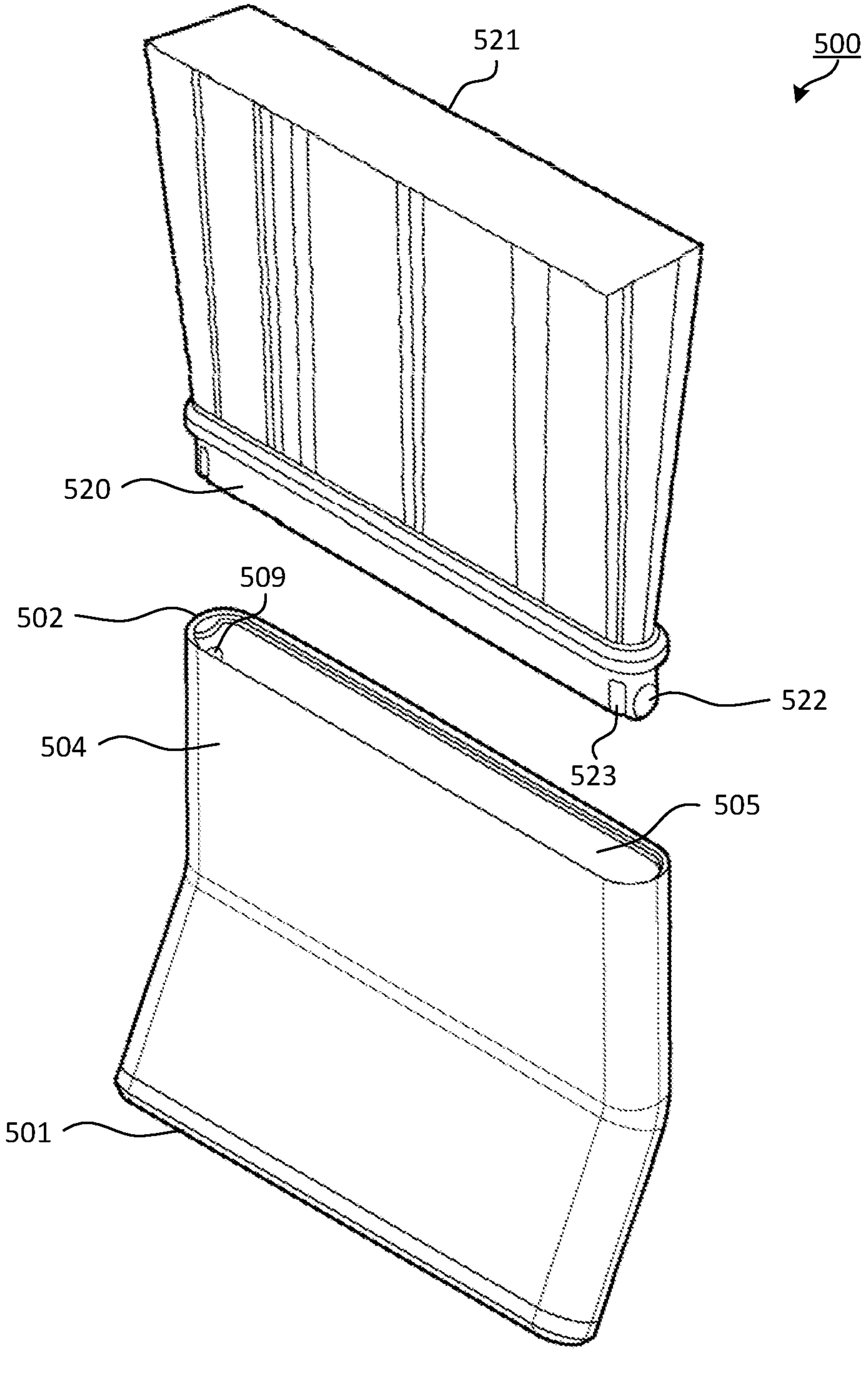
FIG. 64 is a perspective view of the mini broom with the mini bristlehead base removed.

As shown in FIG. 64, the bottom portion 504 of the mini broom 500 may contain a receiving portion 505 such that the receiving portion 505 is adapted to receive various cleaning devices such as a mini bristle head base 520. The receiving portion is an indent within the bottom portion 504 of the mini broom 500 extending a predetermined distance from the mini broom second end 502 towards the mini broom first end 501.

The mini broom 500 may contain the mini bristle head base 520 at the mini broom second end 502. The mini bristle head base 520 may be detachably removed from the mini broom 500. The receiving portion 505 is adapted to receive the mini bristlehead base 520 such that the mini bristle head base 520 is disposed substantially within the receiving portion 505. A plurality of mini bristles 521 may extend from the mini bristlehead base 520.

The mini bristle head base 520 may be secured to the receiving portion 505 similar to the securement of the removable bristle head base 150 on the broomhead 130 (as shown in FIG. 15). In the present disclosure, the mini bristlehead base 520 contains a mini protrusion 522 that is adapted to fit into a mini notch 509 within the receiving portion 505. Near the mini protrusion 522, the mini bristlehead base 520 contains a gap 523 to allow for the mini protrusion 522 to be flexible and allow some clearance such that the mini protrusion 522 can be fitted into the mini notch 509. Alternatively, the mini bristlehead base 520 may be secured to the miniboom 500 with magnetic elements (not shown) disposed on the mini bristlehead base 520 and magnetic elements (not shown) disposed within the receiving portion 520.

Figure 65:
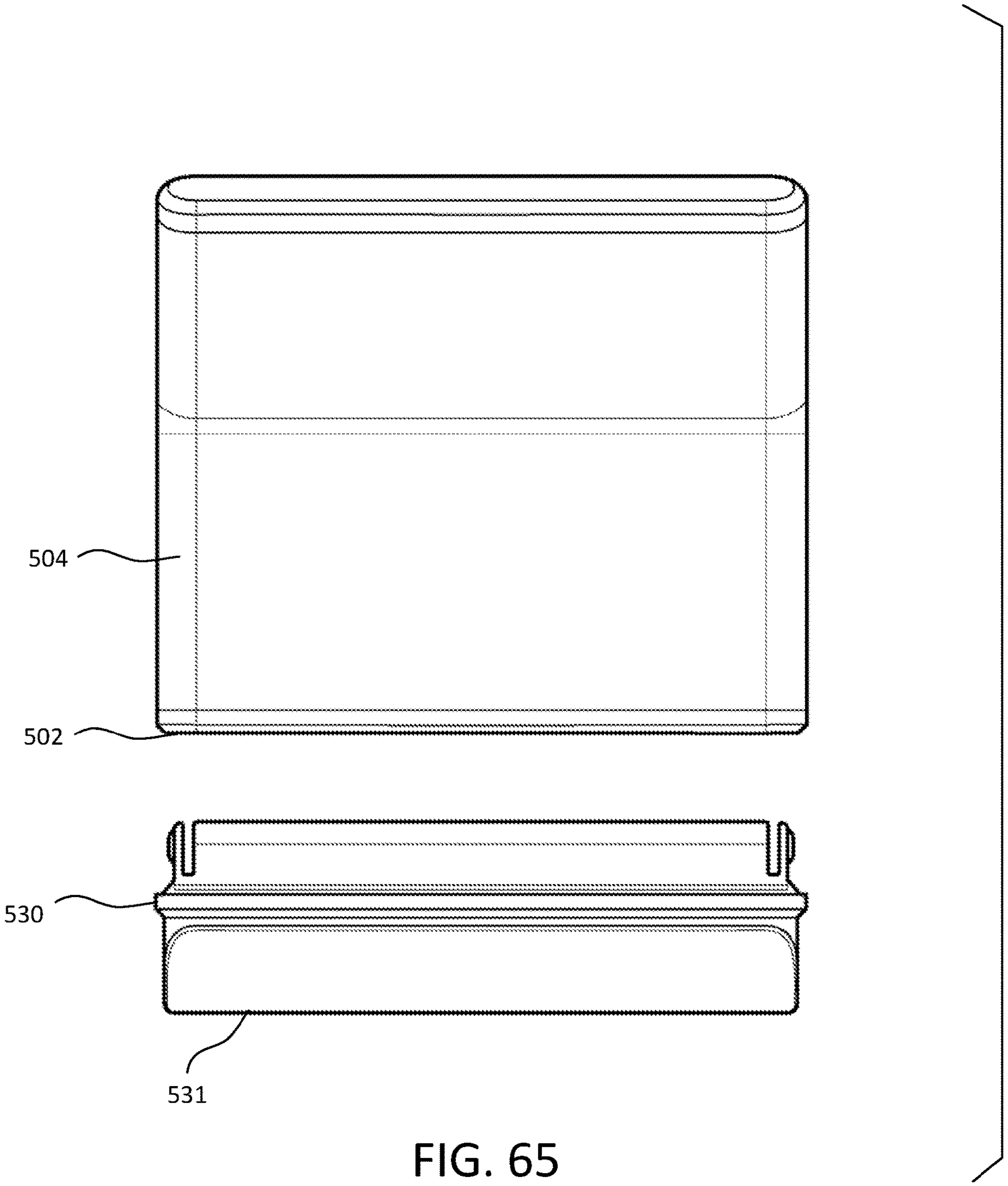
FIG. 65 is a front view of the mini broom with a removable squeegee head base removed.
Figure 66:
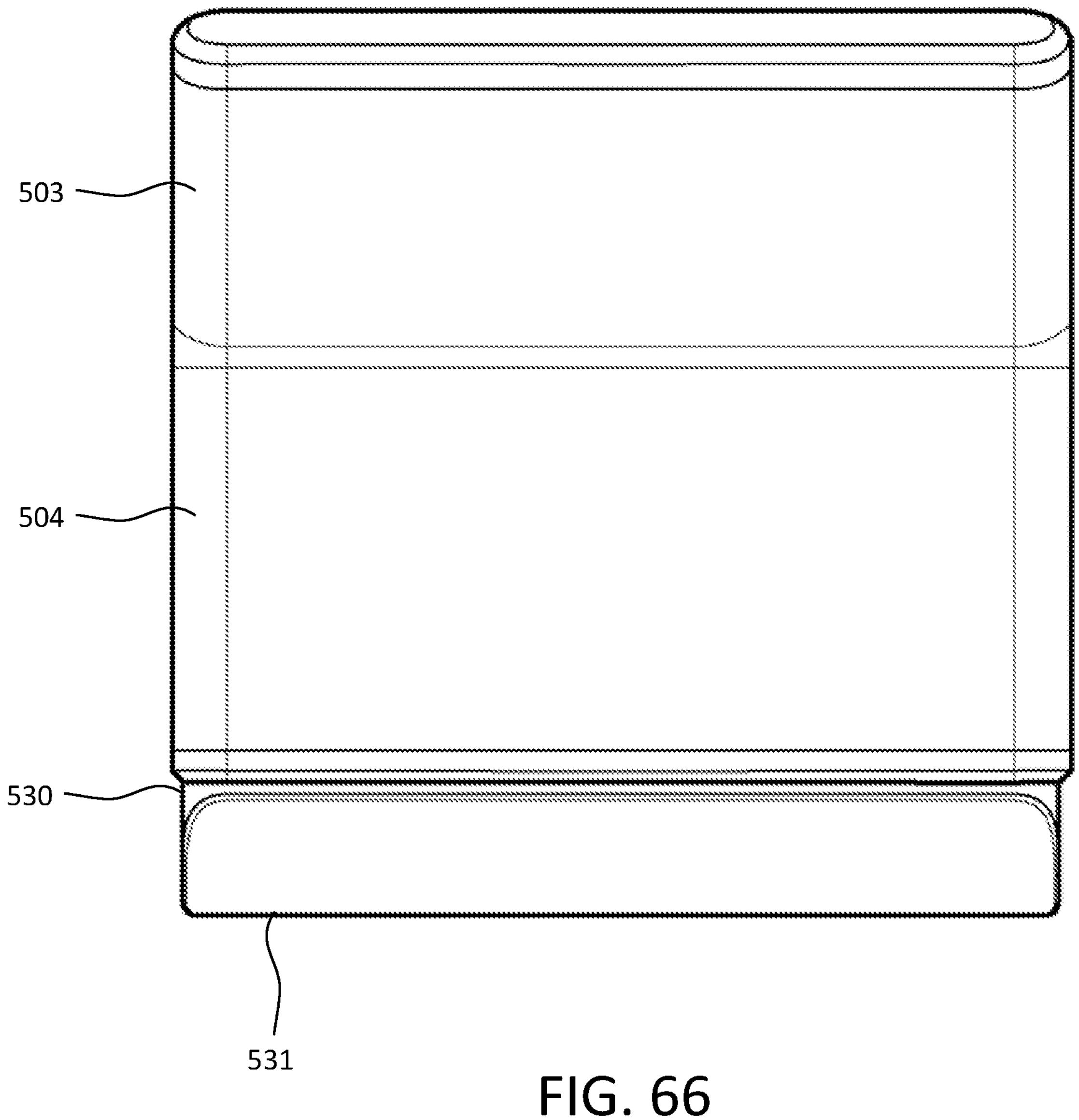
FIG. 66 is a front view of the mini broom with a removable squeegee head base in place of the mini bristlehead base.

As shown in FIGS. 65-66 the mini bristlehead base 520 (see FIG. 64) can be replaced with a mini squeegee head base 530. The mini squeegee head base 530 has a squeegee portion 531 extending from the mini squeegee head base 530 similar to the mini bristle head base 520 (See FIG. 64) The squeegee portion 531 may be made of a pliable material such as silicone or rubber. The pliable material would aid in the gathering of liquids on a surface. Alternatively, the squeegee portion 531 may be made of a non-pliable material as well. The benefit of a mini squeegee head base 530 is to allow a user to gather and remove liquids off of a surface such as countertops. The user may gather the liquids into the mini dustpan 550 (see FIG. 64) or simply use the squeegee portion 531 to gather the liquids into a nearby sink or basin. The mini squeegee head base 530 may be constructed similar to the mini bristle head base 520 such that the mini squeegee head base 530 can be inserted into the receiving portion 505 of the mini broom 500.

FIGS. 67-72 show various views of the mini dustpan 550.

Figure 67:
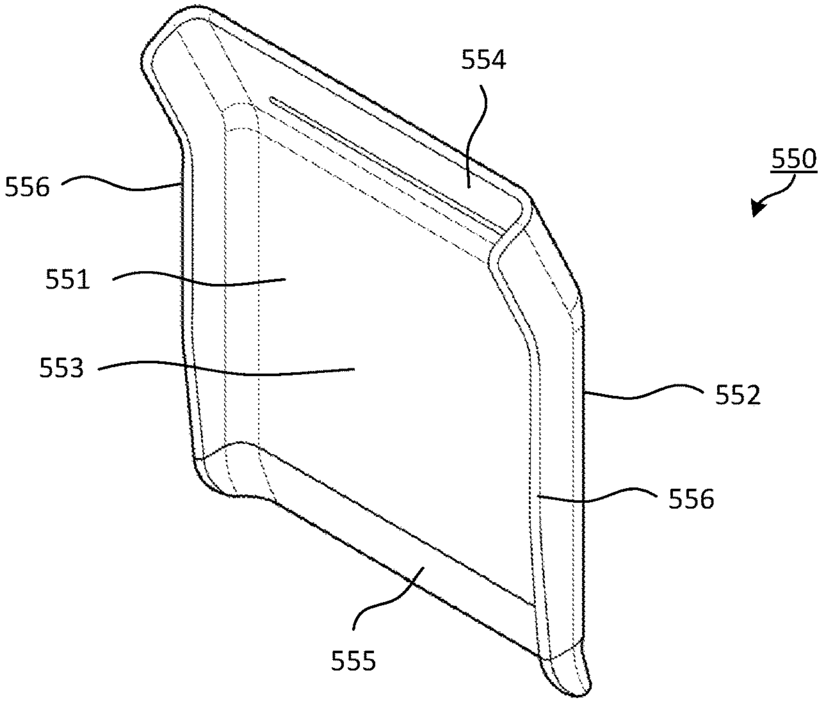
FIG. 67 is a perspective view of the mini dustpan.

As shown in FIG. 67 the mini dustpan 550 is a cleaning device having a front side 551 and a back side 552. The front side 551 of the mini dustpan 550 comprises a mini collecting area 553, a mini backwall 554 extending at an angle from the mini collecting area 553, a mini free edge 555 extending from the mini collecting area 553 opposite the mini backwall 554, and two sidewalls 556, extending the from the mini back wall 554 towards the mini free edge 555.

The mini free edge 555 may be angled in a direction opposite of the mini backwall 554, similar to the dustpan 200 (See FIG. 27). The purpose of the angle on the mini free edge 555 is to allow debris and other unwanted materials to be easily swept into mini collecting area 553 of the mini dustpan 550. The mini free edge 555 may also be used as a scraping edge to scrape unwanted materials off a surface, or as a squeegee to gather liquids on a surface. The mini free edge 555 may be made of rubber, silicon, plastic, or any other material that can be used to gather liquids on a surface or to scrape unwanted materials off of a surface.

The mini dustpan 550 may have a size similar to that of the mini broom 500 (see FIG. 58) such that the top portion 503 and the bottom portion 504 of the mini broom 500 will substantially fit longitudinally between the back wall 554 and the free edge 555 of the mini dustpan 550, and laterally between the sidewalls 556 of the mini dustpan 550.

The mini backwall 554 may be angled relative to the mini collecting area 553. The angled mini backwall 554 ensures that liquids or materials cannot easily escape through the mini backwall 554 when swept into the mini collecting area 553. In addition, the mini backwall 554 may have a similar angle as the angle between the top portion 503 and the bottom portion 504 of the mini broom 500 (see FIG. 58) such that the mini broom 500 may fit within the mini dustpan 550 for easy storage.

The mini dustpan may have a magnetic element 558 disposed between the front surface 551 and the back surface 552 of the mini dustpan 550. The magnetic element 558 may also extend from the front surface 551 towards the back surface 552 of the mini dustpan 550. The purpose of the magnetic element 558 is to magnetically attract the mini broom 500 to the mini dustpan 550 (see FIG. 75). In addition, the purpose of the magnetic element 558 is to magnetically attract the mini dustpan 550 to a ferromagnetic or magnetic surface such as the front surface of the magnetic mount 300 (see FIG. 75). The magnetic element 558 on the mini dustpan 550 may be positioned on the mini dustpan 550 such that the magnetic element 558 on the dustpan is substantially aligned with the magnetic element 508 of the mini broom 500 (See FIG. 68-69) when the mini broom 500 is placed within the mini dustpan 550.

Figure 68:
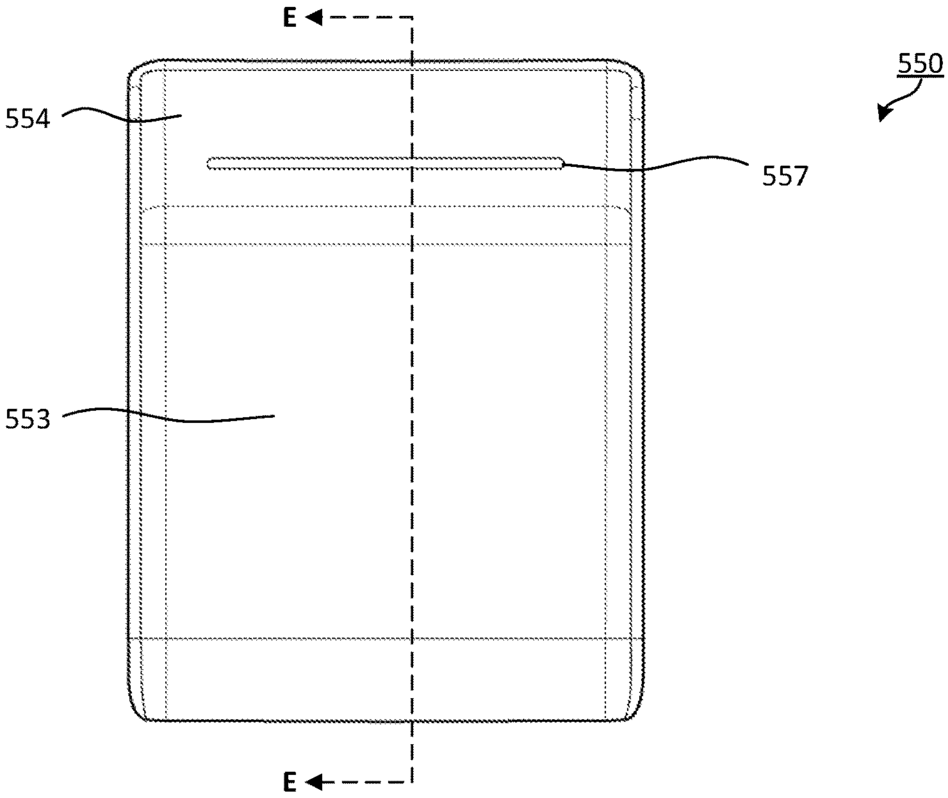
FIG. 68 is front view of the mini dustpan.
Figure 69:
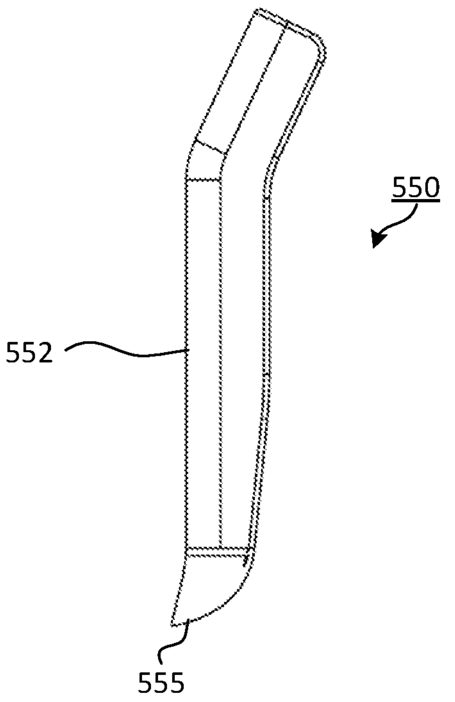
FIG. 69 is a sideview of the mini dustpan.
Figure 70:
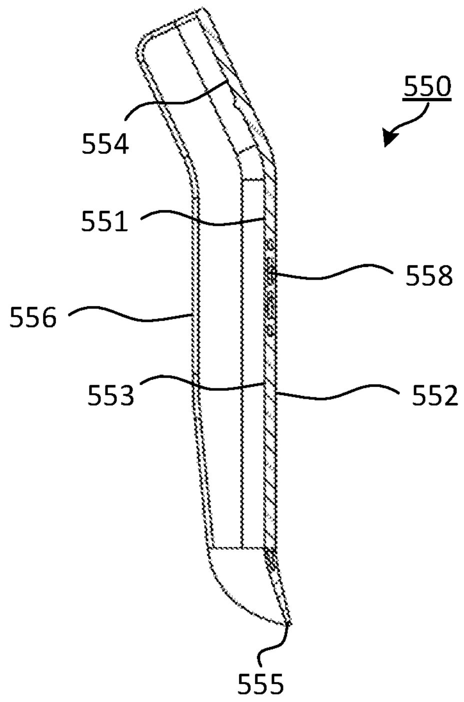
FIG. 70 is a sectional view of the mini dustpan taken at section lines E-E.
Figure 71:
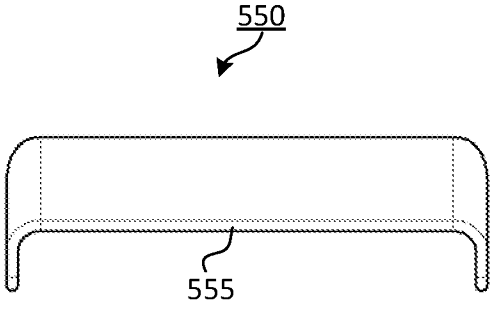
FIG. 71 is a bottom view of the mini dustpan.
Figure 72:
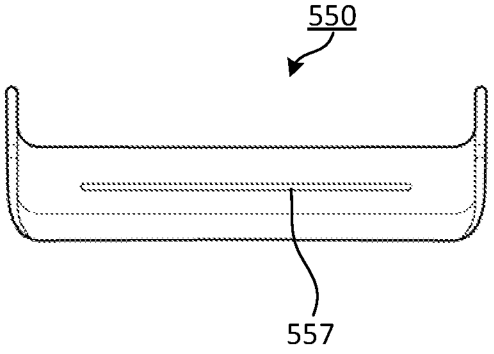
FIG. 72 is a top view of the mini dustpan.

As shown in FIG. 68, the mini backwall 554 may have a mini dustpan protrusion 557. The purpose of the mini dustpan protrusion 557 is to assist the user in the removal of the mini broom 500 (See FIG. 73) from the mini dustpan 550.

Figure 73:
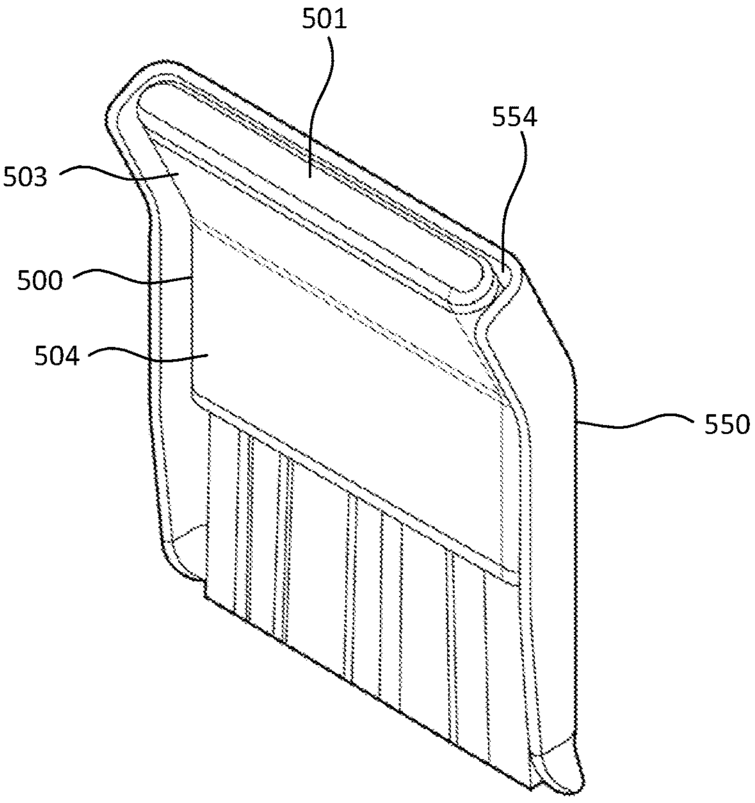
FIG. 73 is a perspective view of the mini dustpan with the mini broom connected therein.

As shown in FIG. 73, the mini dustpan protrusion 557 (see FIG. 68) creates a gap between the top portion 503 of the mini boom 500 and the backwall 554 such that the user can grip the top portion 503 of the mini broom 500 and separate the mini broom 500 from the mini dustpan 500. Alternatively, when the mini broom 500 is situated within the mini dustpan 550, the user can press down on the top portion 503 near the first end 501 of the mini broom 500. The dustpan protrusion 557 will cause the bottom portion 504 of the mini broom 500 to angle slightly above the mini collecting area 553 (see FIG. 68). The user can then grip a part of the bottom portion 504 of the mini broom 500 and disconnect the mini broom 500 from the mini dustpan 550.

Figure 74:
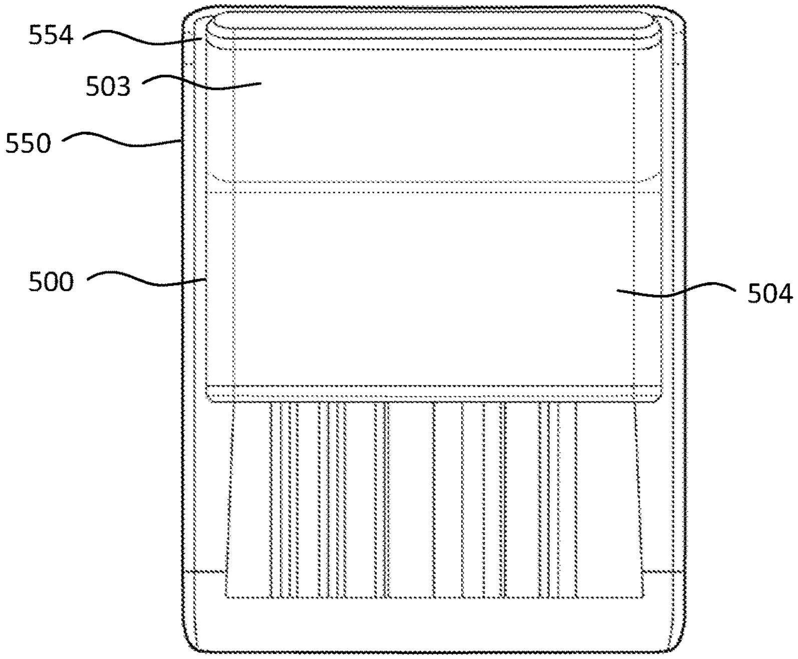
FIG. 74 a front view of the mini dustpan with the mini broom connected therein.

As shown in FIGS. 73-74, the mini broom 500 may be placed within the mini dustpan 550. To secure the mini broom 500 to the mini dustpan 550, the user simply places the mini broom 500 within the mini dustpan 550. The magnetic element 508 within the mini broom 500 (see FIG. 61) and the magnetic element 558 within the mini dustpan 550 (see FIG. 70) magnetically attract and hold the mini broom 500 within the mini dustpan 550.

To remove the mini broom 500 from the mini dustpan 550, the user grips the top portion 503 of the mini broom 500, between the top portion 503 and the mini backwall 554 and pulls the mini broom 500 away from the mini dustpan 550 with sufficient force to overcome the magnetic attraction between the mini broom 500 and the mini dustpan 550. As explained previously, the mini dustpan protrusion 557 (see FIG. 68) creates a gap between the dustpan backwall 554 and the top portion 503 of the mini broom 500 allowing the user to properly grip a part of the top portion 503 or the bottom portion 504 of the mini broom 500.

Figure 75:
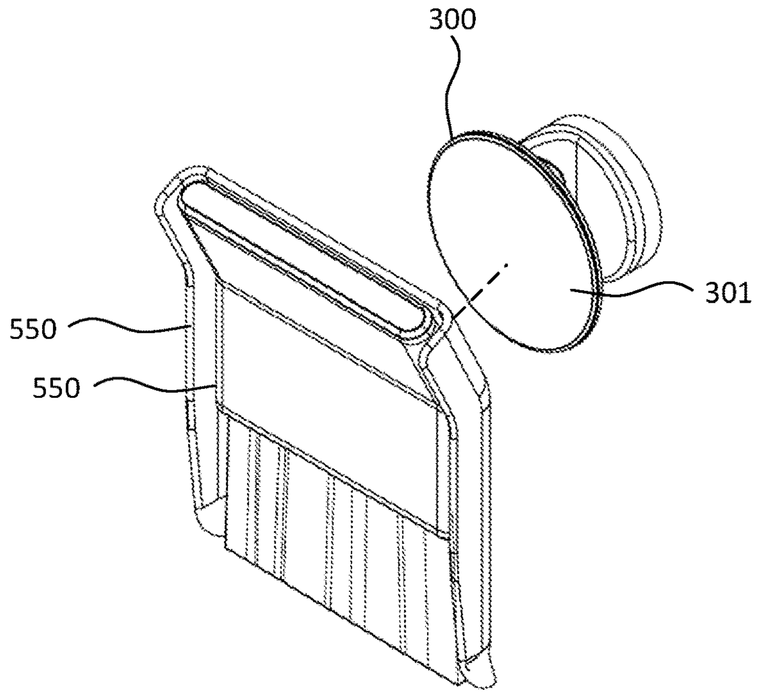
FIG. 75 is a perspective view of the mini dustpan with the mini broom connected therein, both magnetically mounted to the magnetic mount.
Figure 76:
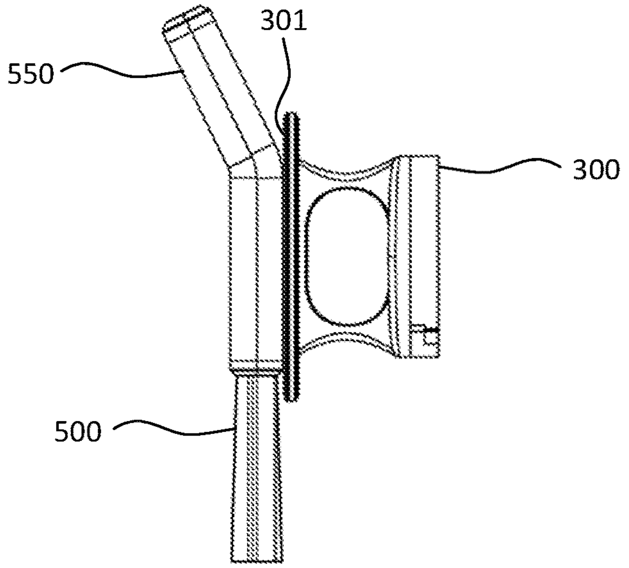
FIG. 76 is a side view of the mini dustpan with the mini broom connected therein, both magnetically mounted to the magnetic mount.

As shown in FIGS. 75-76, the mini dustpan 550, with the mini broom 500 magnetically attracted therein, can be magnetically attracted to the front surface 301 of the magnetic mount 300. To mount the mini dustpan 550 to the magnetic mount 300, the user places the portion of the mini dustpan 550 that contains the magnetic element 558 (see FIG. 70) near the front surface 301 of the magnetic mount 300. The magnetic element 311 within the front surface 301 of the magnetic mount 300 (see FIG. 43) is magnetically attracted to the magnetic element 558 in the mini dustpan 550 and holds the mini dustpan 550 in place.

To remove the dustpan 550 from the magnetic mount, the user simply grips a portion of the mini dustpan 550 and pulls away from the front surface 301 of the magnetic mount.

It should be noted that the mini dustpan 550 can be mounted onto other ferromagnetic or magnetic surfaces as well.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A tool assembly, comprising:
- a rod;
- a broomstick that magnetically and reversibly attaches to the rod at a broomstick mount end of the rod;
- a push button positioned at a first end of the rod opposite the broomstick mount end of the rod, wherein depressing the push button disconnects the magnetic attachment of the rod to the broomstick by pushing the broomstick away from the rod; and
- a broomhead having bristles, which reversibly attaches to the broomstick.

2. The tool assembly of claim 1, further comprising ferromagnetic material disposed at a second end of the rod which is connected to a broomstick first end.

3. The tool assembly of claim 1, further comprising a mount having an internal magnetic element and a first indent adapted to surround and grasp an exterior surface of the rod.

4. The tool assembly of claim 3, further comprising a brush having a handle which is connectable to the rod.

5. The tool assembly of claim 4, wherein the mount has a second indent adapted to surround and grasp an exterior surface of the handle of the brush.

6. The tool assembly of claim 4, further comprising a dustpan that connects to the handle of the brush.

7. The tool assembly of claim 3, further comprising a broom attached directly to the mount.

8. The tool assembly of claim 7, further comprising a dustpan attached directly to the mount.

9. The tool assembly of claim 8, wherein the broom and the dustpan have magnetic elements which mate with the mount magnetically.

10. The tool assembly of claim 3, further comprising a bracket which is adapted to secure the mount to a wall.

11. The tool assembly of claim 10, wherein the bracket reversibly slides into a bracket slot in the mount.

12. The tool assembly of claim 1, wherein the broomstick has a threaded portion which mates with a threaded bore in the broomhead.

13. The tool assembly of claim 1, further comprising a dustpan that connects to the broomstick.

14. The tool assembly of claim 1, further comprising a bracket which is adapted to secure the tool assembly to a wall.

15. The tool assembly of claim 1, further comprising a shaft or wire that is mechanically connected to the push button and extends to the broomstick mount end of the rod.

16. The tool assembly of claim 15, wherein the shaft or wire engages an ejecting apparatus that pushes the broomstick away from the rod.

17. A tool assembly, comprising:
- a rod;
- a broomstick that magnetically and reversibly attaches to the rod;
- a broomhead having bristles, which reversibly attaches to the broomstick;
- a magnetic mount having a first indent adapted to surround and grasp an exterior surface of the rod;
- a bracket which reversibly mates with the magnetic mount and is adapted to secure the tool assembly to a wall; and
- a brush having a handle, wherein the magnetic mount has a second indent adapted to surround and grasp an exterior surface of the handle of the brush.

18. The tool assembly of claim 17, wherein the bracket reversibly slides into a bracket slot in the mount.

19. The tool assembly of claim 17, further comprising a dustpan with magnetic elements which mate with the mount magnetically.

20. A tool assembly, comprising:
- a rod;
- a broomstick that magnetically and reversibly attaches to the rod;
- a broomhead having bristles, which reversibly attaches to the broomstick;
- a magnetic mount having a first indent adapted to surround and grasp an exterior surface of the rod;
- a bracket which reversibly mates with a bracket slot in the magnetic mount and is adapted to secure the tool assembly to a wall;
- a broom and a dustpan with magnetic elements which mate with the mount magnetically; and
- a brush having a handle, wherein the mount has a second indent adapted to surround and grasp an exterior surface of the handle of the brush.

* * * * *